United States Patent
Ko et al.

(10) Patent No.: US 9,954,592 B2
(45) Date of Patent: Apr. 24, 2018

(54) METHOD AND APPARATUS FOR REPORTING CHANNEL STATE INFORMATION IN WIRELESS COMMUNICATION SYSTEM

(71) Applicant: LG ELECTRONICS INC., Seoul (KR)

(72) Inventors: Hyunsoo Ko, Seoul (KR); Jiwon Kang, Seoul (KR); Jaehoon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/768,611

(22) PCT Filed: Mar. 11, 2014

(86) PCT No.: PCT/KR2014/001988
§ 371 (c)(1),
(2) Date: Aug. 18, 2015

(87) PCT Pub. No.: WO2014/142504
PCT Pub. Date: Sep. 18, 2014

(65) Prior Publication Data
US 2015/0381247 A1    Dec. 31, 2015

Related U.S. Application Data

(60) Provisional application No. 61/776,720, filed on Mar. 11, 2013, provisional application No. 61/808,191, (Continued)

(51) Int. Cl.
H04W 72/04    (2009.01)
H04B 7/06    (2006.01)
(Continued)

(52) U.S. Cl.
CPC ......... *H04B 7/0626* (2013.01); *H04B 7/0456* (2013.01); *H04B 7/0469* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS 6,188,373 B1   2/2001 Martek
9,042,841 B2   5/2015 Liu et al.
(Continued)

FOREIGN PATENT DOCUMENTS

CN    1353508    6/2002
CN    102045762   5/2011
(Continued)

OTHER PUBLICATIONS

PCT International Application No. PCT/KR2014/001988, Written Opinion of the International Searching Authority dated Jun. 26, 2014, 14 pages.
(Continued)

*Primary Examiner* — Robert C Scheibel
*Assistant Examiner* — Prenell Jones
(74) *Attorney, Agent, or Firm* — Lee Hong Degerman Kang Waimey

(57) ABSTRACT

The present invention relates to a wireless communication system and, more specifically, to a method and an apparatus for reporting channel state information (CSI). According to one embodiment of the present invention, the method by which a terminal of the wireless communication system reports the CSI comprises: a step of receiving a reference signal from a base station; and a step of reporting the CSI generated through the reference signal to the base station. The CSI can include information for indicating a first
(Continued)

pre-coding matrix for a first domain of a two-dimensional antenna structure and a second pre-coding matrix for a second domain of the two-dimensional antenna structure. The first pre-coding matrix can be determined on the basis of a coefficient wherein an angle the first domain is determined according to an angle in the second domain.

14 Claims, 17 Drawing Sheets

Related U.S. Application Data filed on Apr. 3, 2013, provisional application No. 61/808,220, filed on Apr. 4, 2013, provisional application No. 61/812,684, filed on Apr. 16, 2013.

(51) Int. Cl.
- *H04B 7/0456* (2017.01)
- *H04B 7/04* (2017.01)
- *H04W 24/10* (2009.01)
- *H04L 5/00* (2006.01)

(52) U.S. Cl.
CPC ......... *H04B 7/0617* (2013.01); *H04B 7/0632* (2013.01); *H04B 7/0634* (2013.01); *H04B 7/0639* (2013.01); *H04B 7/0665* (2013.01); *H04L 5/0048* (2013.01); *H04W 24/10* (2013.01); *H04W 72/0413* (2013.01); *H04B 7/063* (2013.01)

(56) References Cited

U.S. PATENT DOCUMENTS

| | | | |
|---|---|---|---|
| 9,119,209 B2* | 8/2015 | Nam | H04W 72/046 |
| 2008/0019457 A1* | 1/2008 | Waters | H01Q 3/2605 375/267 |
| 2010/0173659 A1 | 7/2010 | Shin et al. | |
| 2011/0064156 A1* | 3/2011 | Kim | H04B 7/0634 375/267 |
| 2011/0116437 A1 | 5/2011 | Chen et al. | |
| 2011/0261897 A1* | 10/2011 | Jen | H04B 7/0639 375/285 |
| 2011/0280188 A1* | 11/2011 | Jeon | H04B 7/0413 370/328 |
| 2012/0069917 A1 | 3/2012 | Liu et al. | |
| 2012/0076028 A1 | 3/2012 | Ko et al. | |
| 2012/0076040 A1* | 3/2012 | Hoshino | H04W 24/10 370/252 |
| 2012/0176939 A1 | 7/2012 | Qu et al. | |
| 2012/0176965 A1 | 7/2012 | Zhu et al. | |
| 2012/0281783 A1 | 11/2012 | Cheng et al. | |
| 2012/0307649 A1 | 12/2012 | Park et al. | |
| 2013/0005382 A1 | 1/2013 | Landstrom et al. | |
| 2013/0021926 A1 | 1/2013 | Geirhofer et al. | |
| 2013/0028225 A1 | 1/2013 | Ko et al. | |
| 2013/0044650 A1 | 2/2013 | Barker et al. | |
| 2013/0114763 A1 | 5/2013 | Park | |
| 2013/0258964 A1* | 10/2013 | Nam | H04W 72/046 370/329 |
| 2013/0301434 A1* | 11/2013 | Krishnamurthy | H04L 1/0026 370/252 |
| 2014/0029684 A1* | 1/2014 | Shirani-Mehr | H04B 7/0469 375/267 |
| 2014/0098689 A1 | 4/2014 | Lee et al. | |
| 2014/0112413 A1* | 4/2014 | Ro | H04B 7/0456 375/296 |
| 2014/0177683 A1* | 6/2014 | Krishnamurthy | H04B 7/0469 375/219 |
| 2014/0177744 A1* | 6/2014 | Krishnamurthy | H04B 7/0469 375/267 |
| 2015/0372740 A1 | 12/2015 | Ko et al. | |
| 2015/0382223 A1 | 12/2015 | Ko et al. | |
| 2016/0036511 A1 | 2/2016 | Ko et al. | |

FOREIGN PATENT DOCUMENTS

| | | |
|---|---|---|
| CN | 102237955 | 11/2011 |
| CN | 102307165 | 1/2012 |
| CN | 102334300 | 1/2012 |
| CN | 102396163 | 3/2012 |
| CN | 102792605 | 11/2012 |
| CN | 102938688 | 2/2013 |
| EP | 2416603 | 2/2012 |
| EP | 2432149 | 3/2012 |
| EP | 2555445 | 2/2013 |
| JP | 2011519502 | 7/2011 |
| JP | 2016511566 | 4/2016 |
| KR | 10-2010-0124331 | 11/2010 |
| KR | 10-2010-0136418 | 12/2010 |
| KR | 10-2012-0029338 | 3/2012 |
| KR | 10-2012-0123497 | 11/2012 |
| KR | 10-2013-0014454 | 2/2013 |
| WO | 2012005476 | 1/2012 |
| WO | 2012036513 | 3/2012 |
| WO | 2012/057462 | 5/2012 |
| WO | 2012/072028 | 6/2012 |
| WO | 2013/024350 | 2/2013 |
| WO | 2013/024852 | 2/2013 |
| WO | 2013025558 | 2/2013 |
| WO | 2014113992 | 7/2014 |

OTHER PUBLICATIONS

Alcatel-Lucent Shanghai Bell, et al., "Considerations on CSI feedback enhancements for high-priority antenna configurations," 3GPP TSG-RAN WG1 #66, R1-112420, Aug. 2011, 7 pages.

Samsung, "Prioritization of CSI feedback enhancement scenarios for DL-MIMO," 3GPP TSG RAN WG1 Meeting #66, R1-112515, Aug. 2011, 3 pages.

NTT DOCOMO, "Scenarios and potential CSI feedback enhancements for DL MIMO in Rel-11," 3GPP TSG RAN WG1 Meeting #66, R1-112433, Aug. 2011, 5 pages.

PCT International Application No. PCT/KR2014/001988, Written Opinion of the International Searching Authority dated Jun. 26, 2014, 11 pages.

PCT International Application No. PCT/KR2014/002003, Written Opinion of the International Searching Authority dated Jun. 25, 2014, 14 pages.

PCT International Application No. PCT/KR2014/001990, Written Opinion of the International Searching Authority dated Jun. 20, 2014, 14 pages.

PCT International Application No. PCT/KR2014/001990, Written Opinion of The International Earching Authority dated Jun. 20, 2014, 18 pages.

3rd Generation Partnership Project (3GPP), "Technical Specification Group Radio Access Network; Evolved Universal Terrestrial Radio Access (E-UTRA); Physical layer procedures (Release 10)," 3GPP TR 36.213 V10.8.0, Dec. 2012, 126 pages.

European Patent Office Application Serial No. 14765657.3, Search Report dated Oct. 28, 2016, 8 pages.

European Patent Office Application Serial No. 14763979.3, Search Report dated Nov. 2, 2016, 10 pages.

European Patent Office Application Serial No. 14764921.4, Search Report dated Oct. 31, 2016, 9 pages.

European Patent Office Application Serial No. 14765067.5, Search Report dated Oct. 25, 2016, 8 pages.

PCT International Application No. PCT/KR2014/002001, Written Opinion of the International Searching Authority dated Jun. 25, 2014, 16 pages.

European Patent Office Serial No. 14763979.3, Search Report dated Nov. 2, 2016, 10 pages.

U.S. Appl. No. 14/767,895, Office Action dated Mar. 2, 2017, 15 pages.

(56) References Cited

OTHER PUBLICATIONS

U.S. Appl. No. 14/767,884, Office Action dated Mar. 20, 2017, 14 pages.
ZTE, "Discussion on scenarios of 3D beamforming and Massive MIMO," 3GPP TSG RAN WG1 Meeting #72, R1-130140, Jan. 2013, 3 pages.
Gabriel, et al., "Active Antennas for MIMO and beamforming operation," In: Antenna Technology (iWAT), 2013 International Workshop on Karlsruhe: IEEE, Mar. 2013, pp. 394-397.
PCT International Application No. PCT/KR2014/002003, Written Opinion of the International Searching Authority dated Jun. 25, 2014, 11 pages.
PCT International Application No. PCT/KR2014/002001, Written Opinion of the International Earching Authority dated Jun. 25, 2014, 13 pages.
U.S. Appl. No. 14/767,892, Office Action dated May 23, 2017, 105 pages.
The State Intellectual Property Office of the People's Republic of China Application Serial No. 201480014171.8, Office Action dated Dec. 4, 2017, 8 pages.
The State Intellectual Property Office of the People's Republic of China Application Serial No. 201480014183.0, Office Action dated Jan. 10, 2018, 11 pages.
The State Intellectual Property Office of the People's Republic of China Application Serial No. 201480014111.6, Office Action dated Jan. 23, 2018, 8 pages.

\* cited by examiner

FIG. 5
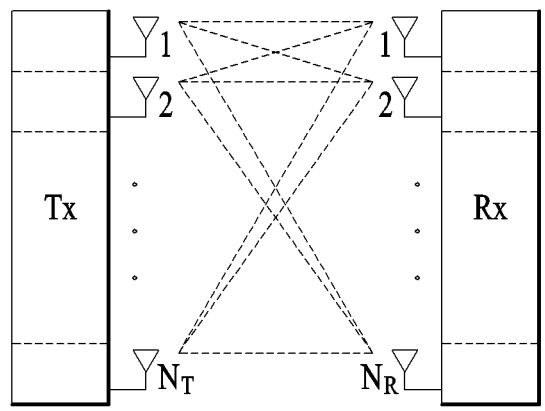
(a)
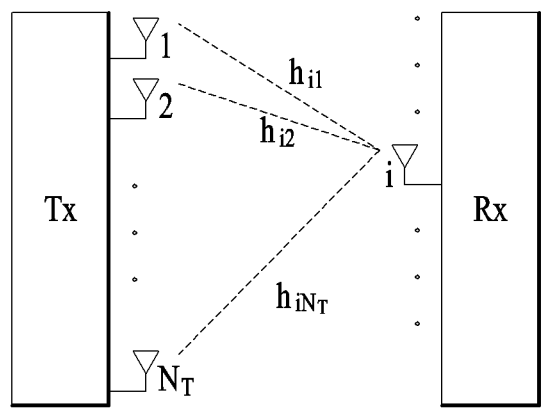
(b)

FIG. 10
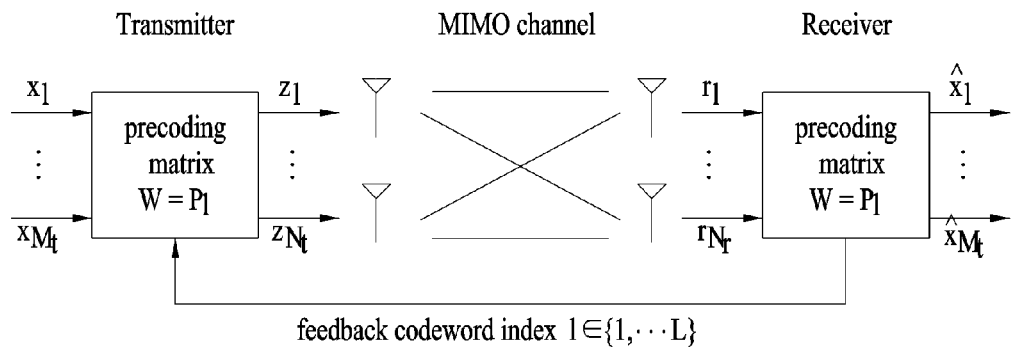
FIG. 11
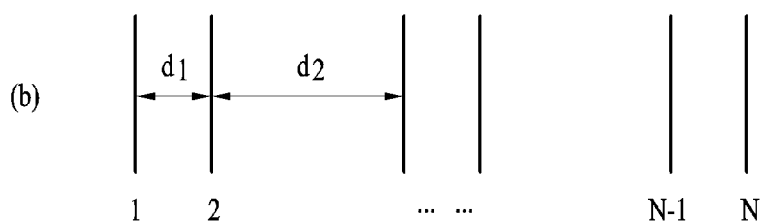
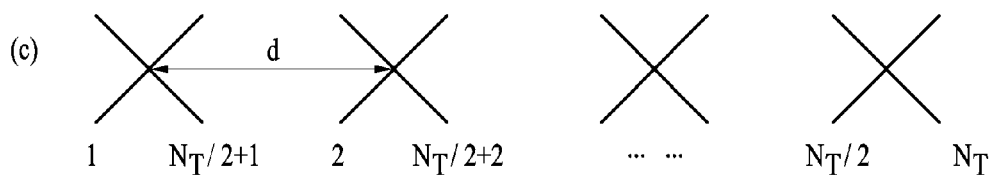

(a)  (b)

(a)                                (b)

FIG. 17
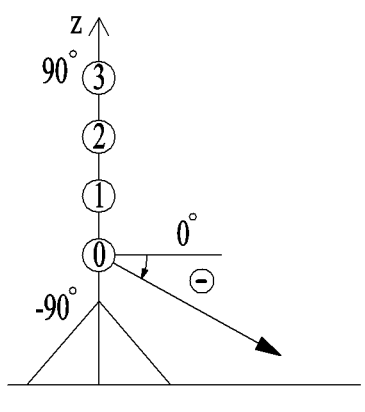
(a)
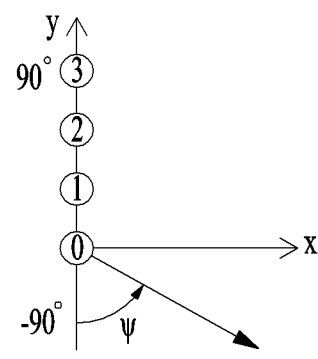
(b)

FIG. 18
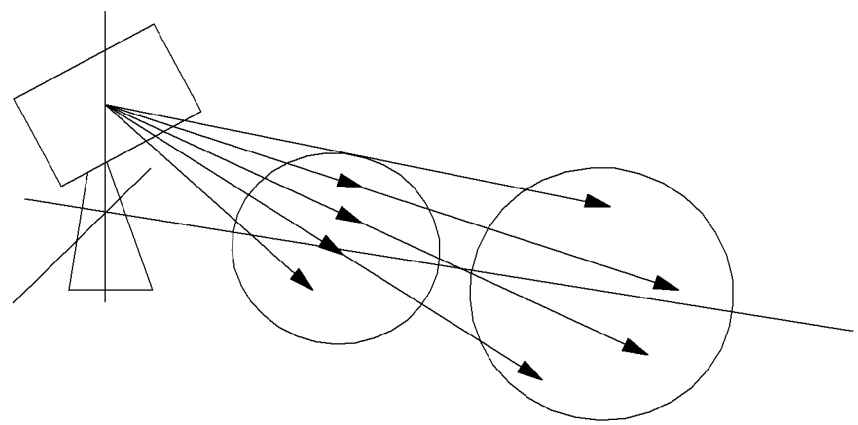
(a)
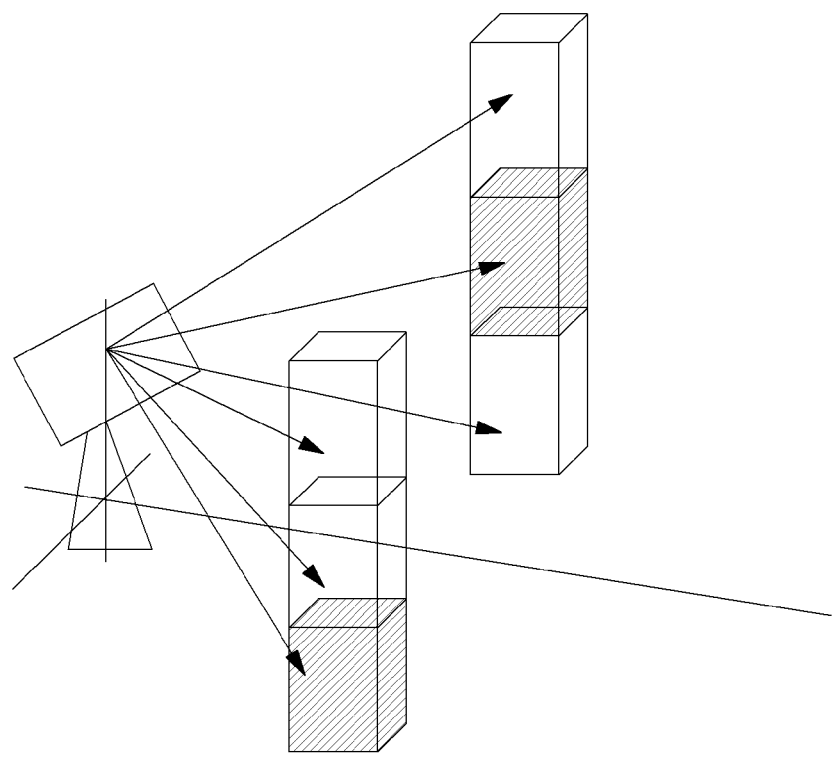
(b)

FIG. 19
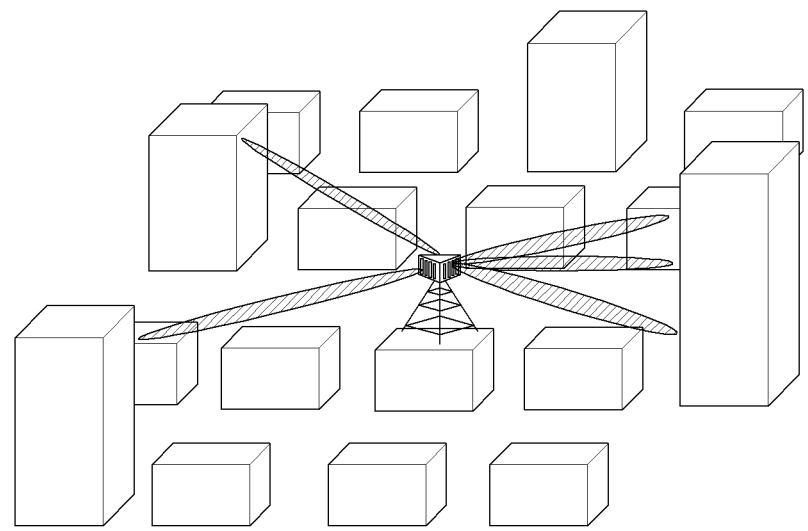
(a)
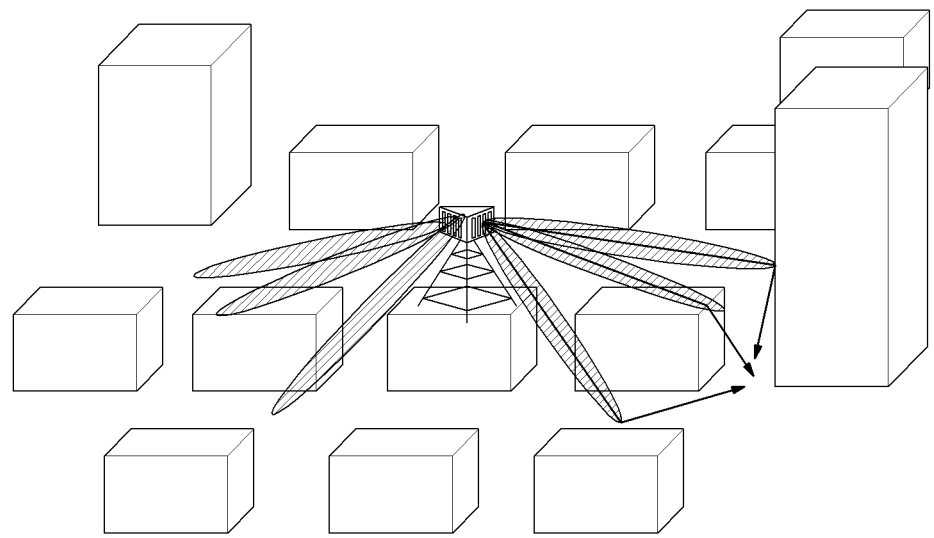
(b)

METHOD AND APPARATUS FOR REPORTING CHANNEL STATE INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2014/001988, filed on Mar. 11, 2014, which claims the benefit of U.S. Provisional Application No. 61/776,720, filed on Mar. 11, 2013, 61/808,191, filed on Apr. 3, 2013, 61/808,220, filed on Apr. 4, 2013 and 61/812,684, filed on Apr. 16, 2013, the contents of which are all hereby incorporated by reference herein in their entirety.

TECHNICAL FIELD

The present invention relates to a wireless communication system and, more particularly, to a method and device for reporting channel state information (CSI).

BACKGROUND ART

Multi-Input Multi-Output (MIMO) technology is capable of improving data transmission/reception efficiency using multiple transmit antennas and multiple receive antennas instead of using a single transmit antenna and a single receive antenna. A receiver using a single antenna receives data through a single antenna path, but a receiver using multiple antennas receives data through multiple paths. Accordingly, data transfer rate and data throughput may be improved, and coverage may be expanded.

To increase multiplexing gain of MIMO operation, a MIMO transmitter may receive and use channel state information (CSI) fed back from a MIMO receiver. The receiver may determine CSI by performing channel measurement using a predetermined reference signal (RS) received from the transmitter.

DISCLOSURE

Technical Problem

An object of the present invention devised to solve the problem lies in a method for generating and reporting channel state information (CSI) to correctly and efficiently support a 2D antenna structure.

It is to be understood that both the foregoing general description and the following detailed description of the present invention are exemplary and explanatory and are intended to provide further explanation of the invention as claimed.

Technical Solution

To achieve these objects and other advantages and in accordance with the purpose of the invention, as embodied and broadly described herein, a method for reporting channel state information (CSI) by a user equipment (UE) in a wireless communication system, the method comprising: receiving a reference signal from a base station (BS); and reporting the CSI generated using the reference signal to the BS, wherein the CSI comprises information indicating a first precoding matrix for a first domain of a 2D antenna structure, and a second precoding matrix for a second domain of the 2D antenna structure, and wherein the first precoding matrix is determined based on a coefficient for determining an angle in the first domain based on an angle in the second domain.

In another aspect of the present invention, a method for receiving channel state information (CSI) by a base station (BS) in a wireless communication system, the method comprising: transmitting a reference signal to a user equipment (UE); and receiving the CSI generated using the reference signal by the UE from the UE, wherein the CSI comprises information indicating a first precoding matrix for a first domain of a 2D antenna structure, and a second precoding matrix for a second domain of the 2D antenna structure, and wherein the first precoding matrix is determined based on a coefficient for determining an angle in the first domain based on an angle in the second domain.

In another aspect of the present invention, a user equipment (UE) for reporting channel state information (CSI) in a wireless communication system, the UE comprising: a transmitter; a receiver; and a processor, wherein the processor is configured to control the receiver to receive a reference signal from a base station (BS), and control the transmitter to report the CSI generated using the reference signal to the BS, wherein the CSI comprises information indicating a first precoding matrix for a first domain of a 2D antenna structure, and a second precoding matrix for a second domain of the 2D antenna structure, and wherein the first precoding matrix is determined based on a coefficient for determining an angle in the first domain based on an angle in the second domain.

In another aspect of the present invention, a base station (BS) for receiving channel state information (CSI) in a wireless communication system, the BS comprising: a transmitter; a receiver; and a processor, wherein the processor is configured to control the transmitter to transmit a reference signal to a user equipment (UE), and control the receiver to receive the CSI generated using the reference signal by the UE from the UE, wherein the CSI comprises information indicating a first precoding matrix for a first domain of a 2D antenna structure, and a second precoding matrix for a second domain of the 2D antenna structure, and wherein the first precoding matrix is determined based on a coefficient for determining an angle in the first domain based on an angle in the second domain.

The following description may be commonly applied to the embodiments of the present invention.

The first precoding matrix is expressed as $W\_h = e^{\wedge}(j \cdot 2\pi \cdot n \cdot c \cdot h/H)/\sqrt{N}$, wherein, N is the number of antennas in the first domain, n is an antenna index in the first domain, H is the number of beams in the first domain, h is a beam index in the first domain, and c is the coefficient.

The second precoding matrix is expressed as $W\_v = e^{\wedge}(j \cdot 2\pi \cdot m \cdot k/K)/\sqrt{M}$, wherein, M is the number of antennas in the second domain, m is an antenna index in the second domain, K is the number of beams in the second domain, and k is a beam index in the second domain.

A direction perpendicular to an antenna array in the second domain corresponds to an angle $\theta = 0°$ in the second domain.

If $-90° \leq \theta \leq 90°$, k has a value between 0 and K.
If $0° \leq \theta \leq 90°$, k has a value between 0 and K/2.
If $-90° \leq \theta \leq 0°$, k has a value between K/2 and K.

A value of the coefficient c is determined based on $c = \sqrt{(1 - \lfloor(2k/K - 1)\rfloor^2)}$.

A value of the coefficient c is set to 1.

A direction perpendicular to an antenna array in the second domain corresponds to an angle $\theta = 0°$ in the second domain, and wherein, in a second codebook comprising one or more candidates of the second precoding matrix for the second domain of the 2D antenna structure, a resolution of the second precoding matrix is set to be low if the angle is close to θ=0° compared to a case in which the angle is close to θ=90°.

A direction perpendicular to an antenna array in the second domain corresponds to an angle θ=0° in the second domain, and wherein, in a first codebook comprising the first precoding matrix for beamforming in the first domain, a resolution of the first precoding matrix is set to be high if the angle has a range of 0°≤θ≤90° compared to a case in which the angle has a range of −90°≤θ≤0°.

The first domain is a horizontal domain, and wherein the second domain is a vertical domain.

It is to be understood that both the foregoing general description and the following detailed description of the present invention are exemplary and explanatory and are intended to provide further explanation of the invention as claimed.

Advantageous Effects

According to the present invention, a new method for generating and reporting channel state information (CSI) to correctly and efficiently support a 2D antenna structure may be provided.

It will be appreciated by persons skilled in the art that the effects that could be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings:

FIG. 5 is a schematic view illustrating a wireless communication system having multiple antennas;

FIG. 10 is a diagram illustrating a basic concept of codebook based precoding;

FIG. 11 is a diagram illustrating examples for configuring 8 transmit antennas;

FIG. 17 is a diagram for describing another definition of angle directions;

FIG. 18 is a diagram illustrating examples of beamforming based on a 2D antenna configuration;

FIG. 19 is a diagram for describing examples of vertical beamforming;

BEST MODE

Figure 1:
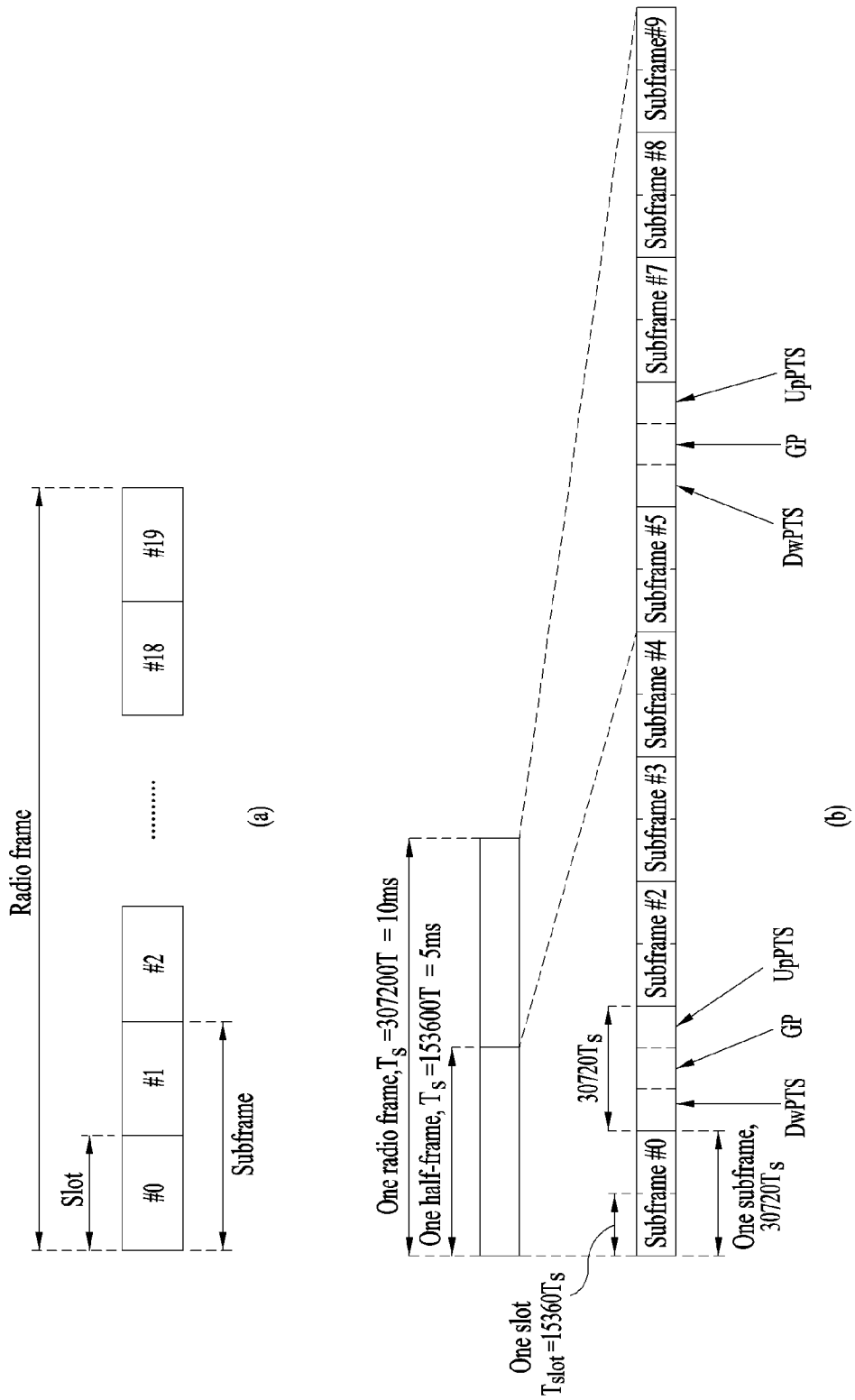
FIG. 1 is a diagram illustrating a structure of a radio frame.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention will be described based on data transmission and reception between a base station and a user equipment. In this case, the base station means a terminal node of a network, which performs direct communication with the user equipment. A specific operation which has been described as being performed by the base station may be performed by an upper node of the base station as the case may be.

In other words, it will be apparent that various operations performed for communication with the user equipment in the network which includes a plurality of network nodes along with the base station may be performed by the base station or network nodes other than the base station. At this time, the 'base station' (BS) may be replaced with terminologies such as a fixed station, Node B, eNode B (eNB), and an access point (AP). Also, a relay may be replaced with terminologies such as a relay node (RN) and a relay station (RS). Also, a 'terminal' may be replaced with terminologies such as a user equipment (UE), a mobile station (MS), a mobile subscriber station (MSS), and a subscriber station (SS).

Specific terminologies used in the following description are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE. WiMAX may be described by the IEEE 802.16e standard (WirelessMAN-OFDMA Reference System) and the advanced IEEE 802.16m standard (WirelessMAN-OFDMA Advanced system). For clarification of the description, although the present invention will be described based on the 3GPP LTE/LTE-A, it is to be understood that technical spirits of the present invention are not limited to the 3GPP LTE/LTE-A.

FIG. 1 is a diagram illustrating a structure of a radio frame.

In a cellular OFDM communication system, uplink/downlink data packet transmission is performed in a subframe unit, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 1(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) is a resource allocation unit and may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel status is unstable like the case where the user equipment moves at high speed, the extended CP may be used to reduce inter-symbol interference.

If the normal CP is used, since one slot includes seven OFDM symbols, one subframe includes 14 OFDM symbols. At this time, first two or three OFDM symbols of each subframe may be allocated to a physical downlink control channel (PDCCH), and the other OFDM symbols may be allocated to a physical downlink shared channel (PDSCH).

FIG. 1(b) is a diagram illustrating a structure of a type 2 radio frame. The type 2 radio frame includes two half frames, each of which includes five subframes, a downlink pilot time slot (DwPTS), a guard period (GP), and an uplink pilot time slot (UpPTS). One subframe includes two slots. The DwPTS is used for initial cell search, synchronization or channel estimation at the user equipment. The UpPTS is used for channel estimation at the base station and uplink transmission synchronization of the user equipment. Also, the guard period is to remove interference occurring in the uplink due to multipath delay of downlink signals between the uplink and the downlink. Meanwhile, one subframe includes two slots regardless of the type of the radio frame.

The structure of the radio frame is only exemplary, and various modifications may be made in the number of subframes included in the radio frame, the number of slots included in the subframe, or the number of symbols included in the slot.

Figure 2:
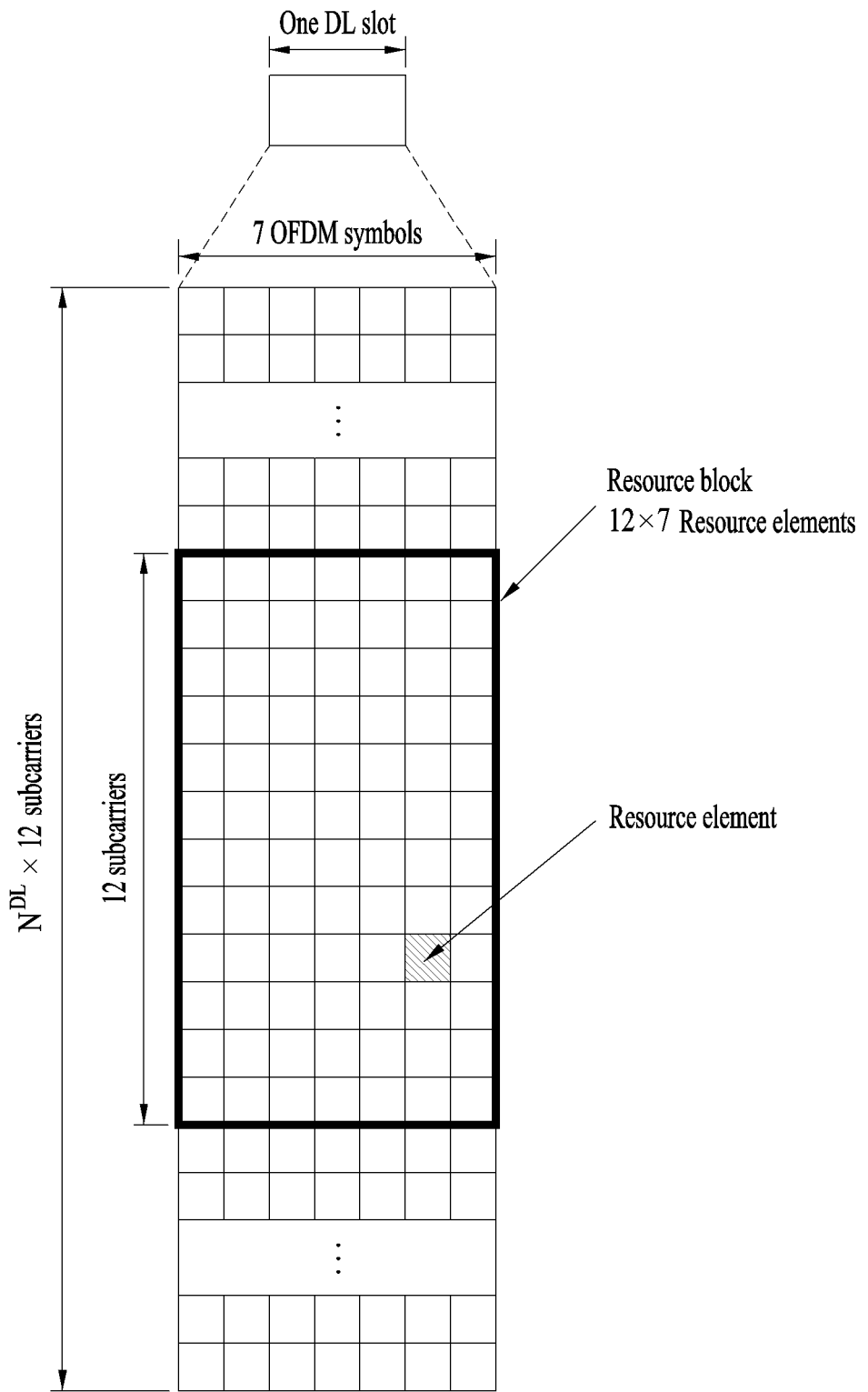
FIG. 2 is a diagram illustrating a resource grid at a downlink slot.

FIG. 2 is a diagram illustrating a resource grid at a downlink slot.

One downlink slot includes, but not limited to, seven OFDM symbols in a time domain, and one resource block (RB) includes, but not limited to, twelve subcarriers in a frequency domain. For example, although one slot includes seven OFDM symbols in case of the normal CP, one slot may include six OFDM symbols in case of the extended CP. Each element on the resource grid will be referred to as a resource element (RE). One resource block (RB) includes 12×7(6) resource elements. The number $N_{DL}$ of resource blocks (RBs) included in the downlink slot depends on a downlink transmission bandwidth. A structure of an uplink slot may be the same as that of the downlink slot.

Figure 3:
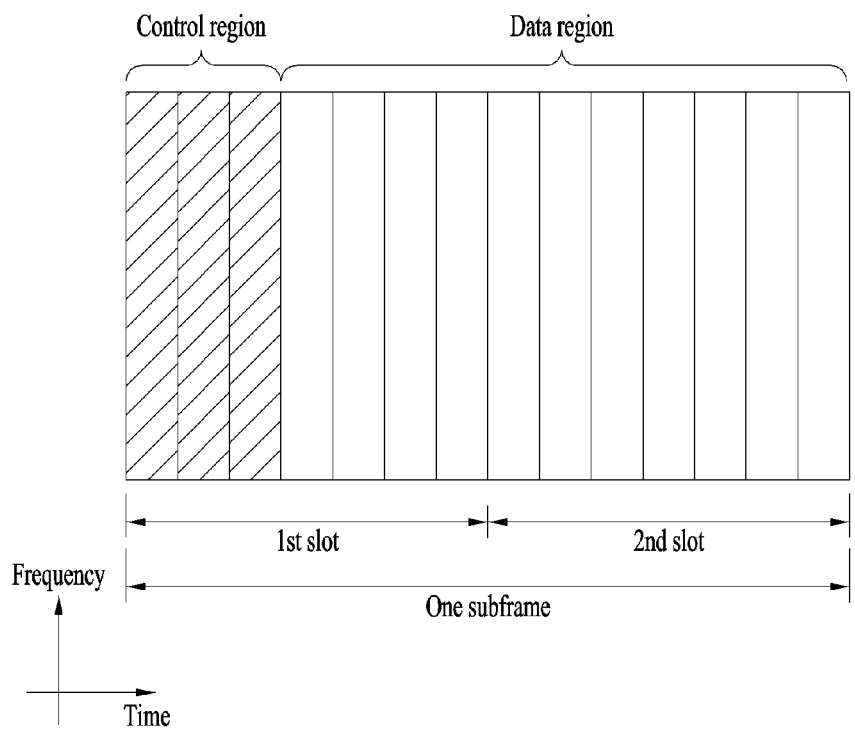
FIG. 3 is a diagram illustrating a structure of a downlink subframe.

FIG. 3 is a diagram illustrating a structure of a downlink subframe.

Maximum three OFDM symbols located at the front of the first slot within one subframe correspond to a control region to which a control channel is allocated. The other OFDM symbols correspond to a data region to which a physical downlink shared channel (PDSCH) is allocated.

Examples of the downlink control channel used in the 3GPP LTE system include a PCFICH (Physical Control Format Indicator CHannel), a PDCCH (Physical Downlink Control CHannel), and a PHICH (Physical Hybrid ARQ Indicator CHannel). The PCFICH is transmitted from the first OFDM symbol of the subframe, and includes information on the number of OFDM symbols used for transmission of the control channel within the subframe. The PHICH is a response to uplink transmission, and includes HARQ ACK/NACK (acknowledgement/negative-acknowledgement) signal. The control information transmitted through the PDCCH will be referred to as downlink control information (DCI). The DCI includes uplink or downlink scheduling information or uplink transmission (Tx) power control command for a random user equipment group. The PDCCH includes transport format and resource allocation information of a downlink shared channel (DL-SCH), resource allocation information of an uplink shared channel (UL-SCH), paging information of a paging channel (PCH), system information on the DL-SCH, resource allocation information of an upper layer control message such as a random access response transmitted onto the PDSCH, a set of transmission power control commands of an individual user equipment within a random user equipment group, transmission power control information, and activation of voice over Internet protocol (VoIP). A plurality of PDCCHs may be transmitted within the control region, and the user equipment may monitor the plurality of PDCCHs.

The PDCCH is transmitted by aggregation of one or more continuous control channel elements (CCEs). The CCE is a logic allocation unit used to provide a PDCCH at a predetermined coding rate based on the status of a radio channel. The CCE corresponds to a plurality of resource element groups (REGs). The format of the PDCCH and the number of available bits of the PDCCH are determined depending on the correlation between the number of CCEs and the coding rate provided by the CCE.

The base station determines a PDCCH format depending on the DCI transmitted to the user equipment, and attaches cyclic redundancy check (CRC) to the control information. The CRC is masked with a radio network temporary identifier (RNTI) depending on owner or usage of the PDCCH. For example, if the PDCCH is for a specific user equipment, the CRC may be masked with cell-RNTI (C-RNTI) of the corresponding user equipment. If the PDCCH is for a paging message, the CRC may be masked with a paging indicator identifier (P-RNTI). If the PDCCH is for system information (in more detail, system information block (SIB)), the CRC may be masked with system information identifier and system information RNTI (SI-RNTI). The CRC may be masked with a random access RNTI (RA-RNTI) to indicate a random access response that is a response to transmission of a random access preamble of the user equipment.

Figure 4:
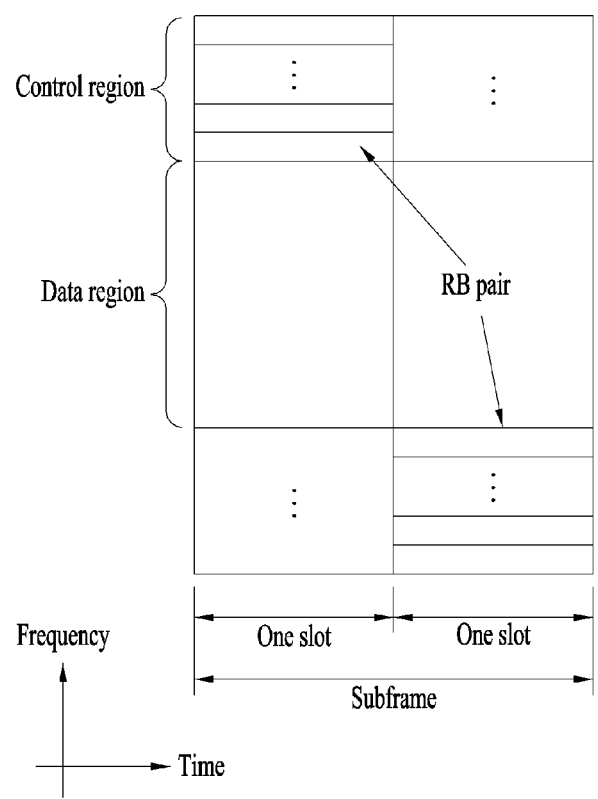
FIG. 4 is a diagram illustrating a structure of an uplink subframe.

FIG. 4 is a diagram illustrating a structure of an uplink subframe.

The uplink subframe may be divided into a control region and a data region on a frequency domain. A physical uplink control channel (PUCCH) which includes uplink control information is allocated to the control region. A physical uplink shared channel (PUSCH) which includes user data is allocated to the data region. In order to maintain single carrier features, one user equipment does not transmit the PUCCH and the PUSCH at the same time. The PUCCH for one user equipment is allocated to resource block (RB) pair for the subframe. Resource blocks (RBs) belonging to the RB pair reserve different subcarriers for two slots. The RB pair allocated to the PUCCH is subjected to frequency hopping at a slot boundary.

Modeling of MIMO System

FIG. 5 is a schematic view illustrating a wireless communication system having multiple antennas.

As shown in FIG. 5(a), if the number of transmitting antennas is increased to NT and the number of receiving antennas is increased to NR, channel transmission capacity is increased theoretically in proportion to the number of antennas unlike that a plurality of antennas are used in only a transmitter or a receiver. Accordingly, it is possible to improve a transmission rate and remarkably improve frequency efficiency. As channel transmission capacity is increased, a transmission rate may be increased theoretically as much as a value obtained by multiplying a maximum transmission rate R0, which corresponds to a case where a single antenna is used, by an increase rate Ri.

$$R_i = \min(N_T, N_R) \quad \text{[Equation 1]}$$

For example, in a MIMO communication system that uses four transmitting antennas and four receiving antennas, a transmission rate theoretically four times greater than that of a single antenna system may be obtained. After theoretical capacity increase of the MIMO system has been proved in the middle of 1990, various technologies have been actively studied to substantially improve a data transmission rate. Also, some of the technologies have been already reflected in the standard of various wireless communications such as third generation mobile communication and next generation wireless LAN.

Upon reviewing the recent trend of studies related to the MIMO system, active studies are ongoing in view of various aspects such as the study of information theoretical aspect related to MIMO communication capacity calculation under various channel environments and multiple access environments, the study of radio channel measurement and modeling of a MIMO system, and the study of time space signal processing technology for improvement of transmission reliability and transmission rate.

A communication method in a MIMO system will be described in more detail with reference to mathematical modeling. In the MIMO system, it is assumed that NT transmitting antennas and NR receiving antennas exist.

First of all, a transmitting signal will be described. If there exist NT transmitting antennas, the number of maximum transmission information is NT. The transmission information may be expressed as follows.

$$s = [s_1, s_2, \ldots, s_{N_T}]^T \quad \text{[Equation 2]}$$

Different kinds of transmission power may be applied to each of the transmission information $s_1, s_2, \ldots, s_{N_T}$. At this time, supposing that each transmission power is $P_1, P_2, \ldots, P_{N_T}$, transmission information of which transmission power is controlled may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Also, $\hat{S}$ may be expressed as follows using a diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

It is considered that a weight matrix W is applied to the information vector $\hat{S}$ of which transmission power is controlled, so as to obtain NT transmitting signals $x_1, x_2, \ldots, x_{N_T}$. In this case, the weight matrix W serves to properly distribute the transmission information to each antenna. Such transmitting signals $x_1, x_2, \ldots, x_{N_T}$ may be expressed as follows using a vector X.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

[Equation 5]

In this case, $W_{ij}$ means a weight value between the ith transmitting antenna and the jth information. W may be referred to as a precoding matrix.

If there exist NR receiving antennas, receiving signals $y_1$, $y_2$, ..., $y_{N_R}$ of the respective antennas may be expressed by a vector as follows.

$$y = [y_1, y_2, \ldots, y_{N_R}]^T \quad \text{[Equation 6]}$$

In case of channel modeling in the MIMO communication system, channels may be classified depending on indexes of transmitting and receiving antenna indexes. In this case, a channel that passes from the jth transmitting antenna to the ith receiving antenna will be expressed as $h_{ij}$. It is noted that index of the receiving antenna is prior to index of the transmitting antenna in index of $h_{ij}$.

Meanwhile, FIG. 5(b) illustrates channels from NT transmitting antennas from the receiving antenna i. Several channels may be grouped into one and then may be expressed by a vector type or a matrix type. As shown in FIG. 5(b), the channels from NT transmitting antennas to the ith receiving antenna may be expressed as follows.

$$h_i^T = [h_{i1}, h_{i2}, \ldots, h_{iN_T}] \quad \text{[Equation 7]}$$

Accordingly, all channels from NT transmitting antennas to NR receiving antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

Since additive white Gaussian noise (AWGN) is actually added to the channels after the above channel matrix H. AWGN $n_1, n_2, \ldots, n_{N_R}$ added to each of the NR receiving antennas may be expressed as follows.

$$n = [n_1, n_2, \ldots, n_{N_R}]^T \quad \text{[Equation 9]}$$

The receiving signals obtained using the above equation modeling may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$

[Equation 10]

$$Hx + n$$

In the meantime, the number of rows and columns of the channel matrix H indicating the channel state is determined by the number of transmitting antennas and the number of receiving antennas. The number of rows in the channel matrix H is the same as the number NR of receiving antennas, and the number of columns is the same as the number NT of transmitting antennas. In other words, the channel matrix H may be expressed by NR×NT matrix.

A rank of the matrix is defined by a minimum number of the number of rows and the number of columns, which are independent from each other. Therefore, the rank of the matrix cannot have a value greater than the number of rows or the number of columns. Rank (rank(H)) of the channel matrix H may be limited as follows.

$$\text{rank}(H) \leq \min(N_T, N_R) \quad \text{[Equation 11]}$$

The rank may also be defined by the number of eigen values not 0 when eigen value decomposition is performed for the matrix. Similarly, the rank may be defined by the number of singular values not 0 when singular value decomposition (SVD) is performed for the matrix. Accordingly, in the channel matrix, the rank may physically mean a maximum number of columns or rows that may transmit different kinds of information from a given channel.

In this specification, 'Rank' for MIMO transmission represents the number of paths that may transmit a signal independently at a specific time and a specific frequency resource, and 'the number of layers' represents the number of signal streams transmitted through each path. Generally, since the transmitter transmits layers corresponding to the number of ranks used for signal transmission, the ranks are the same as the number of layers unless mentioned otherwise.

Reference Signal (RS)

When a packet is transmitted in the wireless communication system, signal distortion may occur during transmission of the packet because the packet is transmitted through a radio channel. In order to normally receive the distorted signal, a receiver should correct distortion of the received signal by using channel information. In order to discover the channel information, it is required to transmit the signal known by both a transmitter and the receiver and discover the channel information using a distortion level of the signal when the signal is transmitted through the channel. In this case, the signal known by both the transmitter and the receiver will be referred to as a pilot signal or a reference signal.

In case that the transmitter or the receiver of the wireless communication system transmits and receives data by using multiple antennas, a channel status between each transmitter and each receiver should be known to receive a normal signal. Accordingly, a separate reference signal should be provided per transmitting antenna.

In the wireless communication system, the reference signal (RS) may be divided into two types in accordance with its purpose. Examples of the reference signal include a reference signal used for acquisition of channel information and a reference signal used for data demodulation. Since the former reference signal is intended for acquisition of channel information on the downlink through the user equipment, it needs to be transmitted through a wideband. Also, the former reference signal should be received and measured even by a user equipment that does not receive downlink data for a specific subframe. This reference signal for acquisition of channel information may be used even for measurement of handover. The latter reference signal is transmitted from the base station together with a corresponding resource when the base station transmits downlink data. In this case, the user equipment may perform channel estimation by receiving the corresponding reference signal, whereby the user equipment may demodulate the data. This reference signal for data demodulation should be transmitted to a region to which data are transmitted.

The existing 3GPP LTE system (for example, 3GPP LTE release-8) defines two types of downlink RSs for unicast service. The one of the downlink reference signals is a common reference signal (CRS), and the other one is a dedicated reference signal (DRS). The CRS is used for both information acquisition of channel status and measurement for handover, and may be referred to as a cell-specific RS. The DRS is used for data demodulation, and may be referred to as a UE-specific RS. In the existing 3GPP LTE system, the DRS may be used for data demodulation only, and the CRS may be used for both acquisition of channel information and data demodulation.

The CRS is a cell-specific RS and is transmitted to a wideband per subframe. The CRS for maximum four antenna ports may be transmitted in accordance with the number of transmitting antennas of the base station. For example, if the number of transmitting antennas of the base station is 2, CRS for antenna ports 0 and 1 may be transmitted. If the number of transmitting antennas of the base station is 4, CRS for antenna ports 0 to 3 may be transmitted respectively.

Figure 6:
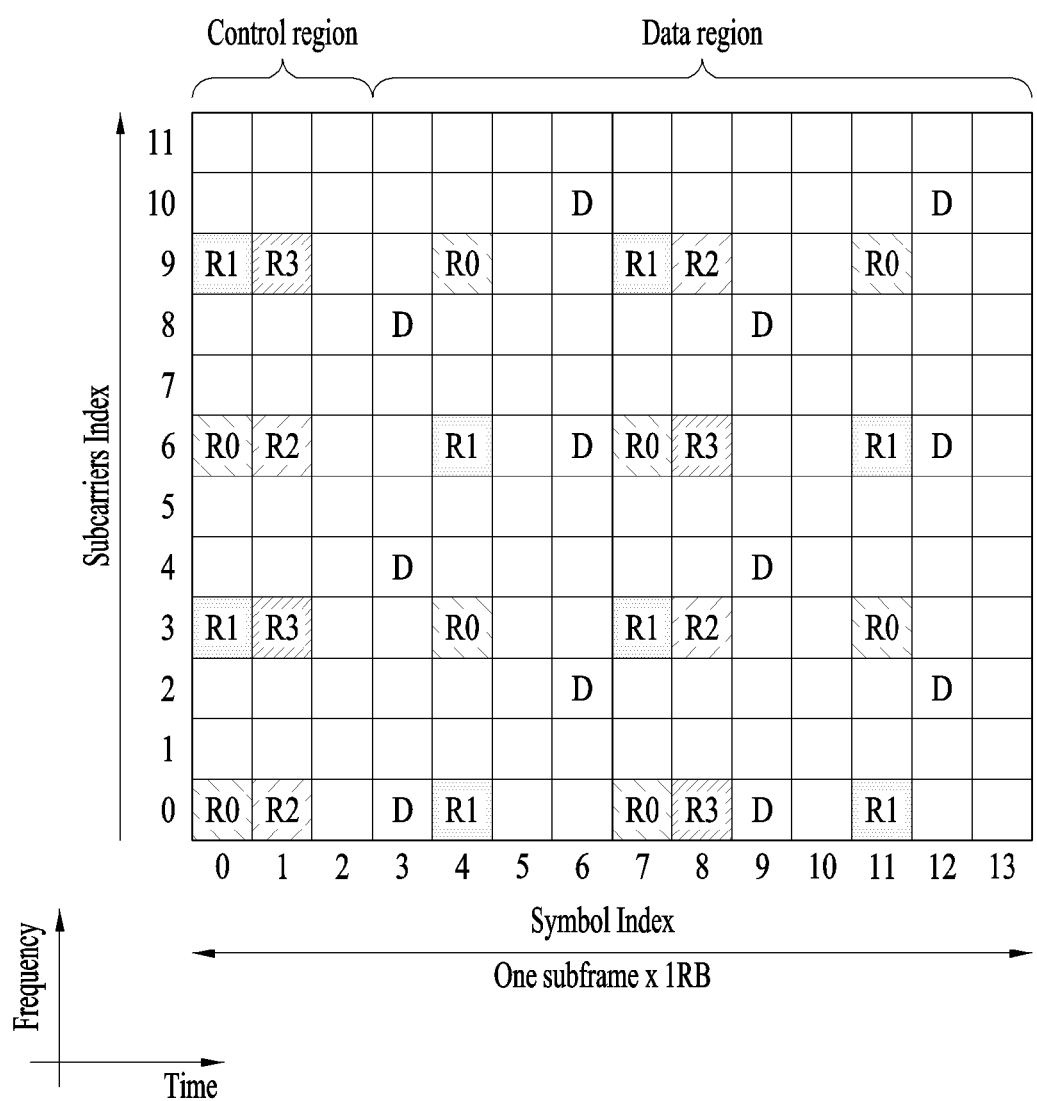
FIG. 6 is a diagram illustrating an exemplary pattern of CRS and DRS on one resource block pair.

FIG. 6 is a diagram illustrating an exemplary pattern of CRS and DRS on one resource block pair.

In the example of the reference signal pattern in FIG. 6, patterns of CRS and DRS are provided on one resource block pair (in case of normal CP, 14 OFDM symbols on the time×12 subcarriers on the frequency) in the system that the base station supports four transmitting antennas. In FIG. 6, resource elements remarked with 'R0', 'R1', 'R2' and 'R3' represent positions of the CRS for antenna port indexes 0, 1, 2 and 3. Meanwhile, in FIG. 6, a resource element marked with 'D' represents the position of the DRS defined in the LTE system.

The LTE-A system which is an evolved version of the LTE system may support maximum eight transmitting antennas on the downlink. Accordingly, reference signals for maximum eight transmitting antennas should also be supported. In the LTE system, since downlink reference signals are defined for maximum four antenna ports only, if the base station includes minimum four downlink transmitting antennas to maximum eight downlink transmitting antennas in the LTE-A system, reference signals for these antenna ports should additionally be defined. The reference signals for maximum eight transmitting antenna ports may be considered for two types of reference signals, i.e., the reference signal for channel measurement and the reference signal for data demodulation as described above.

One of important considerations in designing the LTE-A system is backward compatibility. Backward compatibility means that the LTE user equipment of the related art should be operated normally even in the LTE-A system. In view of reference signal transmission, if reference signals for maximum eight transmitting antenna ports should be defined additionally in the time-frequency domain to which CRS defined in the LTE standard is transmitted to a full band every subframe, RS overhead becomes too great. Accordingly, it should be considered that RS overhead is reduced in newly designing RS for maximum eight antenna ports.

The reference signal newly introduced in the LTE-A system may be divided into two types. One of the reference signals is a channel status information-reference signal (CSI-RS) which is the RS for channel measurement for selecting transmission rank, modulation and coding scheme (MCS), and precoding matrix index (PMI), and the other one is a demodulation RS (DMRS) which is the RS for demodulation of data transmitted through maximum eight transmitting antennas.

The CSI-RS for channel measurement is designed for channel measurement mainly unlike the existing CRS used for channel measurement, handover measurement, and data demodulation. The CSI-RS may also be used for handover measurement. Since the CSI-RS is transmitted only to obtain channel status information, it may not be transmitted per subframe unlike the CRS of the existing LTE system. Accordingly, in order to reduce overhead of the CSI-RS, the CSI-RS may be designed to be intermittently (for example, periodically) be transmitted on the time axis.

If data are transmitted on a random downlink subframe, a dedicated DMRS is transmitted to the user equipment for which data transmission is scheduled. In other words, the DMRS may be referred to as a UE-specific RS. The DMRS dedicated for a specific user equipment may be designed to be transmitted from only the resource region for which the corresponding user equipment is scheduled, that is, the time-frequency domain to which data for the corresponding user equipment are transmitted.

Figure 7:
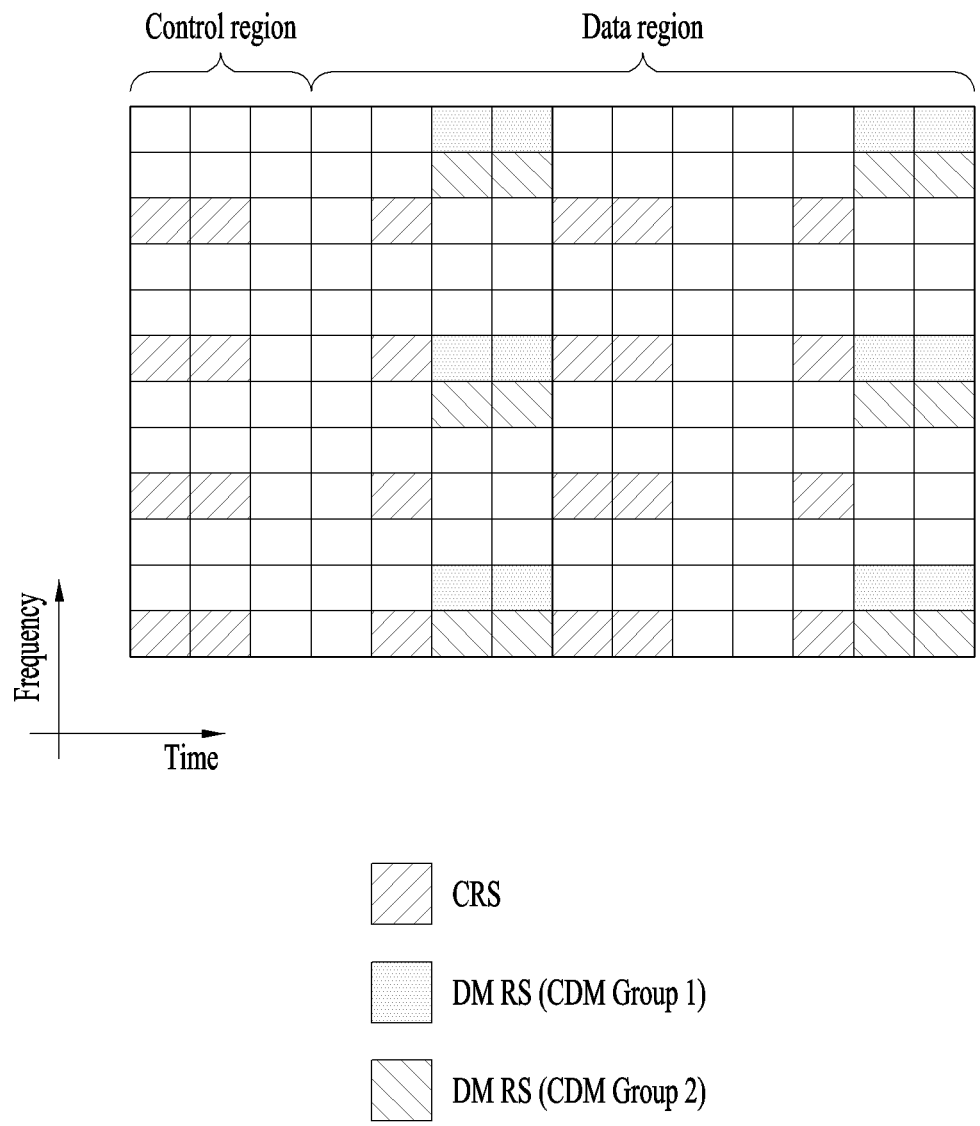
FIG. 7 is a diagram illustrating an example of DMRS pattern defined in the LTE-A system.

FIG. 7 is a diagram illustrating an example of DMRS pattern defined in the LTE-A system.

FIG. 7 illustrates a position of a resource element where DMRSs are transmitted on one resource block pair (in case of normal CP, 14 OFDM symbols on the time×12 subcarriers on the frequency) to which downlink data are transmitted. The DMRS may be transmitted four antenna ports (antenna port indexes 7, 8, 9 and 10) defined additionally in the LTE-A system. The DMRSs for different kinds of antenna ports may be identified from one another in such a manner that they are located on different frequency resources (subcarriers) and/or different time resources (OFDM symbols) (that is, the DMRSs may be multiplexed in accordance with FDM and/or TDM mode). Also, the DMRSs for different antenna ports located on the same time-frequency resource may be identified from one another by orthogonal codes (that is, the DMRSs may be multiplexed in accordance with CDM mode). In the example of FIG. 7, the DMRSs for the antenna ports 7 and 8 may be located on the resource elements (REs) of DMRS CDM group 1, and may be multiplexed by orthogonal codes. Likewise, in the example of FIG. 7, the DMRSs for the antenna ports 9 and 10 may be located on the resource elements (REs) of DMRS CDM group 2, and may be multiplexed by orthogonal codes.

When the base station transmits the DMRS, the same precoding as that applied to data is applied to the DMRS. Accordingly, channel information estimated by the user equipment using the DMRS (or UE-specific RS) is the precoded channel information. The user equipment may easily perform data demodulation by using the precoded channel information estimated through the DMRS. However, since the user equipment cannot know the precoding information applied to the DMRS, the user equipment cannot acquire channel information, which is not precoded, from the DMRS. The user equipment may acquire channel information, which is not precoded, by using a separate reference signal in addition to the DMRS, that is, the aforementioned CSI-RS.

Figure 8:
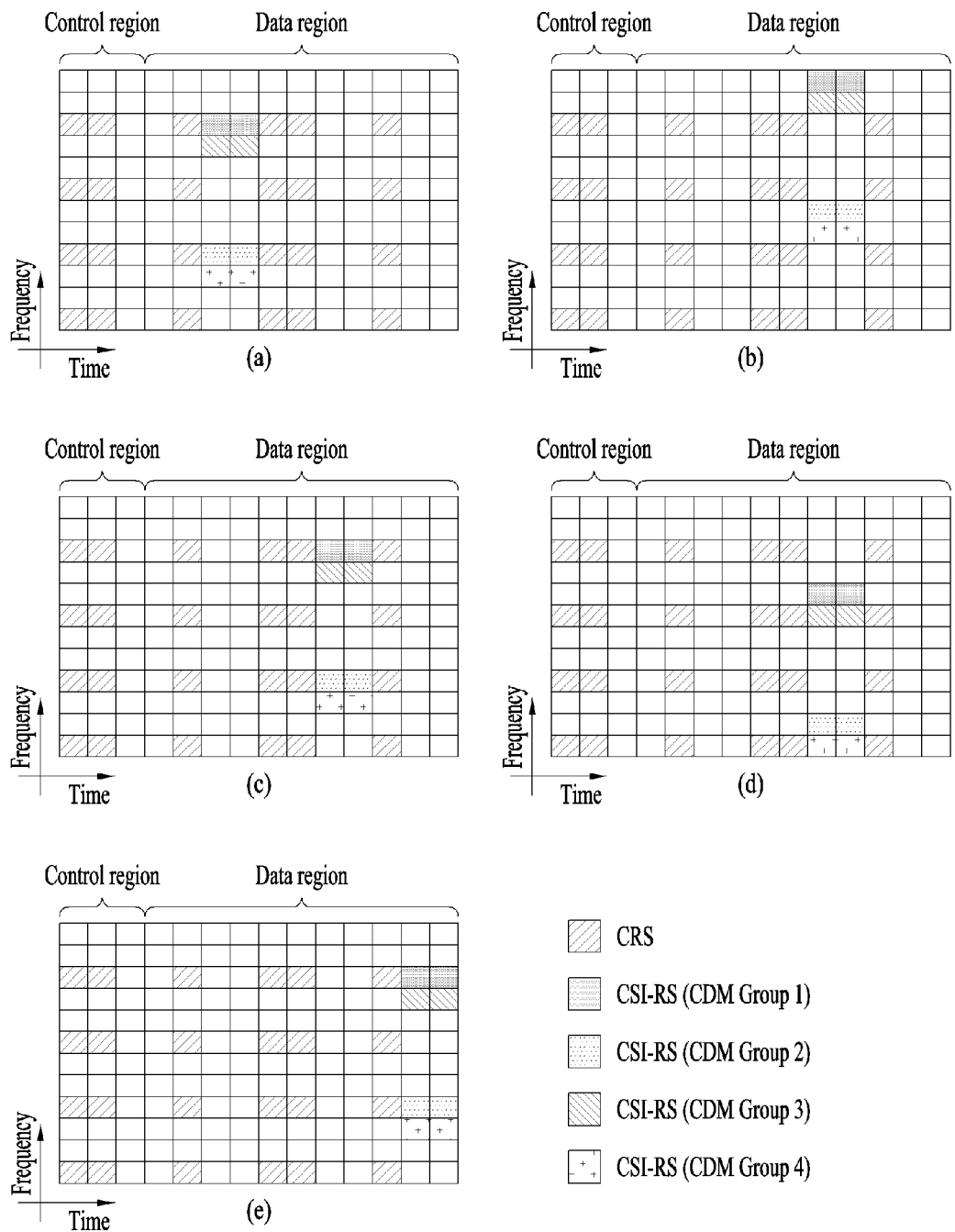
FIG. 8 is a diagram illustrating examples of CSI-RS patterns defined in the LTE-A system.

FIG. 8 is a diagram illustrating examples of CSI-RS patterns defined in the LTE-A system.

FIG. 8 illustrates a position of a resource element where CSI-RSs are transmitted on one resource block pair (in case of normal CP, 14 OFDM symbols on the time×12 subcarriers on the frequency) to which downlink data are transmitted. One of CSI-RS patterns in FIG. 8(a) to FIG. 8(e) may be used for a random downlink subframe. The CSI-RS may be transmitted for eight antenna ports (antenna port indexes 15, 16, 17, 18, 19, 20, 21 and 22) defined additionally in the LTE-A system. The CSI-RSs for different antenna ports may be identified from one another in such a manner that they are located on different frequency resources (subcarriers) and/or different time resources (OFDM symbols) (that is, the CSI-RSs may be multiplexed in accordance with FDM and/or TDM mode). Also, the CSI-RSs for different antenna ports located on the same time-frequency resource may be identified from one another by orthogonal codes (that is, the CSI-RSs may be multiplexed in accordance with CDM mode). In the example of FIG. 8(a), the CSI-RSs for the antenna ports 15 and 16 may be located on the resource elements (REs) of CSI-RS CDM group 1, and may be multiplexed by orthogonal codes. In the example of FIG. 8(a), the CSI-RSs for the antenna ports 17 and 18 may be located on the resource elements (REs) of CSI-RS CDM group 2, and may be multiplexed by orthogonal codes. In the example of FIG. 8(a), the CSI-RSs for the antenna ports 19 and 20 may be located on the resource elements (REs) of CSI-RS CDM group 3, and may be multiplexed by orthogonal codes. In the example of FIG. 8(a), the CSI-RSs for the antenna ports 21 and 22 may be located on the resource elements (REs) of CSI-RS CDM group 4, and may be multiplexed by orthogonal codes. The same principle described based on FIG. 8(a) may be applied to FIG. 8(b) to FIG. 8(e).

The RS patterns of FIGS. 6 and 8 are only exemplary, and various embodiments of the present invention are not limited to a specific RS pattern. In other words, various embodiments of the present invention may equally be applied to even a case where RS pattern different from those of FIGS. 6 and 8 is defined and used.

CSI-RS Configuration

As described above, in the LTE-A system that supports maximum eight transmitting antennas on the downlink, the base station should transmit CSI-RSs for all antenna ports. Since transmission of the CSI-RSs for maximum eight transmitting antenna ports every subframe has a drawback in that overhead is too great, the CSI-RSs should be transmitted intermittently on the time axis without being transmitted every subframe, to reduce overhead. Accordingly, the CSI-RSs may be transmitted periodically at a period of integer multiple of one subframe or may be transmitted at a specific transmission pattern.

At this time, the transmission period or transmission pattern of the CSI-RS may be configured by the network (for example, base station). In order to perform measurement based on the CSI-RS, the user equipment should know CSI-RS configuration for each antenna port of a cell (or transmission point (TP)) to which the user equipment belongs. CSI-RS configuration may include downlink subframe index for which the CSI-RS is transmitted, time-frequency positions (for example, CSI-RS patterns the same as those of FIG. 8(a) to FIG. 8(e)) of CSI-RS resource elements (REs) within a transmission subframe, and CSI-RS sequence (used for CSI-RS and generated pseudo-randomly in accordance with a predetermined rule on the basis of slot number, cell ID, CP length, etc.). In other words, a plurality of CSI-RS configurations may be used by a given base station, and the base station indicate CSI-RS configuration, which will be used for user equipment(s) within a cell, among the plurality of CSI-RS configurations.

The plurality of CSI-RS configurations may include or not include one CSI-RS configuration assumed by the user equipment that transmission power of the CSI-RS is not 0 (non-zero). Also, the plurality of CSI-RS configurations may include or not include one or more CSI-RS configurations assumed by the user equipment that transmission power of the CSI-RS is 0.

Also, each bit of parameters (for example, 16-bit bitmap ZeroPowerCSI-RS parameter) for CSI-RS configuration of the transmission power of 0 may correspond to CSI-RS configuration (or REs to which the CSI-RS may be allocated in accordance with CSI-RS configuration) in accordance with an upper layer, and the user equipment may assume that the transmission power at the CSI-RS REs of CSI-RS configuration corresponding to a bit set to 1 in the corresponding parameter is 0.

Also, since the CSI-RSs for the respective antenna ports are required to be identified from one another, resources to which the CSI-RSs for the respective antenna ports are transmitted should be orthogonal to one another. As described with reference to FIG. 8, the CSI-RSs for the respective antenna ports may be multiplexed in accordance with FDM, TDM and/or CDM mode by using orthogonal frequency resources, orthogonal time resources and/or orthogonal code resources.

When the base station notifies the user equipment within the cell of CSI-RS information (CSI-RS configuration), the base station should first notify the user equipment of time-frequency information into which the CSI-RSs for the respective antenna ports are mapped. In more detail, the time information may include subframe numbers to which the CSI-RSs are transmitted, a transmission period of CSI-RSs, offset of subframe to which the CSI-RSs are transmitted, and OFDM symbol number to which CSI-RS resource element (RE) of a specific antenna is transmitted. The frequency information may include frequency spacing to which CSI-RS resource element (RE) of a specific antenna is transmitted, offset or shift value of RE on a frequency axis, etc.

Figure 9:
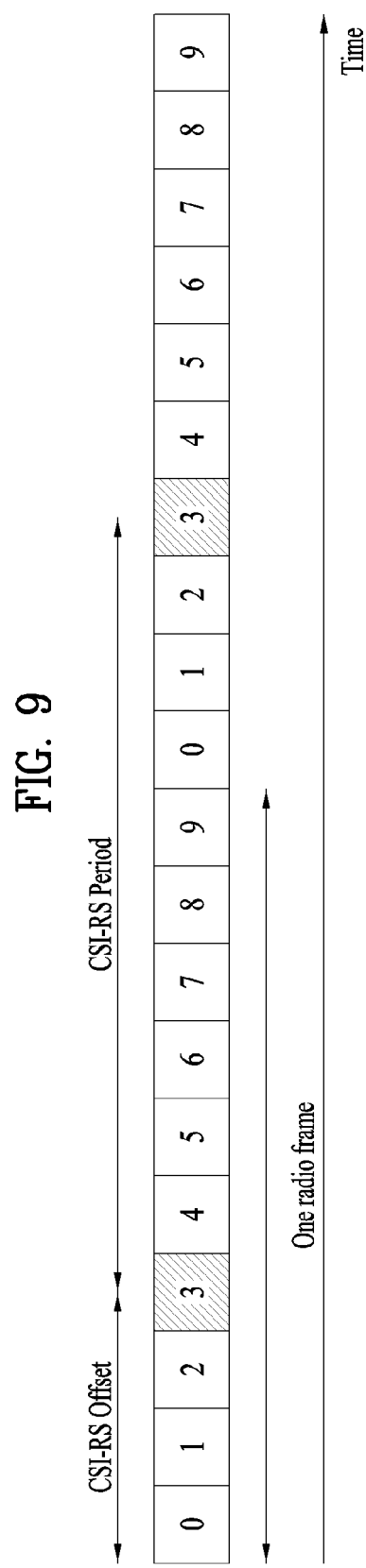
FIG. 9 is a diagram illustrating an example of a method for periodically transmitting CSI-RS.

FIG. 9 is a diagram illustrating an example of a method for periodically transmitting CSI-RS.

The CSI-RS may be transmitted at a period of integer multiple (for example, 5-subframe period, 10-subframe period, 20-subframe period, 40-subframe period, or 80-subframe period) of one subframe.

In FIG. 9, one radio frame includes 10 subframes (subframe numbers 0 to 9). For example, in FIG. 9, a transmission period of the CSI-RS of the base station is 10 ms (that is, 10 subframes), and CSI-RS transmission offset is 3. The offset value may be varied depending on respective base stations such that the CSI-RSs of several cells may uniformly be distributed on the time. If the CSI-RS is transmitted at a period of 10 ms, the offset value may have one of 0 to 9. Similarly, if the CSI-RS is transmitted at a period of 5 ms, the offset value may have one of 0 to 4, if the CSI-RS is transmitted at a period of 20 ms, the offset value may have one of 0 to 19, if the CSI-RS is transmitted at a period of 40 ms, the offset value may have one of 0 to 39, and if the CSI-RS is transmitted at a period of 80 ms, the offset value may have one of 0 to 79. This offset value represents a value of subframe at which the base station starts CSI-RS transmission at a predetermined period. If the base station notifies the user equipment of the transmission period and offset value of the CSI-RS, the user equipment may receive the CSI-RS of the base station at the corresponding subframe position by using the corresponding value. The user equipment may measure a channel through the received CSI-RS and, as a result, report information such as CQI, PMI and/or RI (Rank Indicator) to the base station. In this specification, CQI, PMI, and RI may be referred to as CQI (or CSI) except that they are described separately. Also, the information related to the CSI-RS may commonly be applied to the user equipments within the cell as cell-specific information. Also, the CSI-RS transmission period and offset may be designated separately for each CSI-RS configuration. For example, separate CSI-RS transmission period and offset may be set to the CSI-RS configuration indicating CSI-RS transmitted at a transmission power of 0 as described later and CSI-RS configuration indicating CSI-RS transmitted at a transmission power of non-zero.

Unlike the CRS transmitted at all the subframes at which the PDSCH may be transmitted, the CSI-RS may be set such that the CSI-RS is transmitted at some subframes only. For example, CSI subframe sets C$_{CSI,0}$ and C$_{CSI,1}$ may be configured by the upper layer. CSI reference resource (that is, predetermined resource region which becomes a reference of CSI calculation) may belong to either C$_{CSI,0}$ or C$_{CSI,1}$, or may not belong to both C$_{CSI,0}$ and C$_{CSI,1}$. Accordingly, if the CSI subframe sets C$_{CSI,0}$ and C$_{CSI,1}$ are configured by the upper layer, the user equipment may not expect that CSI reference resource existing at a subframe that does not belong to any one of the CSI subframe sets will be triggered (or indication of CSI calculation).

Also, the CSI reference resource may be set on a valid downlink subframe. The valid downlink subframe may be set as a subframe that satisfies various requirements. One of the requirements may be the subframe that belongs to the CSI subframe set linked to periodic CSI report if the CSI subframe set is configured for the user equipment in case of periodic CSI report.

Also, the user equipment may obtain CQI indexes from the CSI reference resource by considering the following assumptions (for details, see 3GPP TS 36.213).

First three OFDM symbols of one subframe are reserved by control signaling.

There is no resource element used by a primary synchronization signal, a secondary synchronization signal, or physical broadcast signal (PBCH).

CP length of non-MBSFN subframe

Redundancy version is 0

If the CSI-RS is used for channel measurement, a PDSCH EPRE (Energy Per Resource Element) to CSI-RS EPRE ratio depends on a predetermined rule.

In case of CSI report in a transmission mode 9 (that is, mode that supports maximum eight-layer transmission), if PMI/RI report is configured for the user equipment, it is assumed that DMRS overhead is matched with rank which is reported most recently (for example, since DMRS overhead on one resource block pair is 12 REs in case of two or more antenna ports (that is, less than rank 2) as described with reference to FIG. 7 but is 24 REs in case of three or more antenna ports (that is, more than rank 3), CQI index may be calculated by assuming DMRS overhead corresponding to the rank value which is reported most recently).

RE is not allocated to CSI-RS and 0-power CSI-RS.

RE is not allocated to positioning RS (PRS).

PDSCH transmission scheme depends on a transmission mode (which may be default mode) currently set for the user equipment.

A PDSCH EPRE to cell-specific reference signal EPRE ratio depends on a predetermined rule.

This CSI-RS configuration may be notified from the base station to the user equipment by using RRC (Radio Resource Control) signaling, for example. In other words, information on the CSI-RS configuration may be provided to each user equipment within the cell by using dedicated RRC signaling. For example, the base station may notify the user equipment of CSI-RS configuration through RRC signaling when the user equipment establishes connection with the base station through initial access or handover. Alternatively, when the base station transmits RRC signaling message, which requires channel status feedback based on CSI-RS measurement, to the user equipment, the base station may notify the user equipment of the CSI-RS configuration through corresponding RRC signaling message.

In the meantime, the time position where the CSI-RS exists, that is, cell-specific subframe setup period and cell-specific subframe offset may be listed as illustrated in Table 1 below.

TABLE 1

| CSI-RS subframe configuration $I_{CSI-RS}$ | CSI-RS period $T_{CSI-RS}$ (subframe) | CSI-RS subframe offset $\Delta_{CSI-RS}$ (subframe) |
| --- | --- | --- |
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

As described above, the parameter $I_{CSI\ RS}$ may be set separately for the CSI-RS assumed by the user equipment that the transmission power is not 0 and the CSI-RS assumed by the user equipment that the transmission power is 0. The subframe that includes the CSI-RS may be expressed by the following Equation 12 (in Equation 12, $n_f$ is a system frame number, and $n_s$ is a slot number).

$$(10n_f + \lfloor n_s/2 \rfloor - \Delta_{CSI-RS}) \bmod T_{CSI-RS} = 0 \qquad \text{[Equation 12]}$$

A CSI-RS-Config information element (IE) defined as illustrated in Table 2 below may be used to specify CSI-RS configuration.

TABLE 2

| CSI-RS-Config information elements |
| --- |

```
-- ASN1START
CSI-RS-Config-r10 ::=          SEQUENCE {
    csi-RS-r10                     CHOICE {
```

TABLE 2-continued

| CSI-RS-Config information elements | |
|---|---|
| release | NULL, |
| setup | SEQUENCE { |
|   antennaPortsCount-r10 |   ENUMERATED {an1, an2, an4, an8}, |
|   resourceConfig-r10 |   INTEGER (0..31), |
|   subframeConfig-r10 |   INTEGER (0..154), |
|   p-C-r10 |   INTEGER (-8..15) |
|   } | |
| } | OPTIONAL, -- |
| Need ON | |
|   zeroTxPowerCSI-RS-r10 | CHOICE { |
|   release | NULL, |
|   setup | SEQUENCE { |
|     zeroTxPowerResourceConfigList-r10 |   BIT STRING (SIZE (16)), |
|     zeroTxPowerSubframeConfig-r10 |   INTEGER (0..154) |
|   } | |
| } | OPTIONAL -- |
| Need ON | |
| } | |
| -- ASN1STOP | |

In Table 2, the antenna port count parameter antennaPortsCount represents the number of antenna ports (that is, CSI-RS ports) used for CSI-RS transmission, and an1 corresponds to 1 and an2 corresponds to 2.

In Table 2, the p_C parameter represents a PDSCH EPRE (Energy Per Resource Element) to CSI-RS EPRE ratio assumed when the user equipment UE derives CSI feedback.

In Table 2, the resource configuration parameter resourceConfig has a value that determines a position of a resource element to which the CSI-RS is mapped on the RB pair as illustrated in FIG. 8.

In Table 2, the subframe configuration parameter subframeConfig corresponds to $I_{CSI-RS}$ in Table 1.

In Table 2, zeroTxPowerResourceConfigList and zeroTxPowerSubframeConfig respectively correspond to resourceConfig and subframeConfig for the CSI-RS of the transmission power of 0.

Details of the CSI-RS configuration IE in Table 2 will be understood with reference to the standard document TS 36.331.

Channel Status Information (CSI)

The MIMO scheme may be divided into an open-loop system and a closed-loop system. The open-loop MIMO scheme means that a MIMO transmitter performs MIMO transmission without feedback of channel status information from a MIMO receiver. The closed-loop MIMO scheme means that the MIMO transmitter performs MIMO transmission by using the channel status information fed back from the MIMO receiver. In the closed-loop MIMO scheme, each of the transmitter and the receiver may perform beamforming on the basis of the channel status information to obtain multiplexing gain of MIMO transmitting antennas. The transmitter (for example, base station) may allocate an uplink control channel or an uplink shared channel to the receiver (for example, user equipment), so that the receiver may feed the channel status information back.

The user equipment may perform estimation and/or measurement for a downlink channel by using the CRS and/or the CSI-RS. The channel status information (CSI) which is fed back from the user equipment to the base station may include a rank indicator (RI), a precoding matrix index (PMI), and a channel quality indicator (CQI).

The RI is information for a channel rank. The rank of the channel means a maximum number of layers (or streams) that may transmit different kinds of information through the same time-frequency resources. Since the rank value is mainly determined by long term padding of a channel, the rank value may generally be fed back in accordance with a longer period (that is, less frequently) than those of the PMI and the CQI.

The PMI is information for a precoding matrix used for transmission from the transmitter, and is a value that reflects spatial features of a channel. Precoding means that transmission layers are mapped into transmitting antennas, and layer-antenna mapping relation may be determined by a precoding matrix. The PMI corresponds to a precoding matrix index of the base station preferred by the user equipment on the basis of a metric such as a signal-to-interference plus noise ratio (SINR). In order to reduce feedback overhead of precoding information, the transmitter and the receiver previously share a codebook that includes various precoding matrixes, and only an index indicating a specific precoding matrix in the corresponding codebook may be fed back. For example, the PMI may be determined on the basis of RI which is reported most recently.

The CQI is the information indicating channel quality or channel strength. The CQI may be expressed by MCS combination which is previously determined. In other words, the CQI index represents a corresponding modulation scheme and a code rate. The CQI may be calculated by assuming that the PDSCH may be received without exceeding a predetermined error probability (for example, 0.1) on the assumption that a specific resource region (for example, region specified by valid subframe and/or physical resource block) is set to CQI reference resource and PDSCH transmission exists in the corresponding CQI reference resource. Generally, the CQI becomes a value that reflects received SNR that may be obtained if the base station configures a spatial channel by using the PMI. For example, the CQI may be calculated on the basis of RI and/or PMI which is reported most recently.

In the system (for example, LTE-A system) that supports extended antenna configuration, it is considered that additional multi-user diversity is acquired using a multi-user-MIMO (MU-MIMO) scheme. In case of the MU-MIMO scheme, since an interference channel exists between the user equipments multiplexed in an antenna domain, if the base station performs downlink transmission by using channel status information fed back from one of multiple user equipments, it is required that interference should not occur with the other user equipments. Accordingly, in order that MU-MIMO operation is performed normally, channel status information having exactness higher than that of the SU-MIMO scheme should be fed back.

A new CSI feedback method improved from CSI, which includes the existing RI, PMI and CQI, may be used such that the channel status information may be measured and reported more exactly. For example, the precoding information fed back from the receiver may be indicated by combination of two PMIs (for example, i1 and i2). As a result, more exact PMI may be fed back, and more exact CQI may be calculated and reported on the basis of the more exact PMI.

In the meantime, the CSI may periodically be transmitted through the PUCCH, or may periodically be transmitted through the PUSCH. Also, various report modes may be defined depending on which one of RI, first PMI (for example, W1), second PMI (for example, W2) and CQI is fed back and whether PMI and/or CQI which is fed back is for wideband (WB) or subband (SB).

CQI Calculation

Hereinafter, CQI calculation will be described in detail on the assumption that a downlink receiver is a user equipment. However, the description in the present invention may equally be applied to a relay as a downlink reception entity.

A method for configuring/defining a resource (hereinafter, referred to as reference resource), which becomes a reference of CQI calculation, when the user equipment reports CSI will be described. First of all, definition of CQI will be described in more detail.

The CQI reported by the user equipment corresponds to a specific index value. The CQI index is a value indicating a modulation scheme, code rate, etc., which correspond to the channel status. For example, the CQI indexes and their definition may be given as illustrated in Table 3.

TABLE 3

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Based on observation which is not limited by time and frequency, the user equipment may determine the highest CQI index, which satisfies a predetermined requirement of CQI indexes 1 to 15 of Table 3, for each CQI value reported at an uplink subframe n. The predetermined requirement may be defined that a single PDSCH transmission block, which reserves a group of downlink physical resource blocks referred to as CQI reference resources, may be received at a transmission block error probability that does not exceed 0.1 (that is, 10%), in accordance with combination of a modulation scheme (for example, MCS) and a transmission block size (TBS), which correspond to the corresponding CQI index. If the CQI index 1 does not satisfy the above requirement, the user equipment may determine CQI index 0.

In case of a transmission mode 9 (corresponding to maximum 8-layer transmission) and a feedback report mode, the user equipment may perform channel measurement for calculating a CQI value reported at an uplink subframe n, on the basis of the CSI-RS only. In case of the other transmission mode and corresponding report modes, the user equipment may perform channel measurement for CQI calculation on the basis of the CRS.

If the following requirements are all satisfied, combination of the modulation scheme and the transmission block size may correspond to one CQI index. The combination may be signaled for transmission on the PDSCH at the CQI reference resource in accordance with a related transmission block size table, the modulation scheme is indicated by the corresponding CQI index, and if combination of the transmission block size and the modulation scheme is applied to the reference resource, a valid channel code rate closest to a code rate indicated by the corresponding CQI index corresponds to the above requirement. If two or more combinations of the transmission block size and the modulation scheme are close to the code rate indicated by the corresponding CQI index at the same level, combination having the minimum transmission block size may be determined.

The CQI reference resource is defined as follows.

The CQI reference resource in the frequency domain is defined by a group of downlink physical resource blocks corresponding to a band to which the obtained CQI value is related.

The CQI reference resource in the time domain is defined by single downlink subframe n-nCQI_ref. In this case, in case of periodic CQI report, nCQI_ref is determined as a value which enables the downlink subframe n-nCQI_ref to correspond to a valid downlink subframe while being the smallest of values greater than 4. In case of aperiodic CQI report, nCQI_ref is determined as CQI reference resource which is the same downlink subframe as a valid downlink subframe corresponding to CQI request (or subframe for which CQI request is received) at an uplink DCI format (that is, PDCCH DCI format for providing uplink scheduling control information to the user equipment). Also, in case of aperiodic CQI report, nCQI_ref is 4 and the downlink subframe n-nCQI_ref corresponds to the valid downlink subframe, wherein the downlink subframe n-nCQI_ref may be received after the subframe corresponding to CQI request (or subframe for which CQI request is received) at a random access response grant. In this case, the valid downlink subframe means the downlink subframe that is set to the downlink subframe for the corresponding user equipment UE, is not the MBSFN subframe except the transmission mode 9, does not include a DwPTS field if the length of DwPTS is less than 7680*Ts (Ts=1/(15000×2048) second), and does not belong to a measurement gap configured for the corresponding UE. If there is no valid downlink subframe for the CQI reference resource, CQI report may be omitted for the uplink subframe n.

The CQI reference resource in a layer region is defined as random RI and PMI based on CQI.

In order that the user equipment derives CQI index from the CQI reference resource, the followings may be assumed: (1) first three OFDM symbols of the downlink subframe are used for control signaling; (2) there is no resource element used by a primary synchronization signal, a secondary synchronization signal or a physical broadcast channel; (3) the CQI reference resource has a CP length of non-MBSFN subframe; (4) redundancy version is 0; (5) if CSI-RS is used for channel measurement, a PDSCH EPRE to CSI-RS EPRE ratio has a predetermined value signaled by the upper layer; (6) PDSCH transmission scheme (single antenna port transmission, transmission diversity, spatial multiplexing, MU-MIMO, etc.) defined for each transmission mode is currently set for the corresponding UE (default mode may be provided); and (7) if CRS is used for channel measurement, the PDSCH EPRE to CRS EPRE ratio may be determined depending on a predetermined rule. Details related to CQI definition may be understood with reference to 3GPP TS36.213.

In short, the downlink receiver (for example, user equipment) may set a previous specific single subframe to the CQI reference resource based on the time when CQI calculation is currently performed, and may calculate CQI value from the corresponding CQI reference resource to satisfy the condition that error probability does not exceed 10% when the PDSCH is transmitted from the base station.

Codebook Based Precoding Scheme

Precoding for properly distributing transmission information in accordance with a channel status of each antenna may be used to support multi-antenna transmission. A codebook based precoding scheme means that a transmitter and a receiver previously defines a set of precoding matrixes, the receiver feeds the most suitable precoding matrix (that is, precoding matrix index (PMI)) back to the transmitter by measuring channel information from the transmitter, and the transmitter applies proper precoding to signal transmission on the basis of PMI. Since the codebook based precoding scheme selects a proper precoding matrix of the set of the precoding matrixes, although optimized precoding is always not used, feedback overhead may be reduced as compared with that optimized precoding information is explicitly fed back to actual channel information.

FIG. 10 is a diagram illustrating a basic concept of codebook based precoding.

According to the codebook based precoding scheme, the transmitter and the receiver shares codebook information that includes a predetermined number of precoding matrixes which are previously determined in accordance with a transmission rank, the number of antennas, etc. In other words, if feedback information is finite, the precoding based codebook scheme may be used. The receiver may measure the channel status through a received signal and feed information on infinite number of preferred precoding matrixes (that is, indexes of corresponding precoding matrixes) back to the transmitter on the basis of the aforementioned codebook information. For example, the receiver may select an optimized precoding matrix by measuring the received signal in accordance with a maximum likelihood (ML) scheme or a minimum mean square error (MMSE) scheme. Although FIG. 10 illustrates that the receiver transmits precoding matrix information per codeword to the transmitter, the present invention is not limited to the example of FIG. 10.

The transmitter that has received feedback information from the receiver may select a specific precoding matrix from the codebook on the basis of the received information. The transmitter that has selected the precoding matrix may perform precoding in such a way to multiply layer signals equivalent to transmission ranks by the selected precoding matrix, and may transmit the precoded signals through a plurality of antennas. The transmitter may notify the receiver what precoding information applied to the transmitting signals is. The number of rows in the precoding matrix is the same as the number of antennas, and the number of columns is the same as the rank value. Since the rank value is the same as the number of layers, the number of columns is the same as the number of layers. For example, if the number of transmitting antennas is 4 and the number of transmission layers is 2, the precoding matrix may be configured as a 4×2 matrix. Information transmitted through each layer may be mapped into each antenna through the precoding matrix.

The receiver that has received the signal precoded by and transmitted from the transmitter may perform inverse processing of precoding performed by the transmitter and recover the received signals. Generally, since the precoding matrix satisfies a unitary matrix (U) condition such as $U*U^H=I$, the inverse processing of precoding may be performed in such a manner that a Hermit matrix $P^H$ of the precoding matrix P used for precoding of the transmitter is multiplied by the received signals.

For example, the following Table 4 illustrates a codebook used for downlink transmission that two transmitting antennas are used in the 3GPP LTE release-8/9, and the following Table 5 illustrates a codebook used for downlink transmission that four transmitting antennas are used in the 3GPP LTE release-8/9.

TABLE 4

| Codebook index | Number of rank | |
| --- | --- | --- |
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 5

| Codebook index | $u_n$ | Number of layers v | | | |
| --- | --- | --- | --- | --- | --- |
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |

TABLE 5-continued

| Codebook index | $u_n$ | Number of layers $v$ | | | |
|---|---|---|---|---|---|
| | | 1 | 2 | 3 | 4 |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 5, $W_n^{\{s\}}$ is obtained by a set $\{s\}$ configured from Equation expressed as $W_n = I - 2u_n u_n^H / u_n^H u_n$. In this case, I represents a 4×4 single matrix, and $u_n$ is a value given by Table 5.

As illustrated in Table 4, a codebook for two transmitting antennas has a total of seven precoding vectors/matrixes. In this case, since the single matrix is intended for the open-loop system, a total of six precoding vectors/matrixes are obtained for precoding of the closed-loop system. Also, a codebook for four transmitting antennas as illustrated in Table 5 has a total of sixty-four precoding vectors/matrixes.

Additionally, in the system (for example, 3GPP LTE release-10 or advanced system) that supports extended antenna configuration, for example, MIMO transmission based on eight transmitting antennas may be performed. A codebook design for supporting MIMO transmission is required.

For CSI report for the channel transmitted through eight antenna ports, it may be considered that codebooks as illustrated in Table 6 to Table 13 are used. Eight CSI-RS antenna ports may be expressed as antenna port indexes 15 to 22. Each of Tables 6, 7, 8, 9, 10, 11, 12 and 13 illustrates an example of a codebook for 1-layer, 2-layer, 3-layer, 4-layer, 5-layer, 6-layer, 7-layer, and 8-layer CSI reports based on the antenna ports 15 to 22.

In Table 6 to Table 13, $\varphi_n$ and $v_m$ may be given by the following Equation 13.

$$\varphi_n = e^{j\pi n/2}$$
$$v_m = [1\ e^{j2\pi m/32}\ e^{j4\pi m/32}\ e^{j6\pi m/32}]^T \quad \text{[equation 13]}$$

TABLE 6

| | | | | $i_2$ | | | | |
|---|---|---|---|---|---|---|---|---|
| $i_1$ | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| | | | | $i_2$ | | | | |
|---|---|---|---|---|---|---|---|---|
| $i_1$ | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \dfrac{1}{\sqrt{8}}\begin{bmatrix} v_m \\ \varphi_n v_m \end{bmatrix}$

TABLE 7

| | | $i_2$ | | |
|---|---|---|---|---|
| $i_1$ | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |
| | | $i_2$ | | |
| $i_1$ | 4 | 5 | 6 | 7 |
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |
| | | $i_2$ | | |
| $i_1$ | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |
| | | $i_2$ | | |
| $i_1$ | 12 | 13 | 14 | 15 |

TABLE 7-continued

| 0-15 | $W^{(2)}_{2i_1,2i_1+3,0}$ | $W^{(2)}_{2i_1,2i_1+3,1}$ | $W^{(2)}_{2i_1+1,2i_1+3,0}$ | $W^{(2)}_{2i_1+1,2i_1+3,1}$ |
|---|---|---|---|---| where $W^{(2)}_{m,m',n} = \dfrac{1}{4}\begin{bmatrix} v_m & v_{m'} \\ \varphi_n v_m & -\varphi_n v_{m'} \end{bmatrix}$

TABLE 8

| | $i_2$ | | | |
|---|---|---|---|---|
| $i_1$ | 0 | 1 | 2 | 3 |
| 0-3 | $W^{(3)}_{8i_1,8i_1,8i_1+8}$ | $W^{(3)}_{8i_1+8,8i_1,8i_1+8}$ | $\tilde{W}^{(3)}_{8i_1,8i_1+8,8i_1+8}$ | $\tilde{W}^{(3)}_{8i_1+8,8i_1,8i_1}$ |

| | $i_2$ | | | |
|---|---|---|---|---|
| $i_1$ | 4 | 5 | 6 | 7 |
| 0-3 | $W^{(3)}_{8i_1+2,8i_1+2,8i_1+10}$ | $W^{(3)}_{8i_1+10,8i_1+2,8i_1+10}$ | $\tilde{W}^{(3)}_{8i_1+2,8i_1+10,8i_1+10}$ | $\tilde{W}^{(3)}_{8i_1+10,8i_1+2,8i_1+2}$ |

| | $i_2$ | | | |
|---|---|---|---|---|
| $i_1$ | 8 | 9 | 10 | 11 |
| 0-3 | $W^{(3)}_{8i_1+4,8i_1+4,8i_1+12}$ | $W^{(3)}_{8i_1+12,8i_1+4,8i_1+12}$ | $\tilde{W}^{(3)}_{8i_1+4,8i_1+12,8i_1+12}$ | $\tilde{W}^{(3)}_{8i_1+12,8i_1+4,8i_1+4}$ |

| | $i_2$ | | | |
|---|---|---|---|---|
| $i_1$ | 12 | 13 | 14 | 15 |
| 0-3 | $W^{(3)}_{8i_1+6,8i_1+6,8i_1+14}$ | $W^{(3)}_{8i_1+14,8i_1+6,8i_1+14}$ | $\tilde{W}^{(3)}_{8i_1+6,8i_1+14,8i_1+14}$ | $\tilde{W}^{(3)}_{8i_1+14,8i_1+6,8i_1+6}$ | where $W^{(3)}_{m,m',m''} = \dfrac{1}{\sqrt{24}}\begin{bmatrix} v_m & v_{m'} & v_{m''} \\ v_m & -v_{m'} & -v_{m''} \end{bmatrix}$, $\tilde{W}^{(3)}_{m,m',m''} = \dfrac{1}{\sqrt{24}}\begin{bmatrix} v_m & v_{m'} & v_{m''} \\ v_m & v_{m'} & -v_{m''} \end{bmatrix}$

TABLE 9

| | $i_2$ | | | |
|---|---|---|---|---|
| $i_1$ | 0 | 1 | 2 | 3 |
| 0-3 | $W^{(4)}_{8i_1,8i_1+8,0}$ | $W^{(4)}_{8i_1,8i_1+8,1}$ | $W^{(4)}_{8i_1+2,8i_1+10,0}$ | $W^{(4)}_{8i_1+2,8i_1+10,1}$ |

| | $i_2$ | | | |
|---|---|---|---|---|
| $i_1$ | 4 | 5 | 6 | 7 |
| 0-3 | $W^{(4)}_{8i_1+4,8i_1+12,0}$ | $W^{(4)}_{8i_1+4,8i_1+12,1}$ | $W^{(4)}_{8i_1+6,8i_1+14,0}$ | $W^{(4)}_{8i_1+6,8i_1+14,1}$ | where $W^{(4)}_{m,m',n} = \dfrac{1}{\sqrt{32}}\begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$

TABLE 10

| | $i_2$ |
|---|---|
| $i_1$ | 0 |
| 0-3 | $W^{(5)}_{i_1} = \dfrac{1}{\sqrt{40}}\begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

TABLE 11

| | $i_2$ |
|---|---|
| $i_1$ | 0 |
| 0-3 | $W^{(6)}_{i_1} = \dfrac{1}{\sqrt{48}}\begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

TABLE 12

| | $i_2$ |
|---|---|
| $i_1$ | 0 |
| 0-3 | $W^{(7)}_{i_1} = \dfrac{1}{\sqrt{56}}\begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

TABLE 13

| $i_1$ | $i_2$ |
|---|---|
|  | 0 |
| 0 | $W_{i_1}^{(8)} = \frac{1}{8}\begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

Multi-Antenna Array

FIG. 11 is a diagram illustrating examples for configuring 8 transmit antennas.

FIG. 11(a) illustrates a case in which N antennas configure independent channels without grouping, which is generally called a uniform linear array (ULA).

FIG. 11(b) illustrates a ULA-type antenna configuration in which 2 antennas form a pair (i.e., paired ULA). In this case, 2 paired antennas may have channels associated with each other and independent from other pairs of antennas.

When a large number of transmit antennas should be placed in an insufficient space, the ULA antenna configurations illustrated in FIGS. 11(a) and 11(b) may not be appropriate. Accordingly, a dual-polarized (or cross-polarized) antenna configuration may be applied as illustrated in FIG. 11(c). In this transmit antenna configuration, since antenna correlations can be reduced to configure independent channels even when the distance d between antennas is relatively small, high data throughput is achieved.

In FIG. 11(c), when a total of $N_T$ transmit antennas are placed, group 1 of antennas indexed 1, 2, ..., $N_T/2$ may be configured to have a polarity orthogonal to that of group 2 of antennas indexed $N_T/2+1$, $N_T/2+2$, ..., $N_T$. The antennas of antenna group 1 may have an equal polarity (e.g., vertical polarity), and the antennas of antenna group 2 may have another equal polarity (e.g., horizontal polarity). In addition, the two antenna groups are co-located. For example, antennas 1 and $N_T/2+1$, antennas 2 and $N_T/2+2$, antennas 3 and $N_T/2+3$, ..., antennas $N_T/2$ and $N_T$ may be co-located. In other words, antennas of one antenna group have the same polarity as in a uniform linear array (ULA), and the correlations among antennas of one antenna group have linear phase increment characteristics. In addition, the correlations among antenna groups have phase rotation characteristics.

1D Antenna Structure

A 1D antenna array may include a ULA or cross-polarized antenna array configuration as illustrated in FIG. 11. When this 1D antenna array is used, the above-described RS transmission and CSI feedback schemes are applied. That is, in downlink transmission, to estimate a channel between a transmitter and a receiver (or between an eNB and a UE), the transmitter may transmit a reference signal (e.g., CRS or CSI-RS) to the receiver, and the receiver may estimate a channel state based on the reference signal. The receiver may calculate a rank and a precoding weight predicted to be appropriate for downlink data transmission, and a CQI based on the predicted rank and the precoding weight, using channel information acquired from the reference signal.

Precoding information is required for MIMO transmission, e.g., precoded spatial multiplexing, the precoding weight may be configured in the form of a codebook.

For example, CSI feedback for precoded spatial multiplexing (SM) using CRS in a MIMO system using 4 transmit antennas (hereinafter referred to as 4Tx) can be described as given below. When an eNB having 4 transmit antennas transmits CRS, if antenna ports (APs) mapped to RS signals are indexed AP0, AP1, AP2, and AP3, a UE may estimate a channel from AP0, AP1, AP2, and AP3 using the CRS.

In this case, if a matrix (or vector) for expressing the channel estimated by the UE is H, H may be expressed as H=[$H_{11}$ $H_{12}$ $H_{13}$ $H_{14}$; $H_{21}$ $H_{22}$ $H_{23}$ $H_{24}$; ...; $H_{Nr1}$ $H_{Nr2}$ $H_{Nr3}$ $H_{Nr4}$]. That is, H may be expressed using a matrix (or vector) having a size of Nr×Nt. Herein, Nr is the number of receive antennas, and Nt is the number of transmit antennas.

Furthermore, the UE may assume that the eNB transmits data using a precoding weight matrix (or vector) $W_m(k)$. In $W_m(k)$, m denotes a transmission rank, and k denotes the index of a precoding weight matrix (or vector) defined for Rank-m. $W_m(k)$ may be expressed as $W_m(k)$=[$W_{11}$ $W_{12}$ $W_{13}$ ... $W_{1m}$; $W_{21}$ $W_{22}$ $W_{23}$ ... $W_{2m}$; $W_{31}$ $W_{32}$ $W_{33}$ ... $W_{3m}$; ...; $W_{41}$ $W_{42}$ $W_{43}$ ... $W_{4m}$]. That is, $W_m(k)$ may be expressed as a matrix (or vector) having a size of Nt×m.

In addition, the UE may calculate an equivalent channel $H_{eq}$. The equivalent channel $H_{eq}$ may be calculated by multiplying the estimated channel H by the precoding weight $W_m(k)$ (i.e., $H_{eq}=HW_m(k)$), or by multiplying a covariance matrix R of the estimated channel H by the precoding weight $W_m(k)$ (i.e., $H_{eq}=RW_m(k)$). Based on the equivalent channel $H_{eq}$, the UE may select a rank and a precoding weight appropriate for downlink transmission. In addition, the UE may calculate a CQI predicted when the selected rank and the precoding weight are applied.

As another example, CSI feedback for precoded spatial multiplexing (SM) using CSI-RS in a MIMO system using 8 transmit antennas (hereinafter referred to as 8Tx) can be described as given below. When an eNB having 8 transmit antennas transmits CSI-RS, if antenna ports (APs) mapped to RS signals are indexed AP15, AP16, AP17, AP18, AP19, AP20, AP21, and AP22, a UE may estimate a channel from AP15, AP16, AP17, AP18, AP19, AP20, AP21, and AP22 using the CSI-RS.

In this case, if a matrix (or vector) for expressing the channel estimated by the UE is H, H may be expressed as H=[$H_{11}$ $H_{12}$ $H_{13}$ $H_{14}$ $H_{15}$ $H_{16}$ $H_{17}$ $H_{18}$; $H_{21}$ $H_{22}$ $H_{23}$ $H_{24}$ $H_{25}$ $H_{26}$ $H_{27}$ $H_{28}$; ...; $H_{Nr1}$ $H_{Nr2}$ $H_{Nr3}$ $H_{Nr4}$ $H_{Nr5}$ $H_{Nr6}$ $H_{Nr7}$ $H_{Nr8}$] (where Nr denotes the number of receive antennas).

Furthermore, the UE may assume that the eNB transmits data using a precoding weight matrix (or vector) $W_m(k)$, and $W_m(k)$ may be expressed as $W_m(k)$=[$W_{11}$ $W_{12}$ $W_{13}$ ... $W_{1m}$; $W_{21}$ $W_{22}$ $W_{23}$ ... $W_{2m}$; $W_{31}$ $W_{32}$ $W_{33}$ ... $W_{3m}$; ...; $W_{81}$ $W_{82}$ $W_{83}$ ... $W_{8m}$].

In addition, the UE may select a rank and a precoding weight appropriate for downlink transmission based on an equivalent channel $H_{eq}$ (calculated as $H_{eq}=HW_m(k)$ or $H_{eq}=RW_m(k)$), and calculate a CQI predicted when the selected rank and the precoding weight are applied.

As such, in a MIMO system supporting Nt transmit antennas, the UE may feedback CSI (e.g., RI, PMI, CQI) selected/calculated using CRS or CSI-RS as described above, to the eNB. The eNB may determine a rank, a precoding weight, a modulation and coding scheme, etc. in consideration of the CSI reported by the UE.

2D Antenna Structure

Since beams formed by a 1D antenna structure such as a legacy ULA are specified only in an azimuth angle direction (e.g., the horizontal domain) and cannot be specified in an elevation angle direction (e.g., the vertical domain), only 2D beamforming is supported. This 1D antenna structure (e.g., a ULA or cross-polarized array configuration) can support adaptive beamforming or spatial multiplexing of the azimuth angle direction, and only a MIMO transmission/reception scheme therefor is designed for a legacy wireless communication system (e.g., a 3GPP LTE Release-8, 9, 10, or 11 system).

Meanwhile, when a MIMO transmission/reception scheme based on a 2D antenna structure aimed to improve system performance is supported, since beams formed by the 2D antenna structure can be specified in the azimuth angle direction and the elevation angle direction, 3D beamforming is enabled.

If the beams are formed by specifying the azimuth angle and the elevation angle as described above, new beamforming schemes such as sector-specific elevation beamforming (e.g., adaptive control over the vertical pattern beamwidth and/or downtilt), advanced sectorization in the vertical domain, and user (or UE)-specific elevation beamforming may be supported.

Vertical sectorization may increase average system performance due to a gain of a vertical sector pattern, and is not generally required to support any additional standard technology.

UE-specific elevation beamforming may improve an SINR for a corresponding UE by designating a vertical antenna pattern toward the UE. On the other hand, unlike vertical sectorization or sector-specific vertical beamforming, UE-specific elevation beamforming is required to support an additional standard technology. For example, to appropriately support the 2-D port structure, a CSI measurement and feedback method of the UE for UE-specific elevation beamforming is required.

A DL MIMO enhancement scheme is required to support UE-specific elevation beamforming. The DL MIMO enhancement scheme may include, for example, enhancement of CSI feedback of the UE (e.g., new codebook design, codebook selection/update/modification support, and CSI payload size minimization), CSI-RS configuration modification for UE-specific elevation beamforming, additional antenna port definition for UE-specific elevation beamforming, downlink control enhancement for supporting UE-specific elevation beamforming (e.g., a scheme for ensuring common channel coverage and/or radio resource management (RRM) measurement reliability when the number of antenna ports is increased), etc.

In addition, when enhanced DL MIMO operation is designed, various factors such as eNB antenna calibration errors (errors in phase and time), estimation errors, downlink overhead, complexity, feedback overhead, backward compatibility, practical UE implementation, reuse of existing feedback framework, and subband versus wideband feedback can be considered.

Figure 12:
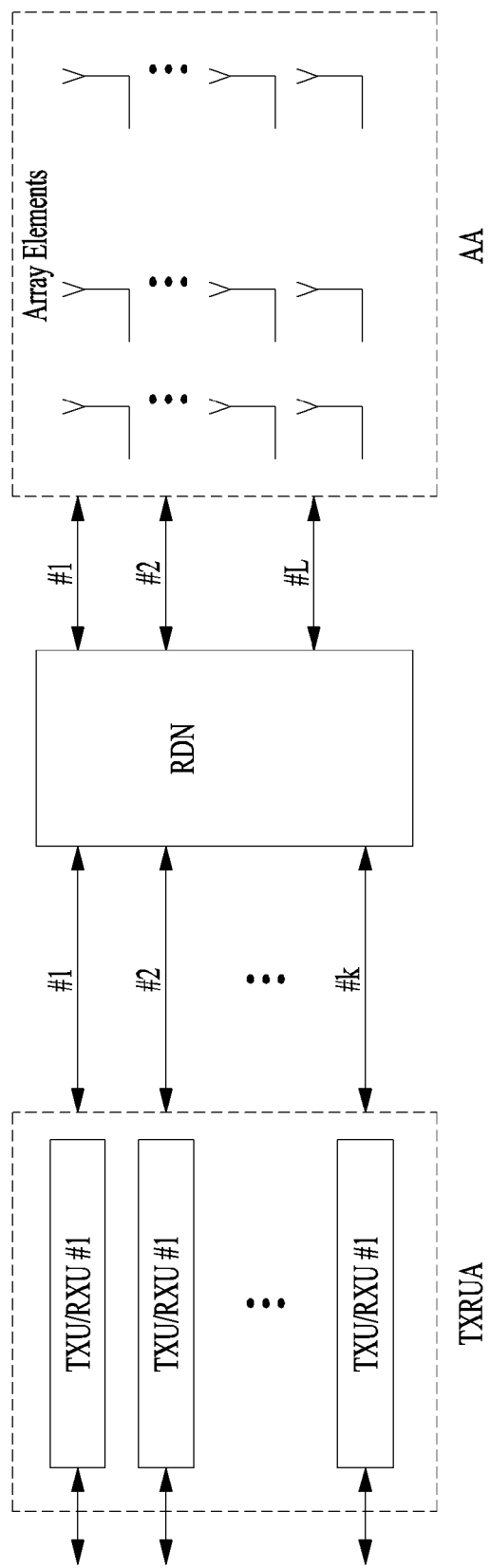
FIG. 12 is a diagram for describing the structure of a general active antenna array system (AAS)

FIG. 12 is a diagram for describing the structure of a general active antenna array system (AAS).

The structure of an active antenna array system (AAS) may be logically expressed as 3 main functional blocks. These blocks may include a transceiver unit array (TXRUA), a radio distribution network (RDN), and an antenna array (AA). TXRU units interface with an eNodeB, and may provide reception input for baseband processing of the eNB or receive transmission output based on baseband processing of the eNB.

Specifically, the TXRUA may include a plurality of transmit units and a plurality of receive units. The transmit units may receive baseband input from the AAS eNB and provide radio frequency (RF) transmission output, and the RF transmission output may be distributed over the AA through the RDN. The receive units may receive distributed RF reception input from the AA through the RDN and provide the same as output for baseband processing.

That is, the AAS may be defined as an eNB system for combining an AA and an active TXRUA. In addition, the AAS may include an RDN which is a passive network for physically separating the active TXRUA from the AA, and defines mapping between the TXRUA and the AA. For example, the RDN may convert K transmission outputs from the TXRUA into L outputs directed to the AA. Alternatively, the RDN may convert L reception inputs from the AA into K inputs directed to the TXRUA.

In addition, the transmit units and the receive units may be separate from each other, and mapping of antenna elements may be defined differently for the transmit units and the receive units.

The eNB system including the AAS may be assumed to support transmit diversity, beamforming, spatial multiplexing, or any combination thereof.

Figure 13:
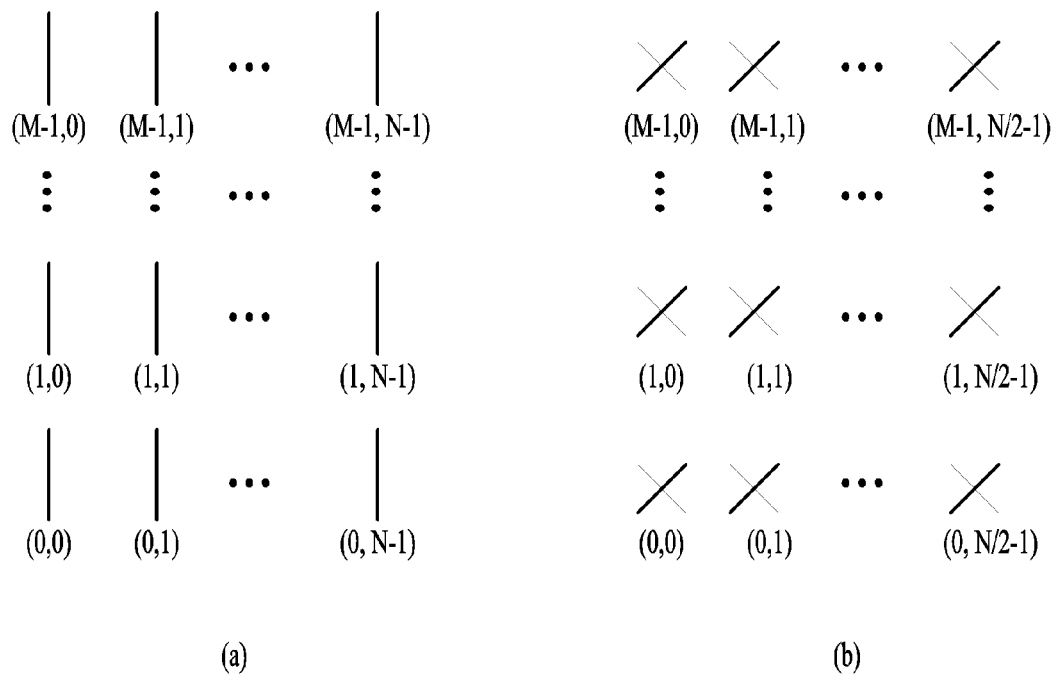
FIG. 13 is a diagram for describing the structure of a 2D antenna array.

FIG. 13 is a diagram for describing the structure of a 2-D antenna array.

FIG. 13(a) illustrates an M×N antenna array, and antenna elements thereof may be indexed from (0, 0) to (M−1, N−1). In the antenna array of FIG. 13(a), one column or one row may be regarded as being configured as a ULA.

FIG. 13(b) illustrates an M×(N/2) antenna array, and antenna elements thereof may be indexed from (0, 0) to (M−1, N/2−1). In the antenna array of FIG. 13(b), one column or one row may be regarded as being configured as a pair of cross-polarized arrays.

Figure 14:
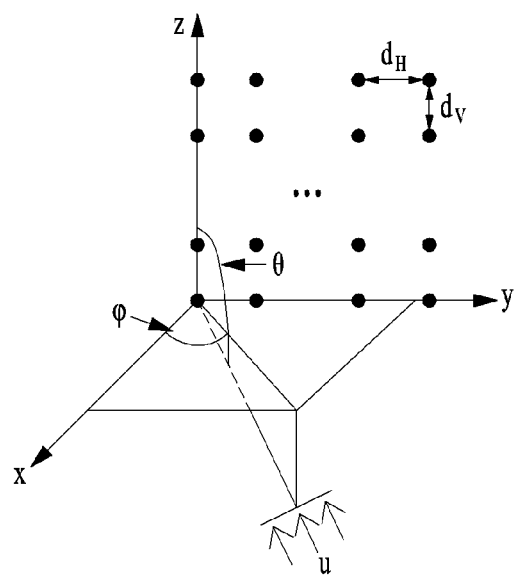
FIG. 14 is a diagram for geometrically describing an AAS.

FIG. 14 is a diagram for geometrically describing an AAS.

FIG. 14 illustrates a 3D space (i.e., a space defined by x, y, and z axes) for describing an array factor having a plurality of columns formed by a uniform rectangular array (URA) antenna structure. Herein, it is assumed that $N_H$ antenna elements are present in a horizontal direction (or a y axis direction) and $N_V$ antenna elements are present in a vertical direction (or a z axis direction) on the yz plane. In addition, the distance between antenna elements in the horizontal direction is defined as $d_H$, and the distance between antenna elements in the vertical direction is defined as $d_V$.

The direction of a signal applied to an antenna array element is expressed as u. An elevation angle of the signal direction is expressed as θ, and an azimuth angle of the signal direction is expressed as φ.

Figure 15:
FIG. 15 is a diagram for describing a definition of angle directions.

FIG. 15 is a diagram for describing a definition of angle directions.

As illustrated in FIG. 15(a), the elevation angle θ is defined as a value between 90° and −90°. A value close to 90° indicates an angle directed downward (or to the ground surface), a value close to −90° indicates an angle directed upward, and 0° is a value indicating a direction perpendicular to an antenna array element. In addition, as illustrated in FIG. 15(b), the azimuth angle φ may be defined as a value between 0° and 180°.

Alternatively, based on a reference value, the elevation angle θ of the signal direction may be defined as a value between 0° and 180°. In this case, a value close to 0° indicates an angle directed downward (or to the ground surface), a value close to 180° indicates an angle directed upward, and 90° is a value indicating a direction perpendicular to an antenna array element. In addition, the azimuth angle φ may be defined as a value between −180° and 180°.

The RDN may give a complex weight to a signal from each port, distribute the same to a sub-array, and control a side lobe level and a tilt angle thereof. The complex weight may include an amplitude weight and a phase shift. A complex weight $w_{m,n}$ on an antenna element (m, n) may be as given by Equation 14.

$$w_{m,n}=|w_{m,n}|\exp(-j2\pi\lambda_0^{-1}(\bar{\varphi}_{etilt}\cdot\bar{r}_{m,n})), (m,n) \in S_p \quad \text{[Equation 14]}$$

In Equation 14, m=0, 1, ..., $N_H$ or m=1, 2, ..., $N_H$, and n=0, 1, ..., $N_V$ or n=1, 2, ..., $N_V$. $S_p$ is a set of antenna elements of a sub-array associated with an antenna port p. $|w_{m,n}|$ is an amplitude weight given to the antenna element (m, n). $\lambda_0$ denotes a wavelength on free space. $\bar{r}_{m,n}$ is an element location vector and is defined as given by Equation 15. $\bar{\varphi}_{etilt}$ is a unit directional vector and is defined as given by Equation 16.

$$\bar{r}_{m,n}=[0\: n\cdot d_H\: m\cdot d_V]^T \quad \text{[Equation 15]}$$

As shown in Equation 15, the meaning of $\bar{r}_{m,n}$ may be the distance of the antenna element (m, n) from the point of origin.

$$\bar{\varphi}_{etilt}=[\cos\theta_{etilt}\cos\varphi_{escan}\: \cos\theta_{etilt}\sin\varphi_{escan}\: \sin\theta_{etilt}]^T \quad \text{[Equation 16]}$$

In Equation 16, $\theta_{etilt}$ corresponds to a vertical steering angle or an elevation angle, and $\varphi_{escan}$ corresponds to a horizontal steering angle or an azimuth angle. That is, Equation 16 may express a beam direction as an angle in 3D space. In this regard, beamforming may be a scheme for adjusting the directions of beams formed from an antenna array, to a specific angle by equally compensating for a phase difference experienced by each antenna.

An antenna pattern $A_p$, which refers to a radiation pattern for the antenna port p, may be as given by Equation 17. The radiation pattern may be the shape of a beam formed by the antenna port p. For example, the beam may have a thin shape focused toward a certain location, or a thick shape proceeding toward a certain range.

$$A_P(\theta,\varphi) = A_E(\theta,\varphi) + 10\log_{10}\left(\left|\sum_{(m,n)\in S_p} w_{m,n}\cdot v_{m,n}\right|^2\right) \quad \text{[Equation 17]}$$

In Equation 17, $A_E$ (φ, θ) denotes a composite array element pattern in dB, and may follow the definition of an element pattern of Table 14 (reference can be made to, for example, Technical Report (TR) 37.840 for the values of parameters (e.g., the number of radiation elements per column, the number of columns, and the maximum array gain in one column) necessary to apply the element pattern of Table 14).

TABLE 14

| Horizontal radiation pattern in dB | $A_{E,H}(\varphi) = -\min\left[12\left(\frac{\varphi}{\varphi_{3dB}}\right)^2, A_m\right]$ dB |
|---|---|
| Front to back ratio | $A_m$ = 30 dB |

TABLE 14-continued

| Vertical radiation pattern in dB | $A_{E,V}(\theta) = -\min\left[12\left(\frac{\theta}{\theta_{3dB}}\right)^2, SLA_v\right]$ |
|---|---|
| Side lobe lower level | $SLA_v$ = 30 dB |
| Element pattern | $A_E$ (φ,θ) = $G_{E,max} - \min\{-[A_{E,H}(\varphi) + A_{E,V}(\theta)], A_m\}$ |
| Element Gain | $G_{E,max}$ = 8 dBi |

In Equation 17, $v_{m,n}$ is a phase shift factor due to array placement and is given by Equation 18.

$$v_{m,n}=\exp(j2\pi\lambda_0^{-1}(\bar{\varphi}\cdot\bar{r}_{m,n})), (m,n)\in S_p \quad \text{[Equation 18]}$$

In Equation 18, $\bar{\varphi}$ is given by Equation 19.

$$\bar{\varphi}=[\cos\theta\cos\varphi\: \cos\theta\sin\varphi\: \sin\theta]^T \quad \text{[Equation 19]}$$

In addition, the maximum antenna gain of the AAS should be defined as a sum of the passive maximum antenna gain and losses of a cable network.

Figure 16:
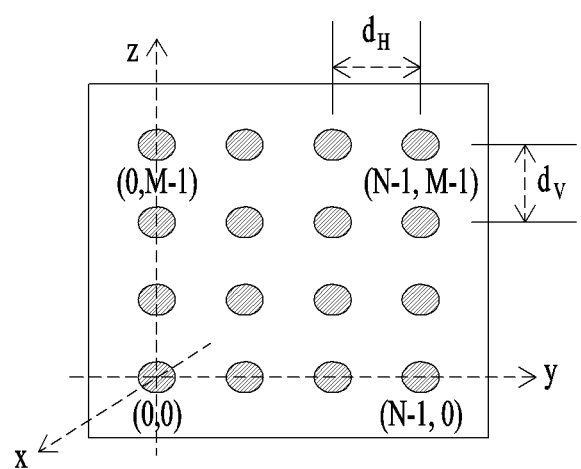
FIG. 16 is a diagram illustrating a planar antenna array configuration.

A description is now given of the planar array antenna (or URA) configuration with reference to FIGS. 16 and 17.

FIG. 16 is a diagram illustrating the planar antenna array configuration, and FIG. 17 is a diagram for describing another definition of angle directions.

Although 2-D placement of the antenna element (m, n) is considered in FIG. 14, 2-D placement of an antenna element (n, m) is assumed in FIG. 16.

In addition, although the elevation angle θ is defined as a value between −90° and 90° (in this case, 0° is a value indicating a direction perpendicular to an antenna array element and the azimuth angle φ is defined as a value between 0° and 180° in FIG. 15), the angle of the signal direction may be defined by varying a reference value in FIG. 17.

For example, as illustrated in FIG. 17(a), the elevation angle θ is defined as a value between −90° and 90°, a value close to −90° indicates an angle directed downward (or to the ground surface), a value close to 90° indicates an angle directed upward, and 0° is a value indicating a direction perpendicular to an antenna array element. In addition, as illustrated in FIG. 17(b), the azimuth angle φ may be defined as a value between −90° and 90°.

FIG. 18 is a diagram illustrating examples of beamforming based on a 2-D antenna configuration.

FIG. 18(a) illustrates vertical sectorization based on 3D beamforming, and FIG. 18(b) illustrates vertical beamforming based on 3D beamforming. Specifically, as illustrated in FIG. 18(a), when elevation angle beamforming is enabled, sectorization of the vertical domain is enabled and horizontal beamforming may be performed based on an azimuth angle in each vertical sector. Furthermore, as illustrated in FIG. 18(b), when elevation angle beamforming is used, a high-quality signal may be transmitted to users located higher than the antenna of an eNB.

FIG. 19 is a diagram for describing examples of vertical beamforming.

Buildings of various heights are distributed in a city. In general, an eNB antenna is located on the roof of a building, and the building having the antenna may be shorter or taller than peripheral buildings.

FIG. 19(a) illustrates an example of beamforming considering peripheral buildings taller than a building having an eNB antenna. In this case, since no obstacles are present between the eNB antenna and peripheral tall buildings, spatial channels having a strong line of sight (LOS) component may be generated. In addition, for beamforming directed to the tall buildings, adaptive beamforming based on the heights of buildings may be a significant factor compared to adaptive beamforming in a horizontal direction inside a building.

FIG. 19(b) illustrates an example of beamforming considering peripheral buildings shorter than a building having an eNB antenna. In this case, a signal transmitted from the eNB antenna may be refracted by the roof of another building or reflected by another building, the ground surface, or the like, and thus spatial channels including a plurality of non-line of sight (NLOS) components may be generated. Accordingly, when a signal is transmitted from the eNB to a user using vertical beamforming directed downward (or to the ground surface), a spatial channel having various paths expressible by the elevation angle and the azimuth angle may be generated in a specific space (particularly, a location covered by a building).

Method for Designing Precoding Codebook Supporting 2-D Antenna Structure

The present invention proposes a method for designing a precoding codebook correctly and efficiently supporting a scheme such as UE-specific elevation beamforming or vertical sectorization enabled based on a 2-D antenna structure.

In a legacy system, the directions of beams are vertically fixed (i.e., the vertical directions of beams cannot be selected/adjusted), and beamforming can be performed only in a horizontal direction. To receive CSI including PMI, etc. reported from the UE and to determine the most appropriate horizontal beamforming, the eNB may signal a CSI-RS configuration to the UE and transmit a CSI-RS based on the CSI-RS configuration to the UE. Signaling of the CSI-RS configuration means that one or more information items (e.g., CSI-RS port, CSI-RS transmission timing, CSI-RS transmission RE location, etc.) included in the CSI-RS-Config IE of Table 2 are provided.

For 3D beamforming, vertical beamforming (or, vertical beam selection) is necessary in addition to existing horizontal beamforming, and a specific method thereof is not yet defined.

To describe the basic principle of the present invention, a 2-D URA (or UPA) may be assumed to be a combination of a ULA of a first domain (e.g., the horizontal domain) and a ULA of a second domain (e.g., the vertical domain). For example, a 3D beam may be formed by determining an elevation angle in the vertical domain and then determining an azimuth angle in the horizontal domain, or by determining the azimuth angle in the horizontal domain and then determining the elevation angle in the vertical domain. Selection of a ULA of one of the first and second domains in the 2-D antenna structure as described above may be referred to as regional selection or domain selection. As described above, horizontal beamforming (or azimuth angle direction beamforming) may be performed together with vertical beamforming (or elevation angle direction beamforming) in the 2-D antenna structure.

According to the legacy system, a precoding codebook designed for beamforming in a horizontal direction may be designed to divide the full range of an azimuth angle into equal periods or to form an arbitrary beam direction. For example, according to a codebook designed based on discrete Fourier transform (DFT), a phase is determined in the form of $e^{j2\pi nk/N}$. Herein, $2\pi/N$ means that the phase is divided into equal periods. Alternatively, an arbitrary beam direction means that the codebook is designed to have an arbitrary phase value. As described above, one of element(s) included in a predetermined codebook corresponds to a specific precoding matrix or a specific beam direction, and the UE may report a beam direction preferred by the UE, to the eNB by feeding back information (e.g., PMI) indicating a specific element of the codebook, to the eNB.

To efficiently support 2-D antenna transmission, the UE should also be able to report a PMI for vertical beamforming to the eNB, and thus a codebook usable for vertical beamforming needs to be designed. When the codebook for vertical beamforming is designed, the legacy codebook design scheme for dividing the azimuth angle into equal periods is not efficient because vertical direction beams are mostly formed downward from the antenna as illustrated in FIG. 18 or FIG. 19 and thus including elements corresponding to the most used beam directions in codewords is efficient in designing the codebook. If the scheme for dividing the elevation angle into equal periods is used to design the codebook used for vertical beamforming, since the number of beam directions expressible by the codebook is restrictive but beamforming weights having little possibility of use can be included in codebook elements, unnecessary calculation may be increased when an appropriate beamforming weight is calculated within the codebook, or an inappropriate codebook element incapable of expressing a beam direction preferred by the UE may be selected/determined. Accordingly, the present invention proposes a codebook design method capable of solving the above problem.

In addition, according to various embodiments proposed by the present invention, it should be understood that the definition of angle directions follows the definition of the angle directions described above in relation to FIG. 15. However, the scope of the present invention is not limited thereto and the principle of the present invention is equally applicable to other definitions of the angle directions by changing the values of angle.

Implementation 1

Implementation 1 relates to a method for configuring a feedback codebook for precoding as a precoding matrix (or a precoding vector) supporting accurate and efficient 3D beamforming in consideration of the relationship between vertical beamforming and horizontal beamforming. In addition, Implementation 1 proposes a method for configuring a codebook to form a beam of a specific angle range in an elevation angle direction. For example, this principle is applicable to a case in which a vertical beamforming weight is expressed based on a direction of arrival (DoA), a case in which vertical beamforming weight is expressed based on DFT, etc. Furthermore, this principle is also applicable to a horizontal beamforming weight vector.

Embodiment 1

If an elevation angle of 0° is a value indicating a direction perpendicular to an antenna array, a codebook for vertical beamforming may include a weight vector capable of forming a beam having an elevation angle within a range of −90° to 90°.

Embodiment 1-1

A vertical beamforming weight vector for a 2-D antenna array may be expressed as given by Equation 20 based on DoA.

$$W_V = e^{j \cdot 2\pi \cdot m \cdot d_v \sin(\theta)/\lambda} / \sqrt{M} \qquad \text{[Equation 20]}$$

In Equation 20, Wv denotes a vertical beamforming weight vector. M denotes the number of antennas in the vertical domain, m denotes an antenna number (or an antenna index) in the vertical domain (e.g., m=0, 1, ..., M−1), and dv denotes the distance between antennas in the vertical domain. λ denotes a wavelength, and θ denotes an elevation angle.

If the elevation angle has a value within a range of −90° to 90°, the range of the variable θ of the weight vector is −90°≤θ≤90°, and thus sin(0) has a value within a range of −1≤sin(θ)≤1.

Embodiment 1-2

A horizontal beamforming weight vector for a 2-D antenna array may be expressed as given by Equation 21 based on DoA.

$$W_h = e^{j \cdot 2\pi \cdot n \cdot d_h \cdot cos(\theta) \cdot sin(\varphi)/\lambda} / \sqrt{N}$$ [Equation 21]

In Equation 21, Wh denotes a horizontal beamforming weight vector. N denotes the number of antennas in the horizontal domain, n denotes an antenna number (or an antenna index) in the horizontal domain (e.g., n=0, 1, ..., N−1), and dh denotes the distance between antennas in the horizontal domain. λ denotes a wavelength, θ denotes an elevation angle, and ψ denotes an azimuth angle.

If the elevation angle has a value within a range of −90° to 90°, the range of the variable θ of the weight vector is −90°≤θ≤90°, and thus cos(θ) has a value within a range of 0≤cos(θ)≤1.

If the azimuth angle has a value within a range of −180° to 180° (or a value within a range of −90° to 90°), the range of the variable ψ of the weight vector is −180°≤ψ≤180° (or −90°≤ψ≤90°), and thus sin(ψ) has a value within a range of −1≤sin(ψ)≤1.

Embodiment 1-3

A vertical beamforming weight vector for a 2-D antenna array may be expressed as given by Equation 22 based on DFT.

$$W_v = e^{j \cdot 2\pi \cdot m \cdot k/K} / \sqrt{M}$$ [Equation 22]

In Equation 22, Wv denotes a vertical beamforming weight vector. M denotes the number of antennas in the vertical domain, and m denotes an antenna number (or an antenna index) in the vertical domain (e.g., m=0, 1, ..., M−1). K denotes the number of beams in the vertical domain, and k denotes a beam number (or a beam index) in the vertical domain. If the elevation angle has a value within a range of −90° to 90°, k may have a value between 0 and K (e.g., k=0, 1, ..., K−1).

In Equation 20 of Embodiment 1-1 based on DoA, if dv=λ/2, Wv may be expressed as Wv=exp(j×π×m×sin(θ))/sqrt(M). Herein, if −90°≤θ≤90°, −1≤sin(θ)≤1. Meanwhile, in Equation 22 of Embodiment 1-3 based on DFT, considering that 2k/K has a value within a range of 0 to 2 based on the beam index k, the relationship between the range of the elevation angle θ in the DoA based method and the beam index k in the DFT based method may be configured.

In the DFT based method, if k=0, 1, ..., K/2, 2k/K has a value of 0 to 1. Herein, the range of the value 2k/K equals the range (i.e., 0≤sin(θ)≤1) of the value sin(0) in a case when the elevation angle θ has a range of 0°≤θ≤90°.

Furthermore, if k=K/2, K/2+1, ..., K, 2k/K has a value of 1 to 2. Herein, if it is assumed that A=π×2k/K, the range of the value A is from π to 2π. In addition, in view of exp(jA), the value of exp(jA) in a case when the range of the value A is from π to 2π equals the value of exp(jA) in a case when the range of the value A is from −π to 0. A principle in this case may equal the principle that 2k/K has a value of −1 to 0. Herein, the range of the value 2k/K equals the range (i.e., −1≤sin(θ)≤0) of the value sin(θ) in a case when the elevation angle θ has a range of −90°≤θ≤0°.

In short, the elevation angle θ set to 0°≤θ≤90° in the DoA based method may correspond to the beam index k set to a value within a range of 0 to K/2 in the DFT based method.

In addition, the elevation angle θ set to −90°≤θ≤0° in the DoA based method may correspond to the beam index k set to a value within a range of K/2 to K in the DFT based method.

Embodiment 1-4

A horizontal beamforming weight vector for a 2-D antenna array may be expressed as given by Equation 23 based on DFT.

$$W_h = e^{j \cdot 2\pi \cdot n \cdot c \cdot h/H} / \sqrt{N}$$ [Equation 23]

In Equation 23, Wh denotes a horizontal beamforming weight vector. N denotes the number of antennas in the horizontal domain, and n denotes an antenna number (or an antenna index) in the horizontal domain. H denotes the number of beams in the horizontal domain, h denotes a beam number (or a beam index) in the horizontal domain, and c is a value determined depending on a beam index for vertical beamforming.

If the azimuth angle has a value within a range of −180° to 180° (or a value within a range of −90° to 90°), n may have a value between 0 and N (e.g., n=0, 1, ..., N−1).

If a vertical beam index k has a value between 0 and K, c may be configured to have a value between 0 and 1.

Specifically, if the elevation angle θ has a value within a range of −90°≤θ≤90° as in Embodiment 1-3, the variable k of the vertical beamforming weight vector may have a value between 0 and K. The horizontal beamforming weight vector includes a value (i.e., c) determined depending on a beam index selected for vertical beamforming, and the value may be defined as given by Equation 24.

$$c = \sqrt{1 - (2k/K - 1)^2}$$ [Equation 24]

As shown in Equation 24, in the present invention, the value c may serve as a coefficient or a variable for satisfying $sin^2(\theta) + cos^2(\theta) = 1$. In this regard, sin(θ) corresponds to k, and cos(θ) corresponds to c.

As such, an appropriate angle ψ in the horizontal domain may be selected based on the angle θ selected in the vertical domain. When an azimuth angle is selected in consideration of only the horizontal domain in addition to (or irrespective of or independently from) an elevation angle selected in the vertical domain, if beamforming of the elevation angle direction is applied, the originally selected azimuth angle direction may not ensure optimal performance in most cases. As such, to enable more accurate beamforming, an appropriate angle ψ in the horizontal domain needs to be selected based on (or in consideration of or depending on) the angle θ selected in the vertical domain.

Accordingly, according to the present invention, by designing a precoding codebook including weight vector(s) using the vale c, the UE may feedback CSI including more accurate and efficient precoding information, and the eNB may perform more accurate and efficient precoding (or beamforming).

Embodiment 1-5

A horizontal beamforming weight vector for a 2-D antenna array may be expressed as given by Equation 25 based on DoA.

$$W_h = e^{j \cdot 2\pi \cdot n \cdot d_h \cdot \sin(\psi)/\lambda}/\sqrt{N} \qquad \text{[Equation 25]}$$

In Equation 25, Wh denotes a horizontal beamforming weight vector. N denotes the number of antennas in the horizontal domain, n denotes an antenna number (or an antenna index) in the horizontal domain (e.g., n=0, 1, . . . , N−1), and dh denotes the distance between antennas in the horizontal domain. λ denotes a wavelength, and ψ denotes an azimuth angle.

If the azimuth angle has a value within a range of −180° to 180° (or a value within a range of −90° to 90°), the range of the variable ψ of the weight vector is −180°≤ψ≤180° (or −90°≤ψ≤90°), and thus sin(ψ) has a value within a range of −1≤sin(ψ)≤1.

Embodiment 1-5 corresponds to a case in which θ=0° is assumed in Embodiment 1-2. In this regard, the current embodiment may correspond to a method for selecting an azimuth angle without considering an elevation angle (or by assuming an elevation angle to be 0°). As such, although the accuracy of a beam direction is slightly lowered, the complexity of calculation of the UE may be effectively reduced.

Embodiment 1-6

A horizontal beamforming weight vector for a 2-D antenna array may be expressed as given by Equation 26 based on DFT.

$$W_h = e^{j \cdot 2\pi \cdot n \cdot h/H}/\sqrt{N} \qquad \text{[Equation 26]}$$

In Equation 26, Wh denotes a horizontal beamforming weight vector. N denotes the number of antennas in the horizontal domain, and n denotes an antenna number (or an antenna index) in the horizontal domain. H denotes the number of beams in the horizontal domain, and h denotes a beam number (or a beam index) in the horizontal domain.

If the azimuth angle has a value within a range of −180° to 180° (or a value within a range of −90° to 90°), n may have a value between 0 and N (e.g., n=0, 1, . . . , N−1).

Embodiment 1-6 corresponds to a case in which the value c is assumed to be 1 in Embodiment 1-4. In this regard, the current embodiment may correspond to a method for selecting an azimuth angle without considering an elevation angle (or by assuming an elevation angle to be 0°). As such, although the accuracy of a beam direction is slightly lowered, the complexity of calculation of the UE may be effectively reduced.

Embodiment 2

If an elevation angle of 0° is a value indicating a direction perpendicular to an antenna array, a codebook for vertical beamforming may include a weight vector capable of forming a beam having an elevation angle within a range of 0° to 90°.

Embodiment 2-1

A vertical beamforming weight vector for a 2-D antenna array may be expressed as given by Equation 27 based on DoA.

$$W_v = e^{j \cdot 2\pi \cdot m \cdot d_v \cdot \sin(\theta)/\lambda}/\sqrt{M} \qquad \text{[Equation 27]}$$

In Equation 27, Wv denotes a vertical beamforming weight vector. M denotes the number of antennas in the vertical domain, m denotes an antenna number (or an antenna index) in the vertical domain (e.g., m=0, 1, . . . , M−1), and dv denotes the distance between antennas in the vertical domain. λ denotes a wavelength, and θ denotes an elevation angle.

If the elevation angle has a value within a range of 0° to 90°, the range of the variable θ of the weight vector is 0°≤θ≤90°, and thus sin(θ) has a value within a range of 0≤sin(θ)≤1.

Embodiment 2-2

A horizontal beamforming weight vector for a 2-D antenna array may be expressed as given by Equation 28 based on DoA.

$$W_h = e^{j \cdot 2\pi \cdot n \cdot d_h \cdot \cos(\theta)\sin(\psi)/\lambda}/\sqrt{N} \qquad \text{[Equation 28]}$$

In Equation 28, Wh denotes a horizontal beamforming weight vector. N denotes the number of antennas in the horizontal domain, n denotes an antenna number (or an antenna index) in the horizontal domain (e.g., n=0, 1, . . . , N−1), and dh denotes the distance between antennas in the horizontal domain. λ denotes a wavelength, θ denotes an elevation angle, and ψ denotes an azimuth angle.

If the elevation angle has a value within a range of 0° to 90°, the range of the variable θ of the weight vector is 0°≤θ≤90°, and thus cos(θ) has a value within a range of 0≤cos(θ)≤1.

If the azimuth angle has a value within a range of −180° to 180° (or a value within a range of −90° to 90°), the range of the variable ψ of the weight vector is −180°≤ψ≤180° (or −90°≤ψ≤90°), and thus sin(ψ) has a value within a range of −1≤sin(ψ)≤1.

Embodiment 2-3

A vertical beamforming weight vector for a 2-D antenna array may be expressed as given by Equation 29 based on DFT.

$$W_v = e^{j \cdot 2\pi \cdot m \cdot k/K}/\sqrt{M} \qquad \text{[Equation 29]}$$

In Equation 29, Wv denotes a vertical beamforming weight vector. M denotes the number of antennas in the vertical domain, and m denotes an antenna number (or an antenna index) in the vertical domain (e.g., m=0, 1, . . . , M−1). K denotes the number of beams in the vertical domain, and k denotes a beam number (or a beam index) in the vertical domain. If the elevation angle has a value within a range of 0° to 90°, k may have a value between 0 and K/2 (e.g., k=0, 1, . . . , K/2−1).

In Equation 27 of Embodiment 2-1 based on DoA, if dv=λ/2, Wv may be expressed as Wv=exp(j×π×m×sin(θ))/sqrt(M). Herein, if 0°≤θ≤90°, 0≤sin(θ)≤1. Meanwhile, in Equation 29 of Embodiment 2-3 based on DFT, considering that 2k/K has a value within a range of 0 to 2 based on the beam index k, the relationship between the range of the elevation angle θ in the DoA based method and the beam index k in the DFT based method may be configured.

In the DFT based method, if k=0, 1, . . . , K/2, 2k/K has a value of 0 to 1. Herein, the range of the value 2k/K equals the range (i.e., 0≤sin(θ)≤1) of the value sin(θ) in a case when the elevation angle θ has a range of 0°≤θ≤90°.

As such, the elevation angle θ set to 0°≤θ≤90° in the DoA based method may correspond to the beam index k set to a value within a range of 0 to K/2 in the DFT based method.

Embodiment 2-4

A horizontal beamforming weight vector for a 2-D antenna array may be expressed as given by Equation 30 based on DFT.

$$W_h = e^{j \cdot 2\pi \cdot n \cdot c \cdot h/H}/\sqrt{N} \qquad \text{[Equation 30]}$$

In Equation 30, Wh denotes a horizontal beamforming weight vector. N denotes the number of antennas in the horizontal domain, and n denotes an antenna number (or an antenna index) in the horizontal domain. H denotes the number of beams in the horizontal domain, h denotes a beam number (or a beam index) in the horizontal domain, and c is a value determined depending on a beam index for vertical beamforming.

If the azimuth angle has a value within a range of −180° to 180° (or a value within a range of −90° to 90°), n may have a value between 0 and N (e.g., n=0, 1, ..., N−1).

If a vertical beam index k has a value between 0 and K/2, c may be configured to have a value between 0 and 1.

Specifically, if the elevation angle θ has a value within a range of 0°≤θ≤90° as in Embodiment 2-3, the variable k of the vertical beamforming weight vector may have a value between 0 and K/2. The horizontal beamforming weight vector includes a value (i.e., c) determined depending on a beam index selected for vertical beamforming, and the value may be defined as given by Equation 31.

$$c = \sqrt{1 - (2k/K - 1)^2} \qquad \text{[Equation 31]}$$

As shown in Equation 31, the value c may serve as a coefficient or a variable for selecting an appropriate angle ψ in the horizontal domain based on (or in consideration of or depending on) the angle θ selected in the vertical domain.

Meanwhile, if the elevation angle is limited as described in the current implementation (e.g., 0°≤θ≤90°), the complexity of calculation of the UE may be reduced by simply setting the value c to 1 (or by assuming the elevation angle)θ=0°. A description is now given of examples thereof.

Embodiment 2-5

A horizontal beamforming weight vector for a 2-D antenna array may be expressed as given by Equation 32 based on DoA.

$$W_h = e^{j \cdot 2\pi \cdot n \cdot d_h \cdot \sin(\psi)/\lambda}/\sqrt{N} \qquad \text{[Equation 32]}$$

In Equation 32, Wh denotes a horizontal beamforming weight vector. N denotes the number of antennas in the horizontal domain, n denotes an antenna number (or an antenna index) in the horizontal domain (e.g., n=0, 1, ..., N−1), and dh denotes the distance between antennas in the horizontal domain. λ denotes a wavelength, and ψ denotes an azimuth angle.

If the azimuth angle has a value within a range of −180° to 180° (or a value within a range of −90° to 90°), the range of the variable ψ of the weight vector is −180°≤ψ≤180° (or −90°≤ψ≤90°), and thus sin(ψ) has a value within a range of −1≤sin(ψ)≤1.

Embodiment 2-5 corresponds to a case in which θ=0° is assumed in Embodiment 2-2. In this regard, the current embodiment may correspond to a method for selecting an azimuth angle without considering an elevation angle (or by assuming an elevation angle to be 0°). As such, although the accuracy of a beam direction is slightly lowered, the complexity of calculation of the UE may be effectively reduced.

Embodiment 2-6

A horizontal beamforming weight vector for a 2-D antenna array may be expressed as given by Equation 33 based on DFT.

$$W_h = e^{j \cdot 2\pi \cdot n \cdot h/H}/\sqrt{N} \qquad \text{[Equation 33]}$$

In Equation 33, Wh denotes a horizontal beamforming weight vector. N denotes the number of antennas in the horizontal domain, and n denotes an antenna number (or an antenna index) in the horizontal domain. H denotes the number of beams in the horizontal domain, and h denotes a beam number (or a beam index) in the horizontal domain.

If the azimuth angle has a value within a range of −180° to 180° (or a value within a range of −90° to 90°), n may have a value between 0 and N (e.g., n=0, 1, ..., N−1).

Embodiment 2-6 corresponds to a case in which the value c is assumed to be 1 in Embodiment 2-4. In this regard, the current embodiment may correspond to a method for selecting an azimuth angle without considering an elevation angle (or by assuming an elevation angle to be 0°). As such, although the accuracy of a beam direction is slightly lowered, the complexity of calculation of the UE may be effectively reduced.

Embodiment 3

If an elevation angle of 0° is a value indicating a direction perpendicular to an antenna array, a codebook for vertical beamforming may include a weight vector capable of forming a beam having an elevation angle within a range of −90° to 0°.

Embodiment 3-1

A vertical beamforming weight vector for a 2-D antenna array may be expressed as given by Equation 34 based on DoA.

$$W_v = e^{j \cdot 2\pi \cdot m \cdot d_v \cdot \sin(\theta)/\lambda}/\sqrt{M} \qquad \text{[Equation 34]}$$

In Equation 34, Wv denotes a vertical beamforming weight vector. M denotes the number of antennas in the vertical domain, m denotes an antenna number (or an antenna index) in the vertical domain (e.g., m=0, 1, ..., M−1), and dv denotes the distance between antennas in the vertical domain. λ denotes a wavelength, and θ denotes an elevation angle.

If the elevation angle has a value within a range of −90° to 0°, the range of the variable θ of the weight vector is −90°≤θ≤0°, and thus sin(θ) has a value within a range of −1≤sin(θ)≤0.

Embodiment 3-2

A horizontal beamforming weight vector for a 2-D antenna array may be expressed as given by Equation 35 based on DoA.

$$W_h = e^{j \cdot 2\pi \cdot n \cdot d_h \cdot \cos(\theta) \cdot \sin(\psi)/\lambda}/\sqrt{N} \qquad \text{[Equation 35]}$$

In Equation 35, Wh denotes a horizontal beamforming weight vector. N denotes the number of antennas in the horizontal domain, n denotes an antenna number (or an antenna index) in the horizontal domain (e.g., n=0, 1, ..., N−1), and dh denotes the distance between antennas in the horizontal domain. λ denotes a wavelength, θ denotes an elevation angle, and ψ denotes an azimuth angle.

If the elevation angle has a value within a range of −90° to 0°, the range of the variable θ of the weight vector is −90°≤θ≤0°, and thus cos(θ) has a value within a range of 0≤cos(θ)≤1.

If the azimuth angle has a value within a range of −180° to 180° (or a value within a range of −90° to 90°), the range of the variable ψ of the weight vector is −180°≤ψ≤180° (or −90°≤ψ≤90°), and thus sin(ψ) has a value within a range of −1≤sin(ψ)≤1.

Embodiment 3-3

A vertical beamforming weight vector for a 2-D antenna array may be expressed as given by Equation 36 based on DFT.

$$W_v = e^{j \cdot 2\pi \cdot m \cdot k/K} / \sqrt{M}$$ [Equation 36]

In Equation 36, Wv denotes a vertical beamforming weight vector. M denotes the number of antennas in the vertical domain, and m denotes an antenna number (or an antenna index) in the vertical domain (e.g., m=0, 1, . . . , M−1). K denotes the number of beams in the vertical domain, and k denotes a beam number (or a beam index) in the vertical domain. If the elevation angle has a value within a range of 0° to 90°, k may have a value between K/2 and K (e.g., k=K/2, K/2+1, . . . , K−1).

In Equation 34 of Embodiment 3-1 based on DoA, if dv=λ/2, Wv may be expressed as Wv=exp(j×π×m×sin(θ))/sqrt(M). Herein, if −90°≤θ≤0°, −1≤sin(θ)≤0. Meanwhile, in Equation 36 of Embodiment 3-3 based on DFT, considering that 2k/K has a value within a range of 1 to 2 based on the beam index k, the relationship between the range of the elevation angle θ in the DoA based method and the beam index k in the DFT based method may be configured.

In the DFT based method, if k=K/2, K/2+1, . . . , K, 2k/K has a value of 1 to 2. Herein, if it is assumed that A=π×2k/K, the range of the value A is from π to 2π. In addition, in view of exp(jA), the value of exp(jA) in a case when the range of the value A is from π to 2π equals the value of exp(jA) in a case when the range of the value A is from −π to 0. A principle in this case may equal the principle that 2k/K has a value of −1 to 0. Herein, the range of the value 2k/K equals the range (i.e., −1≤sin(θ)≤0) of the value sin(θ) in a case when the elevation angle θ has a range of −90°≤θ≤0°.

In short, the elevation angle θ set to −90°≤θ≤0° in the DoA based method may correspond to the beam index k set to a value within a range of K/2 to K in the DFT based method.

Embodiment 3-4

A horizontal beamforming weight vector for a 2-D antenna array may be expressed as given by Equation 37 based on DFT.

$$W_h = e^{j \cdot 2\pi \cdot n \cdot c \cdot h/H} / \sqrt{N}$$ [Equation 37]

In Equation 37, Wh denotes a horizontal beamforming weight vector. N denotes the number of antennas in the horizontal domain, and n denotes an antenna number (or an antenna index) in the horizontal domain. H denotes the number of beams in the horizontal domain, h denotes a beam number (or a beam index) in the horizontal domain, and c is a value determined depending on a beam index for vertical beamforming.

If the azimuth angle has a value within a range of −180° to 180° (or a value within a range of −90° to 90°), n may have a value between 0 and N (e.g., n=0, 1, . . . , N−1).

If a vertical beam index k has a value between K/2 and K, c may be configured to have a value between 1 and 0.

Specifically, if the elevation angle θ has a value within a range of −90°≤θ≤0° as in Embodiment 3-3, the variable k of the vertical beamforming weight vector may have a value between K/2 and K. The horizontal beamforming weight vector includes a value (i.e., c) determined depending on a beam index selected for vertical beamforming, and the value may be defined as given by Equation 38.

$$c = \sqrt{1-(2k/K-1)^2}$$ [Equation 38]

As shown in Equation 38, the value c may serve as a coefficient or a variable for selecting an appropriate angle ψ in the horizontal domain based on (or in consideration of or depending on) the angle θ selected in the vertical domain.

Meanwhile, if the elevation angle is limited as described in the current implementation (e.g., −90°≤θ≤0°), the complexity of calculation of the UE may be reduced by simply setting the value c to 1 (or by assuming the elevation angle)θ=0°. A description is now given of examples thereof.

Embodiment 3-5

A horizontal beamforming weight vector for a 2-D antenna array may be expressed as given by Equation 39 based on DoA.

$$W_h = e^{j \cdot 2\pi \cdot n \cdot d_h \cdot \sin(\psi)/\lambda} / \sqrt{N}$$ [Equation 39]

In Equation 39, Wh denotes a horizontal beamforming weight vector. N denotes the number of antennas in the horizontal domain, n denotes an antenna number (or an antenna index) in the horizontal domain (e.g., n=0, 1, . . . , N−1), and dh denotes the distance between antennas in the horizontal domain. λ denotes a wavelength, and ψ denotes an azimuth angle.

If the azimuth angle has a value within a range of −180° to 180° (or a value within a range of −90° to 90°), the range of the variable ψ of the weight vector is −180°≤ψ≤180° (or −90°≤ψ≤90°), and thus sin(ψ) has a value within a range of −1≤sin(ψ)≤1.

Embodiment 3-5 corresponds to a case in which θ=0° is assumed in Embodiment 3-2. In this regard, the current embodiment may correspond to a method for selecting an azimuth angle without considering an elevation angle (or by assuming an elevation angle to be 0°). As such, although the accuracy of a beam direction is slightly lowered, the complexity of calculation of the UE may be effectively reduced.

Embodiment 3-6

A horizontal beamforming weight vector for a 2-D antenna array may be expressed as given by Equation 40 based on DFT.

$$W_h = e^{j \cdot 2\pi \cdot n \cdot h/H} / \sqrt{N}$$ [Equation 40]

In Equation 40, Wh denotes a horizontal beamforming weight vector. N denotes the number of antennas in the horizontal domain, and n denotes an antenna number (or an antenna index) in the horizontal domain. H denotes the number of beams in the horizontal domain, and h denotes a beam number (or a beam index) in the horizontal domain.

If the azimuth angle has a value within a range of −180° to 180° (or a value within a range of −90° to 90°), n may have a value between 0 and N (e.g., n=0, 1, . . . , N−1).

Embodiment 3-6 corresponds to a case in which the value c is assumed to be 1 in Embodiment 3-4. In this regard, the current embodiment may correspond to a method for selecting an azimuth angle without considering an elevation angle (or by assuming an elevation angle to be 0°). As such, although the accuracy of a beam direction is slightly lowered, the complexity of calculation of the UE may be effectively reduced.

In the above precoding codebook configuration methods proposed by the present invention, the following may be additionally considered.

When a precoding matrix (or a precoding vector) included in a precoding codebook is configured, the resolution of vertical beamforming may be set differently based on the value of an elevation angle (or a range of an elevation angle). Considering that a physical antenna array is placed on the roof of a tall building, it is expected that a case in which the location of the antenna array is higher than the location of signal transmission/reception targets (e.g., the case of FIG. 19(b)) is more common compared to an opposite case thereof (e.g., the case of FIG. 19(a)). In addition, when the location of the antenna array is higher than the location of signal transmission/reception targets (e.g., the case of FIG. 19(b)), in consideration of refraction, reflection, etc. due to various obstacles, beam directions need to be adjusted more precisely compared to an opposite case thereof (e.g., the case of FIG. 19(a)).

Considering this, when an elevation angle of 0° is a value indicating a direction perpendicular to an antenna array and the elevation angle ranges from −90° to 90° (or from 0° to 90°), the precoding codebook may be designed in such a manner that vertical beamforming has a dense resolution if the elevation angle is close to 90° (i.e., close to a downward direction on the antenna array), and has a sparse resolution if the elevation angle is close to an opposite direction thereof (e.g., −90° or 0°). That is, within a precoding codebook including a precoding weight vector/matrix for vertical beamforming, the resolution of the precoding weight vector/matrix for vertical beamforming may be set to be low if the elevation angle is close to 0° compared to a case in which the elevation angle is close to 90°. In addition, within the precoding codebook, the number of precoding matrices (or precoding vectors) corresponding to the vicinity of an elevation angle of 90° may be greater than the number of precoding matrices (or precoding vectors) corresponding to the vicinity of an elevation angle of −90° (or 0°).

Furthermore, when a precoding matrix (or a precoding vector) included in a precoding codebook is configured, the resolution of horizontal beamforming may be set differently based on the value of an elevation angle (or a range of an elevation angle). For the same reason described above, since precise beam direction configuration is advantageous if the elevation angle is close to 90°, the precoding codebook may be designed in such a manner that horizontal beamforming has a dense resolution if the elevation angle is close to 90° (i.e., close to a downward direction on the antenna array), and has a sparse resolution if the elevation angle is close to an opposite direction thereof (e.g., −90° or 0°). That is, within a precoding codebook including a precoding weight vector/matrix for horizontal beamforming, the resolution of the precoding weight vector/matrix for horizontal beamforming may be set to be high if the elevation angle has a value within a range of 0° to 90° compared to a case in which the elevation angle has a value within a range of −90° to 0°. For example, the resolution of horizontal beamforming may be set to be dense if the elevation angle has a value within a range of 0° to 90°, and set to be sparse if the elevation angle has a value within a range of −90° to 0°.

Implementation 2

Implementation 2 relates to a method for configuring a codebook set including a precoding horizontal beamforming weight vector and a precoding vertical beamforming weight vector.

Embodiment 1

The current embodiment proposes a method for configuring a codebook for vertical-horizontal beamforming.

A precoding weight vector (or a precoding weight matrix) for 3D beamforming may be determined or indicated by a combination of 2 indicators (or 2 PMIs). The 2 indicators may be denoted by, for example, $I_1$ and $I_2$. $I_1$ and $I_2$ may be simultaneously reported, or reported at different timings to reduce feedback overhead. Herein, $I_1$ may be reported in a long-term cycle and applied to a wideband.

Embodiment 1-1

Each of one or more elements of the codebook may be designed to include both a vertical beamforming weight vector/matrix and a horizontal beamforming weight vector/matrix.

Embodiment 1-2

A precoder set indicated by a first indicator (e.g., $I_1$) includes one vertical beamforming weight vector/matrix and one or more horizontal beamforming weight vector/matrix candidates. Different vertical beamforming weight vectors/matrices may be determined by different values of the first indicator $I_1$, and the different values of the first indicator $I_1$ may correspond to the same horizontal beamforming weight vector/matrix.

For example, a precoder vector/matrix for 3D beamforming may be configured by the first indicator $I_1$ and the second indicator $I_2$ as shown in Table 15.

TABLE 15

| | $I_2$ | | | |
|---|---|---|---|---|
| $I_1$ | 0 | 1 | 2 | 3 |
| 0 | Wv(0), Wh(0) | Wv(0), Wh(1) | Wv(0), Wh(2) | Wv(0), Wh(3) |
| 1 | Wv(1), Wh(0) | Wv(1), Wh(1) | Wv(1), Wh(2) | Wv(1), Wh(3) |
| 2 | Wv(2), Wh(0) | Wv(2), Wh(1) | Wv(2), Wh(2) | Wv(2), Wh(3) |
| 3 | Wv(3), Wh(0) | Wv(3), Wh(1) | Wv(3), Wh(2) | Wv(3), Wh(3) |

In Table 15, if $I_1=0$, 1 vertical beamforming weight vector/matrix, e.g., Wv(0), is indicated, and 4 horizontal beamforming weight vector/matrix candidates, e.g., Wh(0), Wh(1), Wh(2) and Wh(3), are indicated. Additionally, one of the 4 horizontal beamforming weight vector/matrix candidates may be specified by the value of $I_2$. Similarly, with respect to the other values of $I_1$, one of the vertical beamforming weight vectors/matrices may be indicated by the value of $I_1$, and one of the horizontal beamforming weight vectors/matrices may be indicated by the value of $I_2$ combined therewith.

Embodiment 1-3

A precoder set indicated by the first indicator (e.g., $I_1$) includes a part of one or more vertical beamforming weight vector/matrix candidates and all of one or more horizontal beamforming weight vector/matrix candidates. Vertical beamforming weight vectors/matrices corresponding to a first value of the first indicator $I_1$ may partially overlap with vertical beamforming weight vectors/matrices corresponding to a second value thereof. Different values of the first indicator $I_1$ may correspond to the same horizontal beamforming weight vector/matrix.

For example, a precoder vector/matrix for 3D beamforming may be specified by the first indicator $I_1$ and the second indicator $I_2$ as shown in Table 16.

TABLE 16

| $I_1$ | $I_2$ | | | | | | | |
|---|---|---|---|---|---|---|---|---|
| | 0 | 1 | 2 | 3 | 4 | 5 | 6 | 7 |
| 0 | Wv(0), Wh(0) | Wv(0), Wh(1) | Wv(0), Wh(2) | Wv(0), Wh(3) | Wv(1), Wh(0) | Wv(1), Wh(1) | Wv(1), Wh(2) | Wv(1), Wh(3) |
| 1 | Wv(1), Wh(0) | Wv(1), Wh(1) | Wv(1), Wh(2) | Wv(1), Wh(3) | Wv(2), Wh(0) | Wv(2), Wh(1) | Wv(2), Wh(2) | Wv(2), Wh(3) |
| 2 | Wv(2), Wh(0) | Wv(2), Wh(1) | Wv(2), Wh(2) | Wv(2), Wh(3) | Wv(3), Wh(0) | Wv(3), Wh(1) | Wv(3), Wh(2) | Wv(3), Wh(3) |
| 3 | Wv(3), Wh(0) | Wv(3), Wh(1) | Wv(3), Wh(2) | Wv(3), Wh(3) | Wv(0), Wh(0) | Wv(0), Wh(1) | Wv(0), Wh(2) | Wv(0), Wh(3) |

In Table 16, if $I_1=0$, 2 vertical beamforming weight vectors/matrices, e.g., Wv(0) and Wv(1), are indicated, and 4 horizontal beamforming weight vector/matrix candidates, e.g., Wh(0), Wh(1), Wh(2) and Wh(3), are indicated. Additionally, one of the 2 vertical beamforming weight vectors/matrices, e.g., Wv(0) or Wv(1), and one of the 4 horizontal beamforming weight vector/matrix candidates may be specified by the value of $I_2$. Similarly, with respect to the other values of $I_1$, 2 vertical beamforming weight vectors/matrices (or weight vector/matrix candidates) may be determined by the value of $I_1$, and one of the 2 vertical beamforming weight vectors/matrices and one of the horizontal beamforming weight vectors/matrices may be indicated by the value of $I_2$ combined therewith.

Embodiment 1-4

A precoder set indicated by the first indicator (e.g., $I_1$) includes a part of one or more vertical beamforming weight vector/matrix candidates and all of one or more horizontal beamforming weight vector/matrix candidates. Vertical beamforming weight vectors/matrices indicated by each value of the first indicator $I_1$ do not overlap with those indicated by another value thereof, and different vertical beamforming weight vectors/matrices are determined by different values of the first indicator $I_1$. Different values of the first indicator $I_1$ may correspond to the same horizontal beamforming weight vector/matrix.

For example, a precoder vector/matrix for 3D beamforming may be specified by the first indicator $I_1$ and the second indicator $I_2$ as shown in Table 17.

TABLE 17

| $I_1$ | $I_2$ | | | | | | | |
|---|---|---|---|---|---|---|---|---|
| | 0 | 1 | 2 | 3 | 4 | 5 | 6 | 7 |
| 0 | Wv(0), Wh(0) | Wv(0), Wh(1) | Wv(0), Wh(2) | Wv(0), Wh(3) | Wv(1), Wh(0) | Wv(1), Wh(1) | Wv(1), Wh(2) | Wv(1), Wh(3) |
| 1 | Wv(2), Wh(0) | Wv(2), Wh(1) | Wv(2), Wh(2) | Wv(2), Wh(3) | Wv(3), Wh(0) | Wv(3), Wh(1) | Wv(3), Wh(2) | Wv(3), Wh(3) |
| 2 | Wv(4), Wh(0) | Wv(4), Wh(1) | Wv(4), Wh(2) | Wv(4), Wh(3) | Wv(5), Wh(0) | Wv(5), Wh(1) | Wv(5), Wh(2) | Wv(5), Wh(3) |
| 3 | Wv(6), Wh(0) | Wv(6), Wh(1) | Wv(6), Wh(2) | Wv(6), Wh(3) | Wv(7), Wh(0) | Wv(7), Wh(1) | Wv(7), Wh(2) | Wv(7), Wh(3) |

In Table 17, if $I_1=0$, 2 vertical beamforming weight vectors/matrices, e.g., Wv(0) and Wv(1), are indicated, and 4 horizontal beamforming weight vector/matrix candidates, e.g., Wh(0), Wh(1), Wh(2) and Wh(3), are indicated. Additionally, one of the 2 vertical beamforming weight vectors/matrices, e.g., Wv(0) or Wv(1), and one of the 4 horizontal beamforming weight vector/matrix candidates may be specified by the value of $I_2$. Similarly, with respect to the other values of $I_1$, 2 vertical beamforming weight vectors/matrices (or weight vector/matrix candidates) may be determined by the value of $I_1$, and one of the 2 vertical beamforming weight vectors/matrices and one of the horizontal beamforming weight vectors/matrices may be indicated by the value of $I_2$ combined therewith.

Embodiment 1-5

A precoder set indicated by the first indicator (e.g., $I_1$) includes a part of one or more vertical beamforming weight vector/matrix candidates and a part of one or more horizontal beamforming weight vector/matrix candidates. Vertical beamforming weight vectors/matrices corresponding to a first value of the first indicator $I_1$ may partially or entirely overlap with vertical beamforming weight vectors/matrices corresponding to a second value thereof. Horizontal beamforming weight vectors/matrices indicated by each value of the first indicator $I_1$ do not overlap with those indicated by another value thereof, and different horizontal beamforming weight vectors/matrices are determined by different values of the first indicator $I_1$.

For example, a precoder vector/matrix for 3D beamforming may be specified by the first indicator $I_1$ and the second indicator $I_2$ as shown in Table 18.

TABLE 18

| $I_1$ | $I_2$ | | | |
|---|---|---|---|---|
| | 0 | 1 | 2 | 3 |
| 0 | Wv(0), Wh(0) | Wv(0), Wh(1) | Wv(0), Wh(2) | Wv(0), Wh(3) |

TABLE 18-continued

| | $I_2$ | | | |
|---|---|---|---|---|
| $I_1$ | 0 | 1 | 2 | 3 |
| 1 | Wv(0), Wh(4) | Wv(0), Wh(5) | Wv(0), Wh(6) | Wv(0), Wh(7) |
| 2 | Wv(1), Wh(0) | Wv(1), Wh(1) | Wv(1), Wh(2) | Wv(1), Wh(3) |
| 3 | Wv(1), Wh(4) | Wv(1), Wh(5) | Wv(1), Wh(6) | Wv(1), Wh(7) |

In Table 18, if $I_1=0$, 1 vertical beamforming weight vector/matrix, e.g., Wv(0), is indicated, and 4 horizontal beamforming weight vector/matrix candidates, e.g., Wh(0), Wh(1), Wh(2) and Wh(3), are indicated. Additionally, one of the 4 horizontal beamforming weight vector/matrix candidates may be specified by the value of $I_2$. Similarly, with respect to the other values of $I_1$, one of the vertical beamforming weight vectors/matrices may be indicated by the value of $I_1$, and one of the horizontal beamforming weight vectors/matrices may be indicated by the value of $I_2$ combined therewith.

In the above-described various examples, a DoA or DFT based precoding weight vector/matrix may be configured using the method described above in relation to Implementation 1.

In addition, a codebook may be designed in such a manner that the size of a horizontal domain codebook adaptively varies depending on the value of a vertical domain PMI. For example, a large codebook may be designed by allowing 7 horizontal domain PMIs, e.g., Wh(0) to Wh(7), to correspond to Wv(0), and a small codebook may be designed by allowing 2 horizontal domain PMIs, e.g., Wh(0) and Wh(1), to correspond to Wv(3).

Alternatively, a codebook may be designed to have different sizes depending on the value (or a range) of an elevation angle in the vertical direction. For example, the codebook may be designed to include a large number of vertical and/or horizontal precoding weight matrices/vectors (i.e., to support dense beamforming) for an elevation angle range from 0° to 45°, and to include a small number of vertical and/or horizontal precoding weight matrices/vectors (i.e., to support sparse beamforming) for an elevation angle range from 45° to 90°. As an additional example, the codebook may be designed to include a large number of vertical and/or horizontal precoding weight matrices/vectors (i.e., to support dense beamforming) for an elevation angle range from 0° to −45°, and to include a small number of vertical and/or horizontal precoding weight matrices/vectors (i.e., to support sparse beamforming) for an elevation angle range from 0° to 90°. Similarly, the codebook may be designed to densely or sparsely define vertical/horizontal precoding weight matrices/vectors for a specific elevation angle range.

The following embodiments relate to a method for separately configuring a codebook set for horizontal beamforming and a vertical beamforming codebook set.

Embodiment 2

The current embodiment relates to a method for configuring a codebook including precoding weight vector(s)/matrix(matrices) for vertical beamforming (hereinafter referred to as a vertical beamforming codebook).

According to the current embodiment, a specific precoding vector/matrix of the vertical beamforming codebook may be determined or indicated by a combination of 2 indicators (or 2 PMIs). The 2 indicators may be denoted by, for example, V-$I_1$ and V-$I_2$. V-$I_1$ and V-$I_2$ may be simultaneously reported, or reported at different timings to reduce feedback overhead. Herein, the PMI(s) for vertical beamforming (e.g., V-$I_1$ and/or V-$I_2$) may be reported in a long-term cycle and applied to a wideband. Alternatively, between the PMIs for vertical beamforming, compared to V-$I_2$, V-$I_1$ may be reported in a long-term cycle and applied to a wideband.

If the precoding weight vector/matrix for vertical beamforming is indicated by 2 indicators as described above, a precoding weight vector/matrix for 3D beamforming may be ultimately specified by additionally combining one (or a plurality of) precoding vector(s)/matrix(matrices) for horizontal beamforming. For example, the precoding weight vector/matrix for 3D beamforming may be indicated by a combination of 2 V-PMIs and 1 H-PMI.

The vertical beamforming codebook may be configured in such a manner that the V-PMI(s) (e.g., V-$I_1$ and/or V-$I_2$) indicate a precoding weight vector/matrix configured based on DoA or DFT using the method described above in relation to Implementation 1.

In addition, the size or length of the V-PMI(s) (e.g., V-h and/or V-$I_2$) is determined depending on the number of antenna ports in the vertical domain.

Furthermore, vertical beamforming weight vectors/matrices corresponding to a first value of V-$I_1$ may partially or entirely overlap with vertical beamforming weight vectors/matrices corresponding to a second value thereof. For example, a precoding vector/matrix for vertical beamforming may be specified by V-$I_1$ and V-$I_2$ as shown in Table 19.

TABLE 19

| | V-$I_2$ | |
|---|---|---|
| V-$I_1$ | 0 | 1 |
| 0 | Wv (0) | Wv (1) |
| 1 | Wv (1) | Wv (2) |
| 2 | Wv (2) | Wv (3) |
| 3 | Wv (3) | Wv (0) |

In Table 19, if V-$I_1$=0, 2 vertical beamforming weight vector/matrix candidates, e.g., Wv(0) and Wv(1), are indicated, one of the two is determined by the value of V-$I_2$. If V-$I_1$=1, 2 vertical beamforming weight vector/matrix candidates, e.g., Wv(1) and Wv(2), are indicated, and one of the two is determined by the value of V-$I_2$. Similarly, with respect to the other values of V-$I_1$, a group of vertical beamforming weight vector/matrix candidates may be indicated by the value of $I_1$, and one vertical beamforming weight vector/matrix thereof may be indicated by the value of V-$I_2$ combined therewith.

When V-$I_1$ and V-$I_2$ are reported at different timings, reporting cycles thereof may be configured as described below.

Between V-$I_1$ and V-$I_2$, V-$I_2$ may be reported more frequently compared to V-$I_1$ (or, a reporting cycle of V-$I_2$ may be set to be shorter than the reporting cycle of V-$I_1$).

Between V-$I_2$ and H-PMI, V-$I_2$ may be reported more frequently compared to H-PMI (or, a reporting cycle of V-$I_2$ may be set to be shorter than the reporting cycle of H-PMI). Alternatively, V-$I_2$ may be reported at the same timing as H-PMI.

If H-PMI is configured as 2 indicators (e.g., H-$I_1$ and H-$I_2$), H-$I_1$ may be reported at the same timing as V-$I_2$.

Alternatively, H-$I_1$ may be reported at the same timing as RI. Otherwise, H-$I_1$ may not be reported simultaneously with another PMI or another type of CSI, and may be reported separately. Instead, H-$I_1$ and H-$I_2$ may be reported at the same timing.

Embodiment 3

The current embodiment relates to another method for configuring a codebook including precoding weight vector(s)/matrix(matrices) for vertical beamforming (hereinafter referred to as a vertical beamforming codebook).

According to the current embodiment, a specific precoding vector/matrix of the vertical beamforming codebook may be determined or indicated by one indicator (or one PMI). The indicator may be denoted by, for example, V-I. Herein, the PMI for vertical beamforming (e.g., V-I) may be reported in a long-term cycle and applied to a wideband.

If the precoding weight vector/matrix for vertical beamforming is indicated by one indicator (e.g., V-I) as described above, a precoding weight vector/matrix for 3D beamforming may be ultimately specified by additionally combining one (or a plurality of) precoding vector(s)/matrix(matrices) for horizontal beamforming. For example, the precoding weight vector/matrix for 3D beamforming may be indicated by a combination of 1 V-I and one or more H-PMIs (e.g., H-I, or H-$I_1$ and H-$I_2$).

The vertical beamforming codebook may be configured in such a manner that V-I indicates a precoding weight vector/matrix configured based on DoA or DFT using the method described above in relation to Implementation 1.

In addition, the size or length of V-I is determined depending on the number of antenna ports in the vertical domain.

For example, as shown in Table 20, V-I may indicate a specific vertical beamforming precoding weight vector/matrix.

TABLE 20

| V-I | |
|---|---|
| 0 | Wv (0) |
| 1 | Wv (1) |
| 2 | Wv (2) |
| 3 | Wv (3) |

Meanwhile, V-I may be reported at a different timing from H-PMI (e.g., H-I, or H-$I_1$ and H-$I_2$). In this case, V-I may be reported more frequently compared to H-PMI (or, a reporting cycle of V-I may be set to be shorter than the reporting cycle of H-PMI).

As a modified embodiment of the above-described embodiments, a weight vector/matrix for 3D beamforming (i.e., for simultaneously determining vertical beamforming and horizontal beamforming) may be configured by combining a vertical beamforming weight vector/matrix and a horizontal beamforming weight vector/matrix. For example, a codebook may be configured in such a manner that one PMI indicates one precoding vector/matrix applied to both the vertical domain and the horizontal domain. After the codebook is configured as described above, a specific 3D precoding vector/matrix may be indicated by one PMI or a combination of a plurality of PMIs.

Implementation 3

Implementation 3 relates to a method for defining a PUCCH reporting type. Specifically, the current implementation proposes a method for reporting the index of a precoder for vertical beamforming and the index of a precoder for horizontal beamforming when UE-specific vertical beamforming and horizontal beamforming are performed in a MIMO system having an AAS based 2D antenna array configuration.

In a legacy 3GPP LTE system (e.g., a 3GPP LTE Release-8, 9, 10, or 11 system), PUCCH resources are designed to transmit up to 11 to 13 bits. Furthermore, 2 transport blocks (or 2 codewords) can be supported for rank-2 or higher rank transmission, and the 2 transport blocks are mapped one-to-one to the 2 codewords. In addition, a CQI is measured and reported per transport block (or codeword). In this case, the CQI of a first transport block (or codeword) is expressed using 4 bits, and the CQI of a second transport block (or codeword) is expressed using 3 bits. As such, a total of 7 bits are required to report CQIs of 2 transport blocks (or 2 codewords). If 4 bits are required to report PMI in a system to which precoding is applied, up to 11 bits may be used to simultaneously report precoding information and the CQI.

The legacy 3GPP LTE system supports only horizontal beamforming, and defines a method for reporting CSI therefor through a PUCCH, as described below. Particularly, a codebook for 8Tx transmission has been designed based on 2 indicators (e.g., a first indicator $i_1$ and a second indicator $i_2$). To this end, the first indicator and the second indicator may be reported in PUCCH reporting mode using three methods described below.

First, the first indicator $i_1$ is reported and then the second indicator $i_2$ and the CQI are simultaneously reported.

Second, the first indicator $i_1$, the second indicator $i_2$, and the CQI are simultaneously reported.

Third, a specific indicator (e.g., a precoding type indicator (PTI)) indicating whether the first indicator $i_1$ is reported is defined, and a different reporting method is used based on the specific indicator. If the specific indicator indicates that the first indicator $i_1$ is reported, the first indicator $i_1$ is reported at a predetermined timing, and then the second indicator $i_2$ and the CQI are simultaneously reported. If the specific indicator indicates that the first indicator $i_1$ is not reported, the second indicator $i_2$ and the CQI are simultaneously reported at a predetermined timing (in this case, since a specific precoding vector/matrix cannot be determined by only the second indicator $i_2$ without the first indicator $i_1$, a specific precoding vector/matrix may be determined or indicated by assuming that a previously reported first indicator $i_1$ is used).

For an enhanced 3GPP LTE system (e.g., a 3GPP LTE system after Release-11), a method for maximizing potential gain for a MIMO system assuming an AAS based 2D antenna array configuration is under discussion. The AAS based 2D antenna array configuration is different from the legacy system in that vertical domain beamforming can be performed variably and/or UE-specifically. When vertical beamforming is applied, the difference from the legacy system is that the UE selects a vertical domain beam direction most appropriate for (or preferred by) the UE and reports the same to the eNB. The present invention now proposes UE operation which should be additionally considered when PMIs for vertical beamforming and horizontal beamforming are reported.

The present invention defines a specific indicator (or a flag indicator) indicating whether a PMI for vertical beamforming (e.g., V-PMI) is reported when CSI is reported through a PUCCH. The specific indicator is referred to as a V-PMI reporting type indicator (RTI). The V-PMI RTI may be included in the CSI transmitted through the PUCCH by the UE. In addition, the UE may or may not report the V-PMI depending on the value of the V-PMI RTI (or, the value of the V-PMI RTI is determined depending on whether the UE reports or does not report the V-PMI).

If the V-PMI RTI is set to a first value (or a value indicating on state), the V-PMI may be reported after the V-PMI RTI is reported. In this case, an H-PMI may be reported after the V-PMI is reported. Alternatively, the V-PMI and the H-PMI may be reported at the same timing. Otherwise, the V-PMI and a part of the H-PMI may be reported at the same timing, and then the other part of the H-PMI may be reported (for example, V-PMI and H-PMI$_1$ may be simultaneously reported, and then H-PMI$_2$ and CQI may be simultaneously reported).

If the V-PMI RTI is set to a second value (or a value indicating off state), the V-PMI may not be reported and only the H-PMI may be reported after the V-PMI RTI is reported. In this case, the precoder for vertical beamforming may assume that a precoder indicated by the most recently reported V-PMI (e.g., the lastly reported V-PMI before the V-PMI RTI is reported) is constantly used. Alternatively, the precoder for vertical beamforming may use a precoder indicated by a specific V-PMI which is set by default. The default V-PMI may be a V-PMI having the lowest number (or index).

The V-PMI RTI may be reported in combination with an RI. In this case, the V-PMI may be assumed to be selected/determined based on rank-1, and the reported RI may be used to indicate a rank value serving as a basis for selecting/determining the H-PMI (for example, the RI may indicate a transmission rank value associated with the H-PMI to be reported thereafter, irrespective of whether the value of the V-PMI RTI indicates on state or off state). Otherwise, the reported RI may be used to indicate a rank value of a precoding vector/matrix indicated by a combination of the V-PMI and the H-PMI (or a precoding vector/matrix obtained as a result of a combination (e.g., a Kronecker product) of a precoding vector/matrix indicated by the V-PMI and a precoding vector/matrix indicated by the H-PMI).

Alternatively, the V-PMI RTI may be reported prior to the RI. In this case, the V-PMI may be assumed to be selected/determined based on rank-1, and the reported RI may be used to indicate a rank value serving as a basis for selecting/determining the H-PMI (i.e., a rank value associated with the H-PMI). In addition, a reporting cycle of the V-PMI RTI may be determined as an integer multiple of the reporting cycle of the RI. Information indicating that the V-PMI RTI is reported prior to the RI may be indicated as an offset value based on a predetermined report timing (e.g., the RI report timing).

Implementation 4

Implementation 4 relates to a method for supporting legacy MIMO operation when vertical beamforming is applied. The legacy MIMO operation refers to MIMO transmission schemes defined for a system before vertical beamforming is adopted (e.g., a system supporting only horizontal beamforming).

For a legacy 3GPP LTE system (e.g., a 3GPP LTE Release-8, 9, 10, or 11 system), a fixed pattern is used for vertical domain beamforming by assuming vertical tilting based on a passive antenna (or vertical domain beamforming is not applied), and 1D array based MIMO transmission operation in the horizontal domain is defined. As the MIMO transmission schemes, a single antenna port transmission scheme, a transmit diversity scheme, a spatial multiplexing scheme, a closed-loop MIMO scheme, a single-layer beamforming scheme, a dual-layer beamforming scheme, a multi-layer beamforming scheme, etc. are defined.

Basic transmission schemes include the single antenna port transmission scheme and the transmit diversity scheme. Based on the number of CRS antenna ports, the single antenna port transmission scheme is used if 1 CRS port is used, a space-frequency block code (SFBC) scheme is used if 2 CRS ports are used, and an SFBC-frequency switched transmit diversity (FSTD) scheme using 4 CRS ports may be used as a basic transmission method.

A CRS may be used to measure reference signal received power (RSRP)/reference signal received quality (RSRQ) for selecting a cell, used to measure a CQI as information for link adaptation, used to select a PMI as information for a precoding based transmission scheme, used to select a rank for supporting a high rank, and used to demodulate data and control channels.

When a passive antenna is used, a single vertical beamforming direction is applied, and the same coverage is achieved in the vertical domain because the same vertical beamforming direction is applied to a CRS, a CSI-RS, a DMRS (or a UE-specific RS), a synchronization signal, a control channel, a data channel, etc. (or vertical beamforming is not applied).

Meanwhile, if vertical beamforming is applied to an AAS based 2D antenna array, variable beamforming is enabled in the vertical domain. As such, different vertical beamforming directions may be applied to an RS (e.g., a CRS, a CSI-RS, or a DMRS (or a UE-specific RS)), a synchronization signal, a control channel, a data channel, etc. In this case, measurement mismatch may be generated, and application of vertical beamforming may cause ambiguity in operation of a legacy entity (e.g., a UE or an eNB) because the legacy schemes do not consider the application of vertical beamforming. To solve the above problems, a description is now given of various embodiments of the present invention based on adaptation of vertical beamforming.

Embodiment 1

The current embodiment describes a method for calculating a CQI by assuming transmit diversity based on multiple vertical beamforming (or vertical electric tilting or, simply, vertical tilting) directions.

CSI feedback for DMRS based data transmission is divided into a case in which a PMI is reported and a case in which a PMI is not reported. For example, when CSI is generated and reported based on a CSI-RS, a PMI and a CQI based thereon may be reported. Meanwhile, when CSI is generated and reported based on a CRS in a TDD system, a CQI may be reported without a PMI. In this case, the eNB may measure a precoding weight using an uplink reference signal, and the UE may report a CQI to the eNB without a PMI. Herein, although the UE does not report a PMI, a CQI may be measured and reported by assuming an open-loop spatial multiplexing scheme or a transmit diversity scheme. Considering that a signal-to-noise ratio (SNR) achieved when precoding is applied is improved by a predetermined level (e.g., 3 dB) compared to an SNR measured by assuming open-loop MIMO transmission, the eNB may correct and use the CQI reported by the UE.

Meanwhile, when closed-loop precoding and fixed beamforming are applied, the SNR may have a large difference (e.g., 0 dB to 6 dB) depending on the location of the user. That is, for a beam in a fixed direction, a high SNR can be measured due to concentrated signal intensity at a certain location, but a low SNR can be measured due to low signal intensity at another location. As such, when fixed beamforming is applied in the vertical domain, the CQI calculation value greatly differs depending on the user location.

The legacy passive antenna may be regarded as using a fixed beam pattern in the vertical domain. Meanwhile, in the case of an AAS, a CRS is transmitted in a fixed beam pattern (like the legacy system), and it is assumed that variable vertical beamforming is applied to DMRS based data transmission. In this case, when a PMI is not reported, if a CQI is calculated based on a CRS, an SNR greatly differs depending on the location of the user due to application of fixed beamforming in the vertical domain. To solve the above problem, the present invention proposes the following methods.

When a PMI is not reported, an SNR may be calculated based on a vertical beamforming (or vertical tilting) direction. In addition, for 3GPP LTE transmit mode 2 (TM2) (i.e., transmit diversity), vertical beamforming (or vertical tilting) information may be provided to the UE through higher layer (e.g., RRC) signaling. In addition, even when a PMI is not reported based on the legacy system, since this defines that precoding information in the horizontal domain is not reported, an additional UE operation for reporting the vertical beamforming (or vertical tilting) information may be defined.

In addition, a special reference signal (RS) for calculating a CQI in consideration of vertical beamforming (or vertical tilting) may be configured for the UE. The special RS may use a CSI-RS, or a CRS designed for a different type of measurement from a pre-defined CRS.

Herein, vertical beamforming (or vertical tilting) may be expressed as a weight vector for vertical domain beamforming. In addition, by applying vertical beamforming (or vertical tilting) differently per CRS, the UE may recognize the same as CRSs from different cells (or CRSs to which different vertical beamforming (or vertical tilting) directions are applied). In addition, by signaling a plurality of vertically sectorized CSI-RS configurations to the UE, the UE may calculate/select CSI of a vertical domain sector corresponding to each CSI-RS configuration.

Embodiment 2

A new transmit mode may be defined for vertical beamforming. This new transmit mode may include a precoding scheme for performing vertical beamforming and horizontal beamforming, and a fallback scheme operable without feedback information. The fallback scheme may correspond to a basic operation performable without a special configuration when a problem occurs in communication.

For example, the fallback scheme may be defined to use a vertical beamforming precoding vector/matrix corresponding to V-PMI index 0 and to apply a single antenna transmission scheme. Alternatively, the fallback scheme may correspond to a transmission scheme based on vertical domain sectorization to which open-loop transmission is applied.

A description is now given of a method using default vertical beamforming (or a default precoding weight) to support the fallback scheme.

To apply a legacy MIMO scheme, a fixed precoding weight may be used in the vertical domain.

When a beamforming weight vector/matrix is applied to an antenna element for vertical domain beamforming in a MIMO system to which an AAS based 2D antenna array configuration is applied, a specific (or default) antenna port may be configured using a specific (or default) precoding weight vector/matrix among vertical domain weight vectors/matrices for the legacy MIMO scheme. If the weight vectors/matrices are defined in the form of a codebook, a specific element (e.g., a precoding weight vector/matrix corresponding to the lowest index) within the codebook may be used as the specific (or default) precoding weight vector/matrix.

For example, a 2D antenna array including 4 antenna elements in the vertical domain and including 4 antenna elements in the horizontal domain is assumed. In this case, 4 antenna ports of the horizontal domain may be configured by applying a specific (or default) weight vector of the vertical domain as given by Equation 41.

$$
\begin{aligned}
H_{ap} &= [H_0 \; H_1 \; H_2 \; H_3] \\
&= H_{ae} \cdot W_v \\
&= [H_{00} \; H_{01} \; H_{02} \; H_{03}; H_{10} \; H_{11} \; H_{12} \; H_{13}; H_{20} \; H_{21} \; H_{22} \; H_{23}; \\
&\quad H_{30} \; H_{31} \; H_{32} \; H_{33}] \cdot [W_0; W_1; W_2; W_3] \\
&= [(H_{00}W_0 + H_{10}W_1 + H_{20}W_2 + H_{30}W_3) \\
&\quad (H_{01}W_0 + H_{11}W_1 + H_{21}W_2 + H_{31}W_3) \\
&\quad (H_{02}W_0 + H_{12}W_1 + H_{22}W_2 + H_{32}W_3) \\
&\quad (H_{03}W_0 + H_{13}W_1 + H_{23}W_2 + H_{33}W_3)]
\end{aligned}
$$
[Equation 41]

In Equation 41, $H_{ap}$ is a spatial channel vector/matrix configured by $H_k$. $H_k$ is a spatial channel for k, and k is an antenna port index. $H_{ae}$ is a spatial channel vector/matrix configured by $H_{mn}$. $H_{mn}$ is a spatial channel for an antenna element (m, n), m is an antenna element index in the vertical domain, and n is an antenna element index in the horizontal domain. $W_v$ is a specific (or default) weight vector/matrix for vertical domain beamforming.

Embodiment 3

According to the present invention, vertical sectorization may be applied in the time domain. For example, if a time unit for resource allocation is a subframe, a different vertical beamforming (or vertical tilting) direction may be applied per subframe.

For example, a different vertical beamforming (or vertical tilting) direction may be applied to each subframe. Alternatively, a different vertical beamforming (or vertical tilting) direction may be applied to every N (e.g., N=2, 5, 10) contiguous subframes. Otherwise, subframe(s) to which a first vertical beamforming (or vertical tilting) direction is applied and subframe(s) to which a second vertical beamforming (or vertical tilting) direction is applied may be distinguishably indicated using a bitmap. Instead, different vertical beamforming (or vertical tilting) directions may be applied to different subframe types (e.g., a normal subframe and an MBSFN subframe).

In addition, carrier based vertical sectorization is also enabled. This may be understood that different vertical beamforming (or vertical tilting) directions are applied to different carriers (or cells).

Figure 20:
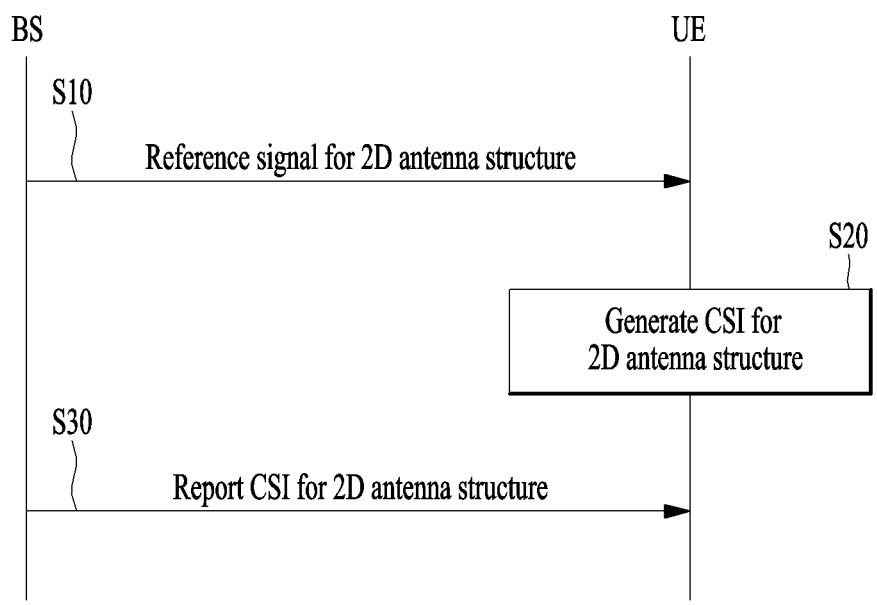
FIG. 20 is a diagram for describing a method for transmitting/receiving channel state information (CSI), according to the present invention.

FIG. 20 is a diagram for describing a method for transmitting/receiving channel state information (CSI), according to the present invention.

In step S10, an eNB may transmit a reference signal (e.g., a CSI-RS) usable to generate CSI for a 2D antenna structure, to a UE.

In step S20, the UE may generate CSI for the 2D antenna structure using the reference signal received from the eNB.

In step S30, the UE may report the generated CSI to the eNB.

When the CSI for the 2D antenna structure is generated and/or reported, one of or a combination of two or more of the proposals of the present invention (e.g., the precoding matrix configuration method, the codebook design method, the precoding matrix indicator configuration method, the precoding matrix indicator reporting method, the legacy system entity supporting method, etc. for expressing vertical/horizontal beamforming appropriate for the 2D antenna structure) may be applied.

Although the exemplary method of FIG. 20 is described as a series of steps for brevity, the above description does not limit the order of the steps and some or all of the steps may be performed simultaneously or in different orders as necessary. In addition, not all steps of FIG. 20 are inevitably necessary to implement the method proposed by the present invention.

Figure 21:
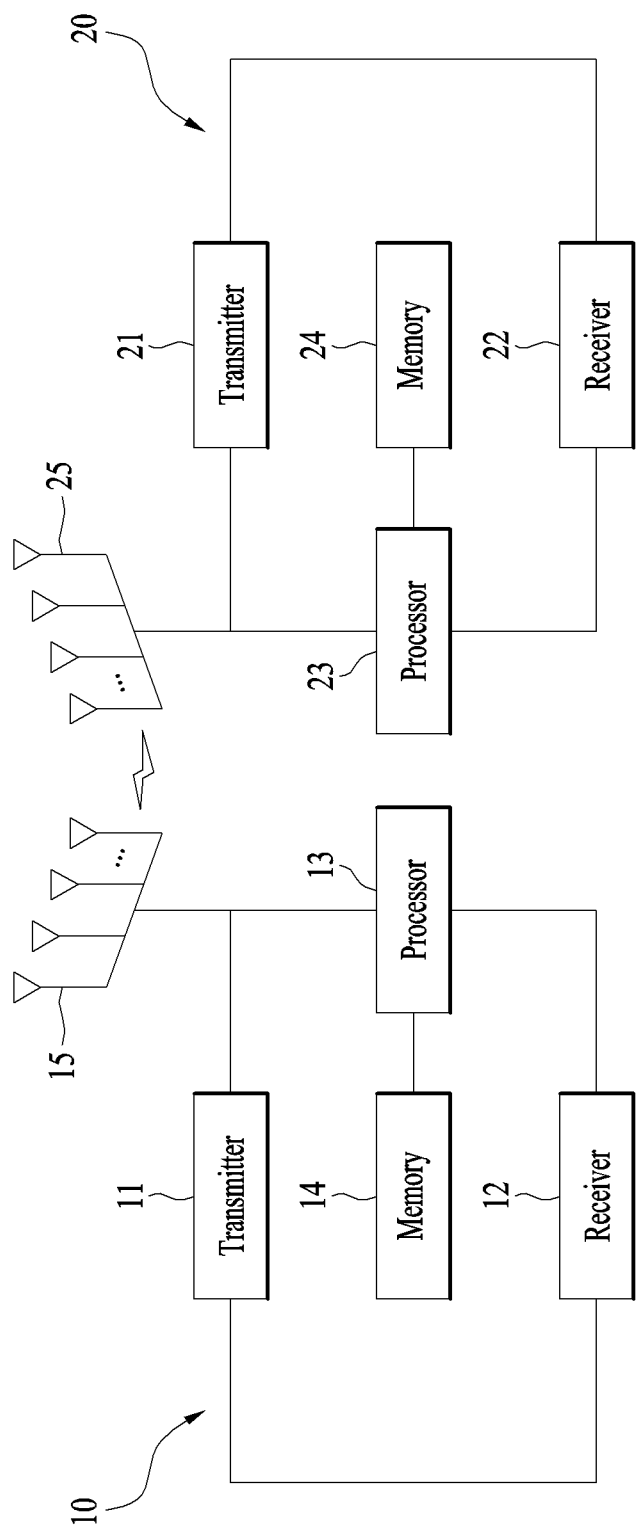
FIG. 21 is a block diagram of a base station (BS) and a user equipment (UE) according to an embodiment of the present invention.

FIG. 21 is a block diagram of a user equipment (UE) 20 and a base station (BS) 10 according to an embodiment of the present invention.

Referring to FIG. 21, the BS 10 according to the present invention may include a transmitter 11, a receiver 12, a processor 13, a memory 14 and multiple antennas 15. The transmitter 11 may transmit a variety of signals, data and information to an external device (e.g., the UE 20). The receiver 12 may receive a variety of signals, data and information from an external device (e.g., the UE 20). The processor 13 may provide overall control to the BS 10. The multiple antennas 15 may be configured based on, for example, a 2D antenna structure.

The processor 13 of the BS 10 according to an embodiment of the present invention may be configured to control the transmitter 11 to transmit a reference signal to the UE 20, and to control the receiver 12 to receive CSI generated using the reference signal by the UE 20, from the UE 20.

In the above configuration of the BS 10, when the CSI for the 2D antenna structure is generated and/or reported, one of or a combination of two or more of the proposals of the present invention (e.g., the precoding matrix configuration method, the codebook design method, the precoding matrix indicator configuration method, the precoding matrix indicator reporting method, the legacy system entity supporting method, etc. for expressing vertical/horizontal beamforming appropriate for the 2D antenna structure) may be applied.

In addition, the processor 13 of the BS 10 may process information received and to be transmitted by the BS 10, and the memory 14 may store the processed information for a predetermined time and is replaceable by another component such as a buffer (not shown).

Referring to FIG. 21, the UE 20 according to the present invention may include a transmitter 21, a receiver 22, a processor 23, a memory 24 and multiple antennas 25. The multiple antennas 25 refer to a device supporting MIMO transmission/reception. The transmitter 21 may transmit a variety of signals, data and information to an external device (e.g., the BS 10). The receiver 22 may receive a variety of signals, data and information from an external device (e.g., the BS 10). The processor 23 may provide overall control to the UE 20.

The processor 23 of the UE 20 according to an embodiment of the present invention may be configured to control the receiver 22 to receive a reference signal from the BS 10, and to control the transmitter 21 to transmit CSI generated using the reference signal, to the BS 10.

In the above configuration of the UE 20, when the CSI for the 2D antenna structure is generated and/or reported, one of or a combination of two or more of the proposals of the present invention (e.g., the precoding matrix configuration method, the codebook design method, the precoding matrix indicator configuration method, the precoding matrix indicator reporting method, the legacy system entity supporting method, etc. for expressing vertical/horizontal beamforming appropriate for the 2D antenna structure) may be applied.

In addition, the processor 23 of the UE 20 may process information received and to be transmitted by the UE 20, and the memory 24 may store the processed information for a predetermined time and is replaceable by another component such as a buffer (not shown).

A BS is exemplified as a downlink transmission entity or an uplink reception entity and a UE is exemplified as a downlink reception entity or an uplink transmission entity to describe the embodiments of the present invention, but the scope of the present invention is not limited thereto. For example, the description of the BS may be equally applied to a case in which a cell, an antenna port, an antenna port group, a radio remote head (RRH), a transmission point, a reception point, an access point or a relay serves as an entity of downlink transmission to the UE or an entity of uplink reception from the UE. In addition, the principle of the present invention described through various embodiments may be equally applied to a case in which a relay serves as an entity of downlink transmission to the UE or an entity of uplink reception from the UE or a case in which a relay serves as an entity of uplink transmission to the BS or an entity of downlink reception from the BS.

The above-described embodiments of the present invention may be implemented by various means, for example, hardware, firmware, software, or a combination thereof.

In a hardware configuration, the methods according to embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to embodiments of the present invention may be implemented in the form of modules, procedures, functions, etc. for performing the above-described functions or operations. Software code may be stored in a memory unit and executed by a processor. The memory unit may be located inside or outside the processor and exchange data with the processor via various known means.

The detailed descriptions of the preferred embodiments of the present invention have been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The above-described embodiments of the present invention are applicable to a variety of mobile communication systems.

The invention claimed is:

1. A method for reporting channel state information (CSI) by a user equipment (UE) in a wireless communication system, the method comprising:
receiving a reference signal from a base station (BS);
generating the CSI using the reference signal; and
reporting the generated CSI to the BS,
wherein the CSI comprises information indicating a first precoding matrix for a first domain of a 2D antenna structure, and a second precoding matrix for a second domain of the 2D antenna structure,
wherein the first precoding matrix is determined based on a coefficient for determining an angle in the first domain, and
wherein the angle in the first domain is determined based on an angle in the second domain.

2. The method according to claim 1, wherein the first precoding matrix is expressed as $W\_h = e^{\wedge}(j \cdot 2\pi \cdot n \cdot c \cdot h/H)/\sqrt{N}$,
wherein, N is a number of antennas in the first domain,
n is an antenna index in the first domain,
H is a number of beams in the first domain,
h is a beam index in the first domain, and
c is the coefficient.

3. The method according to claim 2, wherein the second precoding matrix is expressed as $W\_v = e^{\wedge}(j \cdot 2\pi \cdot m \cdot k/K)/\sqrt{M}$,
wherein, M is a number of antennas in the second domain,
m is an antenna index in the second domain,
K is a number of beams in the second domain, and
k is a beam index in the second domain.

4. The method according to claim 3, wherein a direction perpendicular to an antenna array in the second domain corresponds to an angle $\theta=0°$ in the second domain, and
wherein, if $-90° \leq \theta \leq 90°$, k has a value between 0 and K.

5. The method according to claim 4, wherein the direction perpendicular to the antenna array in the second domain corresponds to the angle $\theta=0°$ in the second domain, and
wherein, if $0° \leq \theta \leq 90°$, k has a value between 0 and K/2.

6. The method according to claim 4, wherein the direction perpendicular to the antenna array in the second domain corresponds to the angle $\theta=0°$ in the second domain, and
wherein, if $-90° \leq \theta \leq 0°$, k has a value between K/2 and K.

7. The method according to claim 2, wherein a value of the coefficient c is determined based on $c = \sqrt{(1-[(2k/K-1)]^2)}$.

8. The method according to claim 2, wherein a value of the coefficient c is set to 1.

9. The method according to claim 1, wherein a direction perpendicular to an antenna array in the second domain corresponds to an angle $\theta=0°$ in the second domain, and
wherein, in a second codebook comprising one or more candidates of the second precoding matrix for the second domain of the 2D antenna structure, a resolution of the second precoding matrix is set to be low if the angle is close to $\theta=0°$ compared to a case in which the angle is close to $\theta=90°$.

10. The method according to claim 1, wherein a direction perpendicular to an antenna array in the second domain corresponds to an angle $\theta=0°$ in the second domain, and
wherein, in a first codebook comprising the first precoding matrix for beamforming in the first domain, a resolution of the first precoding matrix is set to be high if the angle has a range of $0° \leq \theta \leq 90°$ compared to a case in which the angle has a range of $-90° \leq \theta \leq 0°$.

11. The method according to claim 1, wherein the first domain is a horizontal domain, and
wherein the second domain is a vertical domain.

12. A method for receiving channel state information (CSI) by a base station (BS) in a wireless communication system, the method comprising:
transmitting a reference signal to a user equipment (UE),
wherein the CSI is generated using the reference signal by the UE; and
receiving the generated CSI from the UE,
wherein the CSI comprises information indicating a first precoding matrix for a first domain of a 2D antenna structure, and a second precoding matrix for a second domain of the 2D antenna structure,
wherein the first precoding matrix is determined based on a coefficient for determining an angle in the first domain, and
wherein the angle in the first domain is determined based on an angle in the second domain.

13. A user equipment (UE) for reporting channel state information (CSI) in a wireless communication system, the UE comprising:
a transmitter;
a receiver; and
a processor,
wherein the processor is configured to:
control the receiver to receive a reference signal from a base station (BS),
generate the CSI using the reference signal, and
control the transmitter to report the generated CSI to the BS,
wherein the CSI comprises information indicating a first precoding matrix for a first domain of a 2D antenna structure, and a second precoding matrix for a second domain of the 2D antenna structure,
wherein the first precoding matrix is determined based on a coefficient for determining an angle in the first domain, and
wherein the angle in the first domain is determined based on an angle in the second domain.

14. A base station (BS) for receiving channel state information (CSI) in a wireless communication system, the BS comprising:
a transmitter;
a receiver; and
a processor,
wherein the processor is configured to:
control the transmitter to transmit a reference signal to a user equipment (UE),
wherein the CSI is generated using the reference signal by the UE, and
control the receiver to receive the generated CSI from the UE,
wherein the CSI comprises information indicating a first precoding matrix for a first domain of a 2D antenna structure, and a second precoding matrix for a second domain of the 2D antenna structure,
wherein the first precoding matrix is determined based on a coefficient for determining an angle in the first domain, and
wherein the angle in the first domain is determined based on an angle in the second domain.

* * * * *